(12) United States Patent
Kenmoku et al.

(10) Patent No.: US 7,557,176 B2
(45) Date of Patent: Jul. 7, 2009

(54) POLYHYDROXYALKANOIC ACID HAVING VINYL, ESTER, CARBOXYL OR SULFONIC ACID GROUP AND PRODUCING METHOD THEREFOR

(75) Inventors: Takashi Kenmoku, Fujisawa (JP); Tatsuki Fukui, Yokohama (JP); Chieko Mihara, Isehara (JP); Ako Kusakari, Tokyo (JP); Tetsuya Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 10/574,001

(22) PCT Filed: Jun. 9, 2005

(86) PCT No.: PCT/JP2005/010996

§ 371 (c)(1),
(2), (4) Date: Mar. 29, 2006

(87) PCT Pub. No.: WO2005/121204

PCT Pub. Date: Dec. 22, 2005

(65) Prior Publication Data

US 2008/0064828 A1 Mar. 13, 2008

(30) Foreign Application Priority Data

Jun. 11, 2004 (JP) ............... 2004-174788

(51) Int. Cl.
*C08G 63/02* (2006.01)
*C07D 319/12* (2006.01)
*C07D 321/00* (2006.01)
*C08G 69/44* (2006.01)
*C08F 24/00* (2006.01)

(52) U.S. Cl. ............ 528/272; 526/270; 526/266; 526/318.3; 528/271; 528/332; 549/267; 549/274; 525/451

(58) Field of Classification Search ............ 528/272
See application file for complete search history.

(56) References Cited

U.S. PATENT DOCUMENTS

| 4,265,247 | A | 5/1981 | Lenz et al. |
| 5,405,974 | A | 4/1995 | Murahashi et al. |
| 6,083,729 | A * | 7/2000 | Martin et al. ........... 435/135 |
| 6,521,429 | B2 | 2/2003 | Honma et al. |
| 6,635,782 | B2 | 10/2003 | Honma et al. |
| 7,078,200 | B2 | 7/2006 | Honma et al. |
| 2003/0088052 | A1 * | 5/2003 | Yamane .................... 528/272 |
| 2004/0081906 | A1 | 4/2004 | Kenmoku et al. ....... 430/108.4 |
| 2005/0196521 | A1 | 9/2005 | Kozaki et al. |
| 2005/0260514 | A1 | 11/2005 | Mihara et al. ........... 430/108.4 |
| 2006/0247414 | A1 | 11/2006 | Kenmoku et al. |
| 2006/0263432 | A1 | 11/2006 | Yano et al. |
| 2007/0003975 | A1 | 1/2007 | Imamura et al. |
| 2007/0073006 | A1 | 3/2007 | Kenmoku et al. |

FOREIGN PATENT DOCUMENTS

| EP | 1 336 635 A1 | 8/2003 |
| JP | 59-190945 A | 10/1984 |
| JP | 2-3415 A | 1/1990 |
| JP | 5-310721 A | 11/1993 |
| WO | WO 2004/038512 A1 | 5/2004 |
| WO | WO 2004/044213 A1 | 5/2004 |
| WO | WO 2004/061530 A1 | 7/2004 |
| WO | 2005/121205 A2 | 12/2005 |
| WO | 2005/121208 A1 | 12/2005 |

OTHER PUBLICATIONS

Mikael Trollsås et al., "Hydrophilic Aliphatic Polyesters: Design, Synthesis, and Ring-Opening Polymerization of Functional Cyclic Esters," 33 Macromol. 4619-27 (2000).
S. Ponsart et al., "A Novel Route to Poly(ε-caprolactone)-Based Copolymers via Anionic Derivatization," 1 Biomolecules 275-81 (2000).
Benjamin Saulnier et al., "Lactic Acid-Based Functionalized Polymers via Copolymerization and Chemical Modification," 4 Macromol. Biosci. 232-37 (2004).
Bryan Parrish et al., "Functional Polyesters by Ring-Opening Polymerization of α-allyl(δ-valerolactone)," 87 Polymer. Mater.: Sci. & Eng. 254-55 (2002).
C.P. Radano et al., "Synthesis of Novel Biodegradable Copolyesters Using Olefin Metathesis," 43(2) Polymer Reprints 727-28 (2002).
Tetsuji Yamaoka et al., "Synthesis and Properties of Malic Acid-Containing Functional Polymers," 25 Intl. J. Biol. Macromol. 265-71 (1999).
Lindsay H. Briggs et al., "Degradation of the Lanosterol Side-Chain," J.C.S. Perkin I, 806-09 (1973).
Organic Synthesis, vol. 4, pp. 698-699 (1963).
Harry R. Allcock et al., "Reactions of Steroid Salts with Hexachlorocyclotriphosphazene," 46 J. Org. Chem. 13-22 (1981).
J.K. Stille et al., "Tetracyclic Dienes. I. The Diels-Alder Adduct of Norbornadiene and Cyclopentadiene," 81 J. Am. Chem. Soc. 4273-75 (Aug. 1959).
Marie-Maud Bear et al., "Preparation of a Bacterial Polyester with Carboxy Groups in Side Chains," 4 Chemistry 289-93 (2001).

* cited by examiner

*Primary Examiner*—Randy Gulakowski
*Assistant Examiner*—Shane Fang
(74) *Attorney, Agent, or Firm*—Fitzpatrick, Cella, Harper & Scinto

(57) ABSTRACT

The invention is to provide a novel polyhydroxyalkanoate having a reactive function group within the molecule and a producing method therefor In a polyhydroxyalkanoate containing a unit having a vinyl group in a side chain, such vinyl group is utilized for deriving a polyhydroxyalkanoate comprising a carboxyl group or a unit having an amide group and a sulfonic acid group.

4 Claims, No Drawings

POLYHYDROXYALKANOIC ACID HAVING VINYL, ESTER, CARBOXYL OR SULFONIC ACID GROUP AND PRODUCING METHOD THEREFOR

TECHNICAL FIELD

The present invention relates to a novel polyhydroxyalkanoate and a producing method therefor.

BACKGROUND ART

Biodegradable polymer materials are widely employed in medical materials, drug delivery systems, environment-matching materials and the like. New additional functions are recently required and various researches are being made. Particularly in polyhydroxyalkanoate represented by polylactic acid, an introduction of a chemically modifiable functional group into the molecule is investigated, and compounds having a carboxyl group or a vinyl group are reported. For example, polymalic acid is known as polyhydroxyalkanoate having a carboxyl group in a side chain. A polymer of polymalic acid is known, by a manner of polymerization, in an α-type represented by a chemical formula (22):

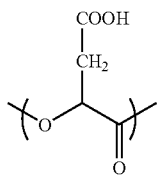

(22)

and a β-type represented by a chemical formula (23):

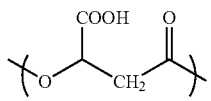

(23)

Among these, as polymalic acid of β-type and a copolymer thereof, U.S. Pat. No. 4,265,247 discloses a polymer formed by a ring-opening polymerization of a benzyl ester of β-malolactone represented by a chemical formula (24):

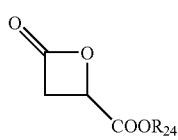

(24)

($R_{24}$: benzyl group)

Also as a copolymer of α-type polymalic acid and glycolic acid and a copolymer containing other hydroxyalkanoic acids other than glycolic acid, Japanese Patent Application Laid-open No. H02-3415 discloses a copolymer formed by a 6-membered ring diester monomer represented by a chemical formula (25):

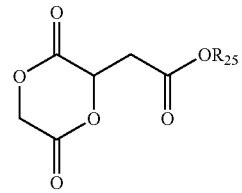

(25)

($R_{25}$ being a lower alkyl group such as a methyl group, an ethyl group, an n-propyl group, an isopropyl group or a t-butyl group, or a benzyl group)

and a glycolide or a lactide which is a cyclic diester, or a lactone which is an intramolecular ring-closing ester of ω-hydroxycarboxylic acid.

Also as a polyhydroxyalkanoate having a carboxyl group in a side chain, Macromolecules 2000, 33(13), 4619-4627 discloses a ring-opening polymerization of 7-oxo-4-oxepanonecarboxylic acid ester to form a polymer having an ester group in a side chain and a hydrogenolysis of the polymer to obtain a polymer having a carboxylic acid in the side chain. Biomacromolecules 2000, 1, 275 discloses reacting poly(ε-caprolactone) with lithium diisopropylamide and then with benzyl chloroformate to obtain a polymer in which a benzyloxycarbonyl group is introduced into an α-methylene group in a carbonyl group present in the main chain of poly (ε-caprolactone). Macromolecular Bioscience 2004, 4, 232 discloses reacting polylactic acid with lithium diisopropylamide and then with benzyl bromoacetate to obtain a polymer in which a (benzyloxycarbonyl)methyl group is introduced into an α-methylene group in the carbonyl group present in the main chain of polylactic acid. As a polyhydroxyalkanoate having a vinyl group in a side chain, Polymeric Materials Science & Engineering 2002, 87,254 discloses a polymer obtained by a ring-opening polymerization of α-allyl(δ-valerolactone). Also as a polyhydroxyalkanoate similarly having a vinyl group in a side chain, Polymer Preprints 2002, 43(2), 727 discloses a polymer formed by a ring-opening polymerization of 3,6-diallyl-1,4-dioxane-2,5-dione which is a 6-membered ring diester monomer.

Also there is reported a polymer having novel functions by introducing a structure providing a functionality into a polyhydroxyalkanoate in which a chemically modifiable functional group is introduced as described above. International Journal of Biological Macromolecules 25 (1999) 265 (non-patent literature 6) discloses a ring-opening polymerization of a cyclic dimer of α-malic acid and glycolic acid to obtain an α-malic acid-glycolic acid copolymer, and to unprotect the obtained polymer to obtain a polyester having a carboxyl group in a side chain. The carboxyl group of the side chain is chemically modified with a tripeptide to obtain a polymer, which is reported to provide a satisfactory result in an evaluation of a cell adhesivity.

DISCLOSURE OF INVENTION

Though it is conceived possible to obtain a new functionality by introducing a unit having a carboxyl group or a unit having a vinyl group as a reactive functional group into the molecule and by chemically modifying such reactive functional group, but such reports are limited. Therefore, the present invention provides a novel polyhydroxyalkanoate having a reactive functional group in the molecule and a producing method therefor, and also to provide a novel polyhydroxyalkanoate having a novel function by chemically modifying polyhydroxyalkanoate having such reactive functional group and a producing method therefore.

The present inventors, as a result of intensive investigations for a novel polyhydroxyalkanoate having a reactive functional group in the molecule and for a novel polyhydroxyalkanoate having a novel function by chemically modifying the polyhydroxyalkanoate having such reactive functional group, have made the present invention.

According to an aspect of the present invention, there is provided polyhydroxyalkanoate comprised of at least a unit represented by a chemical formula (1) within the molecule:

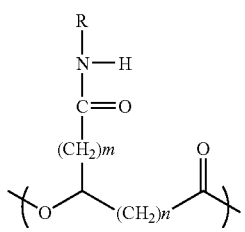

(1)

wherein R represents $-A_1-SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure or a substituted or unsubstituted heterocyclic structure; n represents an integer selected from 0 to 4; m represents an integer selected from 0-8 in case n is 0, 2, 3 or 4, and m represents 0 in case n is 1; and in case plural units are present, R, $R_1$, $R_{1a}$, $A_1$, m and n have the aforementioned meanings independently for each unit. The description "0-8" means—0 to 8—, and such a hyphen serves as an arbitrary equivalent of the phrase "upto and including" when used between numbers.

The polyhydroxyalkanoate is preferably comprised of, as the unit represented by the chemical formula (1), at least a unit represented by a chemical formula (2), a chemical formula (3), a chemical formula (4A) or (4B), within the molecule:

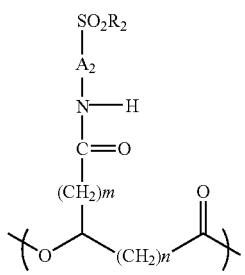

(2)

wherein $R_2$ represents OH, a halogen atom, ONa, OK or $OR_{2a}$; $R_{2a}$ represents a linear or branched alkyl group with 1 to 8 carbon atoms or a substituted or unsubstituted phenyl group, $A_2$ represents a linear or branched alkylene group with 1 to 8 carbon atoms; n represents an integer selected from 0 to 4; m represents an integer selected from 0-8 in case n is 0, 2, 3 or 4, and m represents 0 in case n is 1; and in case plural units are present, $A_2$, $R_2$, $R_{2a}$, m and n have the aforementioned meanings independently for each unit;

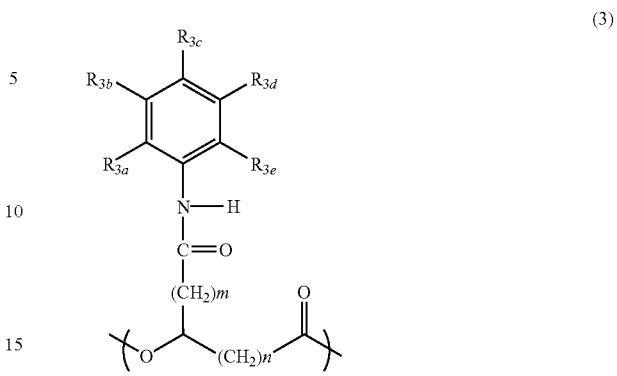

(3)

wherein $R_{3a}$, $R_{3b}$, $R_{3c}$, $R_{3d}$ and $R_{3e}$ each independently represents $SO_2R_{3f}$ ($R_{3f}$ representing OH, a halogen atom, ONa, OK or $OR_{3f1}$ ($R_{3f1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$ ($R_{3g}$ representing a H atom, a Na atom or a K atom), an acetamide group, an OPh group, a NHPh group, a $CF_3$ group, a $C_2F_5$ group or a $C_3F_7$ group (Ph indicating a phenyl group), of which at least one is $SO_2R_{3f}$; n represents an integer selected from 0 to 4; m represents an integer selected from 0-8 in case n is 0, 2, 3 or 4, and m represents 0 in case n is 1; and in case plural units are present, $R_{3a}$, $R_{3b}$, $R_{3c}$, $R_{3d}$, $R_{3e}$, $R_{3f}$, $R_{3f1}$, $R_{3g}$, m and n have the aforementioned meanings independently for each unit;

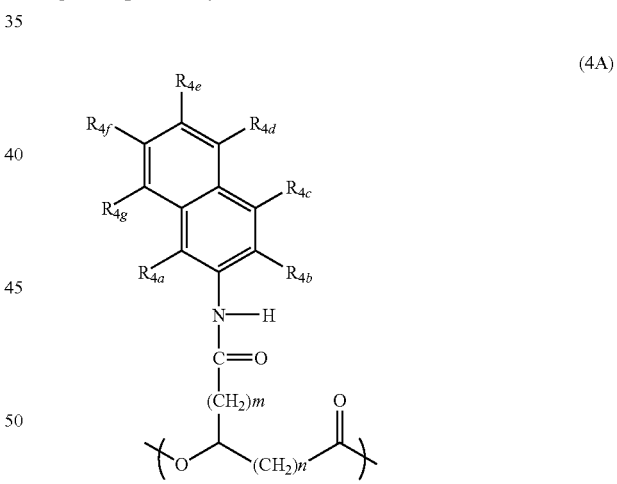

(4A)

wherein $R_{4a}$, $R_{4b}$, $R_{4c}$, $R_{4d}$, $R_{4e}$, $R_{4f}$ and $R_{4g}$ each independently represents $SO_2R_4$, ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$; n represents an integer selected from 0 to 4; m represents an integer selected from 0-8 in case n is 0, 2, 3 or 4, and m represents 0 in case n is 1; and in case plural units are present, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m and n have the aforementioned meanings independently for each unit;

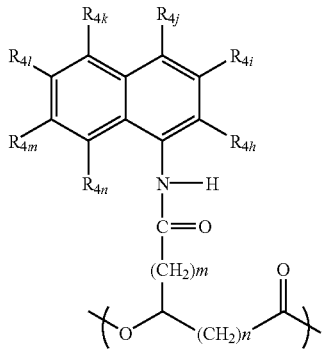

(4B)

wherein $R_{4h}$, $R_{4i}$, $R_{4j}$, $R_{4k}$, $R_{4l}$, $R_{4m}$ and $R_{4n}$ each independently represents $SO_2R_{4o}$ ($R_{4o}$ representing OH, a halogen atom, ONa, OK or $OR_{4o1}$ ($R_{4o1}$, representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$; n represents an integer selected from 0 to 4; m represents an integer selected from 0-8 in case n is 0, 2, 3 or 4, and m represents 0 in case n is 1; and in case plural units are present, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, m and n have the aforementioned meanings independently for each unit.

According to another aspect of the present invention, there is provided polyhydroxyalkanoate comprised of at least a unit represented by a chemical formula (5) within the molecule:

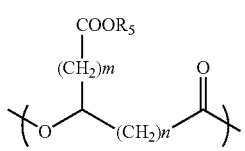

(5)

wherein $R_5$ represents hydrogen, a group capable of forming a salt or $R_{5a}$; $R_{5a}$ represents a linear or branched alkyl group with 1-12 carbon atoms, an aralkyl group or a substituent having a sugar; n represents an integer selected from 0, 2, 3, 4; m represents an integer selected from 2-8 in case n is 0, wherein $R_5$ represents $R_{5a}$ only in case m is 2, and m represents an integer selected from 0-8 in case n is an integer selected from 2-4; and in case plural units are present, $R_5$, $R_{5a}$, m and n have the aforementioned meanings independently for each unit.

According to a still another aspect of the present invention, there is provided polyhydroxyalkanoate comprised of at least a unit represented by a chemical formula (6) within the molecule:

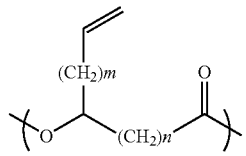

(6)

wherein n represents an integer selected from 0, 2, 3, 4; m represents an integer selected from 2-8 in case n is 0, m represents an integer selected from 0-8 in case n is 2 or 3, and m represents an integer selected from 0 and 2-8 in case n is 4; and in case plural units are present, m and n have the aforementioned meanings independently for each unit.

The above mentioned polyhydroxyalkanoate is preferably further comprised of a unit represented by a chemical formula (7) within the molecule:

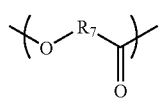

(7)

wherein $R_7$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; and in case plural units are present, $R_7$ has the aforementioned meanings independently for each unit.

According to a further aspect of the present invention, there is provided a method for producing polyhydroxyalkanoate represented by a chemical formula (9), comprised of a step of polymerizing a compound represented by a chemical formula (8) in the presence of a catalyst:

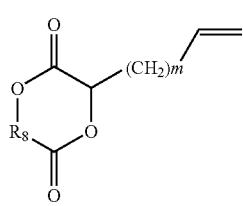

(8)

wherein $R_8$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; and m represents an integer selected from 2-8;

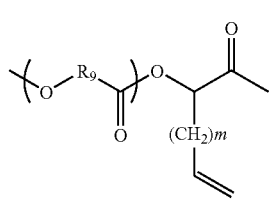

(9)

wherein $R_9$ represents a linear or branched alkylene or alkyleneoxyalkylene group with 1-11 carbon atoms (each alkylene group being independently with 1-2 carbon atoms), a linear or branched alkenyl group with 1-11 carbon atoms or an alkylidene group with 1-5 carbon atoms which is unsubstituted or substituted with an aryl group; m represents an integer selected from 2-8; and in case plural units are present, $R_9$ and m have the aforementioned meanings independently for each unit.

According to a further aspect of the present invention, there is provided a method for producing polyhydroxyalkanoate represented by a chemical formula (13), comprised of a step of polymerizing a compound represented by a chemical formula (12) in the presence of a catalyst:

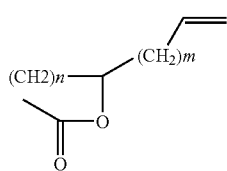

(12)

wherein n represents an integer selected from 2 to 4; m represents an integer selected from 0-8 in case n is 2 or 3, and m represents an integer selected from 0 and 2-8 in case n is 4:

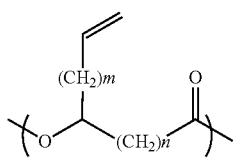

(13)

wherein n represents an integer selected from 2 to 4;

m represents an integer selected from 2-8 in case n is 2 or 3, and m represents an integer selected from 0 and 2-8 in case n is 4, and in case plural units are present, m and n have the aforementioned meanings independently for each unit.

According to a further aspect of the present invention, there is provided a method for producing polyhydroxyalkanoate represented by a chemical formula (15), comprised of a step of polymerizing a compound represented by a chemical formula (14) in the presence of a catalyst:

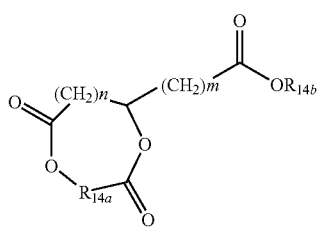

(14)

wherein $R_{14a}$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; $R_{14b}$ represents a linear or branched alkyl group with 1-12 carbon atoms or an aralkyl group; n represents an integer selected from 0, 2, 3 and 4; m represents an integer selected from 2-8 in case n is 0 and an integer selected from 0-8 in case n is selected from 2-4;

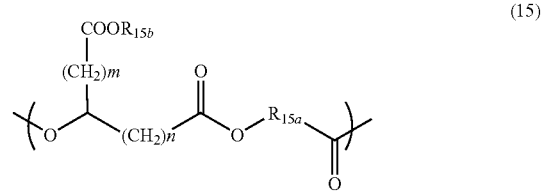

(15)

wherein $R_{15a}$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; $R_{15b}$ represents a linear or branched alkyl with 1-12 carbon atoms or an aralkyl group; n represents an integer selected from 0, 2, 3 and 4; m represents an integer selected from 2-8 in case n is 0 and an integer selected from 0-8 in case n is selected from 2-4; and in case plural units are present, $R_{15a}$, $R_{15b}$, m and n have the aforementioned meanings independently for each unit.

According to a further aspect of the present invention, there is provided a method for producing a polyhydroxyalkanoate comprising a unit represented by a chemical formula (17), comprised of a step of oxidizing a double bond portion of a polyhydroxyalkanoate comprising a unit represented by a chemical formula (16):

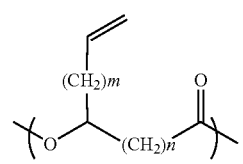

(16)

wherein m represents an integer selected from 0-8; n represents 0, 2, 3 or 4; and, in case plural units are present, m and n have the aforementioned meanings independently for each unit:

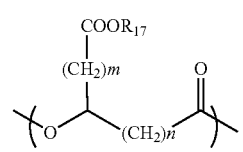

(17)

wherein m represents an integer selected from 0-8;

$R_{17}$ represents hydrogen, or a group capable of forming a salt; n represents 0, 2, 3 or 4; and, in case plural units are present, m, n and $R_{17}$ have the aforementioned meanings independently for each unit.

According to a further aspect of the present invention, there is provided a method for producing a polyhydroxyalkanoate comprising a unit represented by a chemical formula (19), comprised of a step of executing hydrolysis of a polyhydroxyalkanoate comprising a unit represented by a chemical formula (18) in the presence of an acid or an alkali, or a step of executing hydrogenolysis comprising a catalytic reduction of a polyhydroxyalkanoate comprising a unit represented by a chemical formula (18):

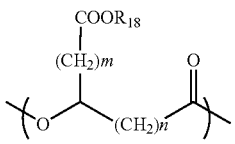
(18)

wherein $R_{18}$ represents a linear or branched alkyl group with 1-12 carbon atoms or an aralkyl group; n represents an integer selected from 0, 2, 3 and 4; m represents an integer selected from 2-8 in case n is 0, or an integer selected from 0-8 in case n is 2, 3 or 4; and in case plural units are present, $R_{18}$, m and n have the aforementioned meanings independently for each unit;

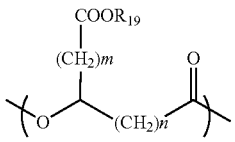
(19)

wherein $R_{19}$ represents hydrogen, or a group capable of forming a salt; n represents an integer selected from 0, 2, 3 and 4; m represents an integer selected from 2-8 in case n is 0, or an integer selected from 0-8 in case n is 2, 3 or 4; and, in case plural units are present, $R_{19}$, m and n have the aforementioned meanings independently for each unit.

According to a further aspect of the present invention, there is provided a method for producing a polyhydroxyalkanoate comprising a unit represented by a chemical formula (1), comprised of a step of executing a condensation reaction of a polyhydroxyalkanoate comprising a unit represented by a chemical formula (20) and an amine compound represented by a chemical formula (21):

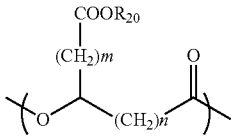
(20)

wherein $R_{20}$ represents hydrogen, or a group capable of forming a salt; n represents an integer selected from 0-4; m represents an integer selected from 0-8 in case n is 0, 2, 3 or 4, or m is 0 in case n is 1; and, in case plural units are present, m and n and $R_{20}$ have the aforementioned meanings independently for each unit;

$H_2N-A_3-SO_2R_{21}$ (21)

wherein $R_{21}$ represents OH, a halogen atom, ONa, OK or $OR_{21a}$; $R_{21a}$ and $A_3$ each independently is selected from a group having a substituted or unsubstituted aliphatic hydrocarbon structure, a substituted or unsubstituted aromatic ring structure, or a substituted or unsubstituted heterocyclic structure; and, in case plural units are present, $R_{21}$, $R_{21a}$ and $A_3$ have the aforementioned meanings independently for each unit;

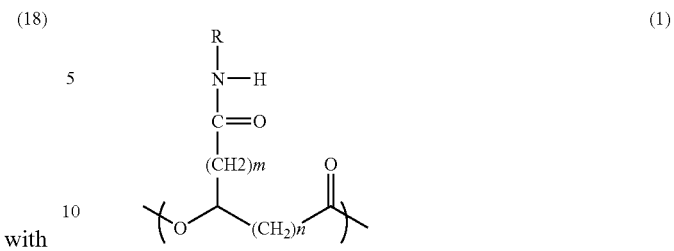
(1)

wherein R represents $-A_1-SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure, or a substituted or unsubstituted heterocyclic structure; n represents an integer selected from 0 to 4; m represents an integer selected from 0-8 in case n is 0, 2, 3 or 4, and m represents 0 in case n is 1; and in case plural units are present, R, $R_1$, $R_{1a}$, $A_1$, m and n have the aforementioned meanings independently for each unit.

According to a further aspect of the present invention, there is provided a compound represented by a chemical formula (8):

(8)

wherein $R_8$ represents a linear or branched alkylene 1-11 carbon atoms, or alkyleneoxyalkylene group with (each alkylene group being independently with 1-2 carbon atoms), a linear or branched alkenyl group with 1-11 carbon atoms or an alkylidene group with 1-5 carbon atoms which is unsubstituted or substituted with an aryl group; and m represents an integer selected from 2-8.

According to a further aspect of the present invention, there is provided a compound represented by a chemical formula (14):

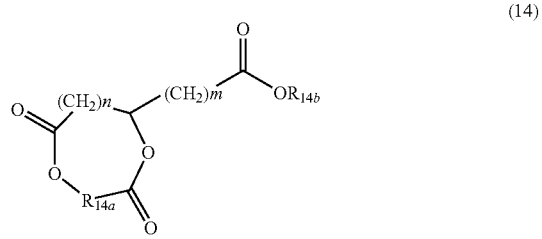
(14)

wherein $R_{14a}$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; $R_{14b}$ represents a linear or branched alkyl group with 1-12 carbon atoms or an aralkyl group; n represents an integer selected from 0, 2, 3 and 4; m represents an integer selected from 2-8 in case n is 0 and an integer selected from 0-8 in case n is selected from 2-4.

According to a further aspect of the present invention, a method for producing a polyhydroxyalkanoate comprising a unit represented by a chemical formula (170), comprised of:

a step of reacting a polyhydroxyalkanoate comprising a unit represented by a chemical formula (168) with a base; and a step of reacting a compound obtained in the aforementioned step with a compound represented by a chemical formula (169):

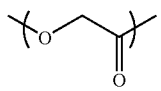
(168)

X(CH$_2$)$_m$COOR$_{169}$ (169)

wherein m represents an integer selected from 0-8; X represents a halogen atom; and R$_{169}$ represents a linear or branched alkyl group with 1-12 carbon atoms or an aralkyl group:

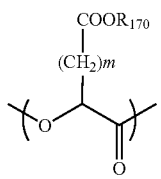
(170)

wherein m represents an integer selected from 0-8; R$_{170}$ represents a linear or branched alkyl group with 1-12 carbon atoms or an aralkyl group; and in case plural units are present, R$_{170}$ and m have the aforementioned meanings independently for each unit.

According to a further aspect of the present invention, there is provided a method for producing a polyhydroxyalkanoate comprising a unit represented by a chemical formula (172), comprised of:

a step of reacting a polyhydroxyalkanoate comprising a unit represented by a chemical formula (168) with a base; and a step of reacting a compound obtained in the aforementioned step with a compound represented by a chemical formula (171):

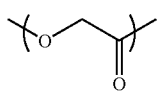
(168)

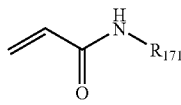
(171)

wherein R$_{171}$, represents -A$_{171}$-SO$_2$R$_{171a}$; R$_{171a}$ represents OH, a halogen atom, ONa, OK or OR$_{171b}$; R$_{171b}$ and A$_{171}$ each independently is selected from a group having a substituted or unsubstituted aliphatic hydrocarbon structure, a substituted or unsubstituted aromatic ring structure, or a substituted or unsubstituted heterocyclic structure; and in case plural units are present, R$_{171}$, R$_{171a}$, R$_{171b}$, and A$_{171}$ have the aforementioned meanings independently for each unit;

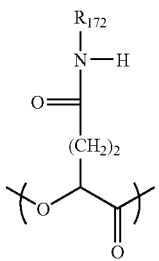
(172)

wherein R$_{172}$ represents -A$_{172}$-SO$_2$R$_{172a}$; R$_{172a}$ represents OH, a halogen atom, ONa, OK or OR$_{172b}$; R$_{172b}$ and A$_{172}$ each independently represents a group having a substituted or unsubstituted aliphatic hydrocarbon structure, a substituted or unsubstituted aromatic ring structure, or a substituted or unsubstituted heterocyclic structure; and in case plural units are present, R$_{172}$, R$_{172a}$, R$_{172b}$, and A$_{172}$ have the aforementioned meanings independently for each unit.

BEST MODE FOR CARRYING OUT THE INVENTION

The present invention will be clarified in the following. A polyhydroxyalkanoate represented by a chemical formula (1) and constituting the object of the invention can be produced by a reaction between a polyhydroxyalkanoate containing a unit represented by a chemical formula (20) to be employed as a starting material and at least an aminosulfonic acid represented by a chemical formula (21):

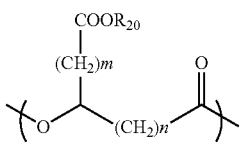
(20)

wherein R$_{20}$ represents hydrogen, or a group capable of forming a salt; n represents an integer selected from 0-4; m represents an integer selected from 0-8 in case n is 0, 2, 3 or 4, or m is 0 in case n is 1; and, in case plural units are present, m and n and R$_{20}$ have the aforementioned meanings independently for each unit:

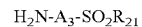

H$_2$N-A$_3$-SO$_2$R$_{21}$ (21)

wherein R$_{21}$ represents OH, a halogen atom, ONa, OK or OR$_{21a}$; R$_{21a}$ and A$_3$ each independently is selected from a group having a substituted or unsubstituted aliphatic hydrocarbon structure, a substituted or unsubstituted aromatic ring structure, or a substituted or unsubstituted heterocyclic structure; and, in case plural units are present, R$_{21}$, R$_{21a}$ and A$_3$ have the aforementioned meanings independently for each unit.

More specifically, R$_{21}$ is OH, a halogen atom, ONa, OK or OR$_{21a}$. R$_{23a}$ is a linear or branched alkyl group with 1-8 carbon atoms, or a substituted or unsubstituted phenyl group.

A$_3$ is preferably a linear or branched, substituted or unsubstituted alkylene group with 1-8 carbon atoms, a substituted or unsubstituted phenylene group, a substituted or unsubstituted naphthalene group, or a substituted or unsubstituted group having a heterocyclic structure comprising at least one of N, S and O. In case A$_3$ has a cyclic structure, an unsubstituted ring may be further condensed. In case plural units are present, $R_{21f}$, $R_{21a}$ and $A_3$ have the aforementioned meanings independently for each unit.

In case $A_3$ is a substituted or unsubstituted alkylene group, there can be employed an aminosulfonic acid represented by a chemical formula (26):

$$H_2N\text{-}A_4\text{-}SO_2R_{26} \qquad (26)$$

wherein $R_{26}$ represents OH, a halogen atom, ONa, OK or $OR_{26a}$; $R_{26a}$ represents a linear or branched alkyl group with 1-8 carbon atoms, or a substituted or unsubstituted phenyl group; $A_4$ represents a linear or branched, substituted or unsubstituted alkylene group with 1-8 carbon atoms, and in case substituted, it may be substituted with an alkyl group with 1-20 carbon atoms or an alkoxy group with 1-20 carbon atoms.

The compound represented by the chemical formula (26) can be 2-aminoethanesulfonic acid (taurin), 3-aminopropanesulfonic acid, 4-aminobutanesulfonic acid, 2-amino-2-methylpropane-sulfonic acid, or an alkali metal salt or an ester thereof.

In case $A_3$ is a substituted or unsubstituted phenylene group, there can be employed an aminosulfonic acid compound represented by a chemical formula (27):

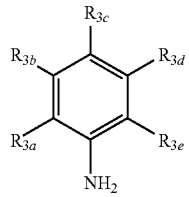
(27)

wherein $R_{3a}$, $R_{3b}$, $R_{3c}$, $R_{3d}$ and $R_{3e}$ each independently represents $SO_2R_{3f}$ ($R_{3f}$ representing OH, a halogen atom, ONa, OK or $OR_{3f1}$ ($R_{3f1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$ ($R_{3g}$ representing a H atom, a Na atom or a K atom), an acetamide group, an OPh group, a NHPh group, a $CF_3$ group, a $C_2F_5$ group or a $C_3F_7$ group (Ph indicating a phenyl group), of which at least one is $SO_2R_{3f}$; and in case plural units are present, $R_{3a}$, $R_{3b}$, $R_{3c}$, $R_{3d}$, $R_{3e}$, $R_{3f}$, $R_{3f1}$, and $R_{3g}$, have the aforementioned meanings independently for each unit.

By using the compound represented by the chemical formula (27), polyhydroxyalkanoate which contains in a molecule one or more units represented by the chemical formula (3) can be obtained.

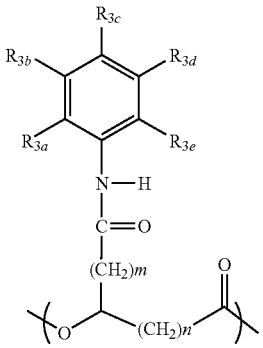
(3)

wherein $R_{3a}$, $R_{3b}$, $R_{3c}$, $R_{3d}$, $R_{3e}$, n and m, and $R_{3f}$, $R_{3f1}$ and $R_{3g}$ described in the chemical formula (27) have the aforementioned meanings; n represents an integer selected from 0-4; m represents an integer selected from 0-8 in case n is 0, 2, 3 or 4, or m is 0 in case n is 1; and in case plural units are present, $R_{3a}$, $R_{3b}$, $R_{3c}$, $R_{3d}$, $R_{3e}$, $R_{3f}$, $R_{3f1}$, $R_{3g}$, n and m have the aforementioned meanings independently for each unit.

The compound represented by the chemical formula (27) can be p-aminobenzenesulfonic acid (sulfanylic acid), m-aminobenzenesulfonic acid, o-aminobenzenesulfonic acid, m-toluidine-4-sulfonic acid, o-toluidine-4-sulfonic acid sodium salt, p-toluidine-2-sulfonic acid, 4-methoxyaniline-2-sulfonic acid, o-anisidine-5-sulfonic acid, p-anisidine-3-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, 2,4-dimethylaniline-5-sulfonic acid sodium salt, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, 4-carboxyaniline-6-sulfonic acid, or an alkali metal salt or an ester thereof.

In case $A_3$ is a substituted or unsubstituted naphthalene group, there can be employed an aminosulfonic acid compound represented by a chemical formula (28A) or (28B):

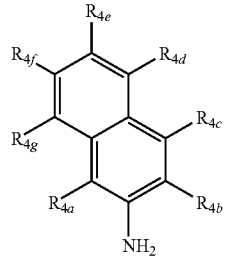
(28A)

wherein $R_{4a}$, $R_{4b}$, $R_{4c}$, $R_{4d}$, $R_{4e}$, $R_{4f}$ and $R_{4g}$ each independently represents $SO_2R_{4o}$ ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$.

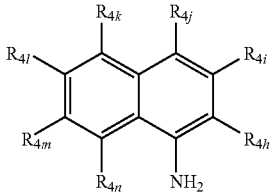
(28B)

wherein $R_{4h}$, $R_{4i}$, $R_{4j}$, $R_{4k}$, $R_{4l}$, $R_{4m}$ and $R_{4n}$ each independently represents $SO_2R_{4o}$ ($R_{4o}$ representing OH, a halogen atom, ONa, OK or $OR_{4o1}$ ($R_{4o1}$ representing a linear or branched alkyl group with 1 to 8 carbon atoms or a substituted or unsubstituted phenyl group)), a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$ ($R_{4p}$ representing a H atom, a Na atom or a K atom), an acetamide group, an OPh group, an NHPh group, a $CF_3$ group, a $C_2F_5$ group or a $C_3F_7$ group (Ph indicating a phenyl group), of which at least one is $SO_2R_{4o}$.

Polyhydroxyalkanoate which contains one or more units represented by the chemical formula (4A) or (4B) in a molecule can be obtained by using a compound represented by the chemical formula (28A) or (28B);

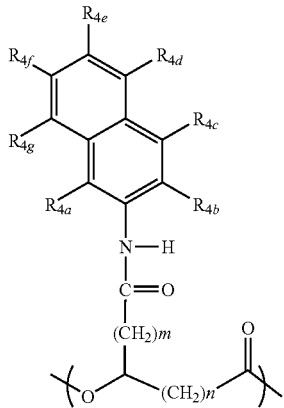

(4A)

wherein $R_{4a}$, $R_{4b}$, $R_{4c}$, $R_{4d}$, $R_{4e}$, $R_{4f}$, $R_{4g}$, n and m, and $R_{4o}$, $R_{4o1}$ and $R_{4p}$ described in the chemical formula (28A) have the aforementioned meanings; n represents an integer selected from 0-4; m represents an integer selected from 0-8 in case n is 0, 2, 3 or 4, or m is 0 in case n is 1; and in case plural units are present, $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, n and m have the aforementioned meanings independently for each unit.

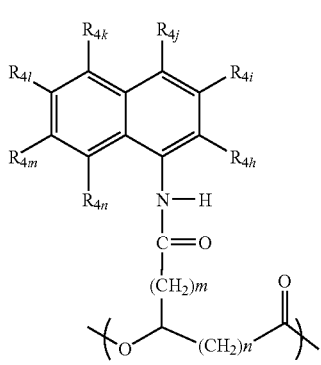

(4B)

wherein $R_{4h}$, $R_{4i}$, $R_{4j}$, $R_{4k}$, $R_{4l}$, $R_{4m}$, $R_{4n}$, n and m, and $R_{4o}$, $R_{4o1}$ and $R_{4p}$ described in the chemical formula (28B) have the aforementioned meanings; n represents an integer selected from 0-4; m represents an integer selected from 0-8 in case n is 0, 2, 3 or 4, or m is 0 in case n is 1; and in case plural units are present, $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, n and m have the aforementioned meanings independently for each unit.

The compound represented by the chemical formula (28A) or (28B) can be 1-naphthylamine-5-sulfonic acid, 1-naphthylamine-4-sulfonic acid, 1-naphthylamine-8-sulfonic acid, 2-naphthylamine-5-sulfonic acid, 1-naphthylamine-6-sulfonic acid, 1-naphthylamine-7-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid monosodium salt, 1-amino-8-naphthol-3,6-sulfonic acid monosodium salt, or an alkali metal salt or ester thereof.

In case $A_3$ represents a substituted or unsubstituted group having a heterocyclic structure comprising at least one of N, S and O, the heterocycle may be any of a pyridine ring, a piperazine ring, a furan ring and a thiol ring. The compound can be 2-aminopyridine-6-sulfonic acid or 2-aminopiperazine-6-sulfonic acid, or an alkali metal salt or ester thereof.

In case of a sulfonic acid ester, a group in an ester bonding with the sulfonic acid can be, as described above, a substituted or unsubstituted aliphatic hydrocarbon structure, a substituted or unsubstituted aromatic ring structure, or a substituted or unsubstituted heterocyclic structure. Also there is preferred a linear or branched alkyl group with 1-8 carbon atoms, or a substituted or unsubstituted phenyl group. In consideration for example of ease of esterification, there is further preferred $OCH_3$, $OC_2H_5$, $OC_6H_5$, $OC_3H_7$, $OC_4H_9$, $OCH(CH_3)_2$, $OCH_2C(CH_3)_3$, or $OC(CH_3)_3$.

(Producing Method for Polyhydroxyalkanoate Represented by Chemical Formula (1))

Now a reaction of the invention between a polyhydroxyalkanoate comprising a unit represented by the chemical formula (20) and the aminosulfonic acid compound represented by the chemical formula (21) will be explained in detail. In the invention, the compound of the chemical formula (21) is employed, with respect to the unit of the chemical formula (20) employed as the starting material, in an amount of 0.1-50.0 times in moles, preferably 1.0-20.0 times in moles.

In the invention, an amide bond may be formed from a carboxylic acid and an amine for example by a condensation reaction by a dehydration under heating. Particularly in consideration of a mild reaction condition not causing a cleavage of an ester bond in the main polymer chain, there is effectively employed a method of activating a carboxylic acid portion with an activator to generate an active acyl intermediate, and then executing a reaction with an amine. The active acyl intermediate can be an acid halide, an acid anhydride or an active ester. In particular, a method of utilizing a condensing agent to form an amide bond within a same reaction environment for simplifying the production process. It is also possible, if necessary, to once isolate an acid halide and then to execute a condensation reaction with an amine.

The condensing agent to be employed can be suitably selected for example from a phosphoric acid-based condensing agent employed in a polycondensation of an aromatic polyamide, a carbodiimide-based condensing agent employed in a peptide synthesis and an acid chloride-based condensing agent, depending on the compound of the chemical formula (21) and the polyhydroxyalkanoate having the unit shown in the chemical formula (20).

The phosphoric acid-based condensing agent can be a phosphite-based condensing agent, a phosphoric chloride-based condensing agent, a phosphoric anhydride-based condensing agent, a phosphoric ester-based condensing agent, or a phosphoric amide-based condensing agent. In the reaction of the invention, a condensing agent such as a phosphite ester. The phosphite ester to be employed can be, for example, triphenyl phosphite, diphenyl phosphite, tri-o-tolyl phosphite, tri-o-tolyl phosphite, tri-m-tolyl phosphite, di-m-tolyl phosphite, tri-p-tolyl phosphite, di-p-tolyl phosphite, di-o-chlorophenyl phosphite, tri-p-chloropyenyl phosphite, di-p-chlorophenyl phosphite, trimethyl phosphite, or triethyl phosphite, among which triphenyl phosphite is employed preferably. Also for improving a solubility and a reactivity of polymer, a metal salt such as lithium chloride or calcium chloride may be added.

The carbodiimide condensing agent can be dicyclohexyl carbodiimide (DCC), N-ethyl-N'-3-dimethylaminopropyl carbodiimide (EDC=WCSI), or diisopropyl carbodiimide (DIPC). DCC or WSCI may be employed in combination with N-hydroxysuccinimide (HONSu), 1-hydroxybenzotriazole (HOBt), or 3-hydroxy-4-oxo-3,4-dihydro-1,2,3-benzotriazole (HOObt).

The condensing agent is employed in an amount within a range of 0.1-50 times in moles, preferably 1-20 moles with respect to the unit represented by the chemical formula (20).

The reaction of the invention may employ a solvent if necessary. The solvent to be employed can be a hydrocarbon such as hexane, cyclohexane and heptane; a ketone such as acetone and methyl ethyl ketone; an ether such as dimethyl ether, diethyl ether and tetrahydrofuran; a halogenated hydrocarbon such as dichloromethane, chloroform, carbon tetrachloride, dichloroethane and trichloroethane; an aromatic hydrocarbon such as benzene and toluene; a non-protonic polar solvent such as N,N-dimethylformamide, dimethylsulfoxide, dimethylacetamide, or hexamethylphosphoramide; a pyridine derivative such as pyridine and picoline; or N-methylpyrrolidone. Particularly preferably there is employed pyridine or N-methylpyrrolidone. An amount of the solvent may be suitable determined according to a starting material, a type of base, reaction conditions and the like. In the method of the invention, a reaction temperature is not particularly restricted, but is usually within a range from −20° C. to a boiling temperature of the solvent. However the reaction is desirably executed at an optimum temperature matching the condensing agent to be employed.

In the method of the invention, a reaction time is usually within a range of 1-48 hours, preferably 1-10 hours.

In the invention, a desired polyhydroxyalkanoate can be recovered and purified by an ordinary method such as a distillation, from a reaction liquid containing thus generated polyhydroxyalkanoate having the unit represented in the chemical formula (1). Otherwise, the desired polyhydroxyalkanoate indicated by the chemical formula (1) can be recovered by precipitation by uniformly mixing the reaction liquid with a solvent for example water, an alcohol such as methanol or ethanol, or an ether such as dimethyl ether, diethyl ether or tetrahydrofuran. If necessary, polyhydroxyalkanoate having the unit represented by the chemical formula (1) may be isolated and purified. Such isolation and purification are not particularly restricted, and may be executed for example by a precipitation with a solvent in which polyhydroxyalkanoate is insoluble, a column chromatography, or a dialysis.

Another producing method of the present invention, in case a portion R in the chemical formula (1) is -A$_1$-SO$_3$H, executes, after a condensation reaction with amine, a methyl esterification with a methyl esterifying agent to change the portion R in the chemical formula (1) into -A$_1$-SO$_3$CH$_3$. The methyl esterifying agent can be that employed in a methyl esterification of a fatty acid in a gas chromatography analysis. The methyl esterification can be executed by an acid catalyst method such as a hydrochloric acid-methanol method, a boron trifluoride-methanol method and a sulfuric acid-methanol method, or a base catalyst method such as a sodium methoxide method, a tetramethyl guanidine method and a trimethylsilyl diazomethane method. Among these, the trimethylsilyl diazomethane method is preferred as the methylation can be achieved under a mild condition.

The solvent to be employed in the reaction of the invention can be a hydrocarbon such as hexane, cyclohexane or heptane; an alcohol such as methanol or ethanol; a halogenated hydrocarbon such as dichloromethane, chloroform, carbon tetrachloride, dichloroethane or trichloroethane; or an aromatic hydrocarbon such as benzene or toluene, particularly preferably a halogenated hydrocarbon. An amount of the solvent may be suitable determined according to a starting material, reaction conditions and the like. In the method of the invention, a reaction temperature is not particularly restricted, but is usually within a range from −20° C. to 30° C. However the reaction is desirably executed at an optimum temperature matching the condensing agent and the reagents to be employed.

Polyhydroxyalkanoate having a unit represented by a chemical formula (172), included in the chemical formula (1) of the invention, can be produced by a step of reacting a polyhydroxyalkanoate having a unit represented by a chemical formula (168) as a starting material with a base, and a step of reacting a compound, obtained in the aforementioned step, with a compound represented by a chemical formula (171).

The compound represented by a chemical formula (171) can be 2-acrylamide-2-methylpropanesulfonic acid, an alkali metal salt or an ester thereof.

Now there will be explained the reaction between polyhydroxyalkanoate having a unit represented by the chemical formula (168) and the compound represented by the chemical formula (171).

The present invention can be achieved by executing a Michael addition reaction of the compound represented by the chemical formula (171) with an α-methylene group adjacent to a carbonyl group in the polymer main chain. More specifically, under a reaction condition of Michael reaction, a polyhydroxyalkanoate having a unit represented by the chemical formula (168) is reacted with a base capable of forming an anion in the α-methylene group adjacent to a carbonyl group in the polymer main chain of the polyhydroxyalkanoate having the unit represented by the chemical formula (168), and then with the compound represented by the chemical formula (171). In the invention, the compound represented by the chemical formula (171) is employed in an amount of 0.001-100 times in moles, preferably 0.01-10 times in moles, with respect to the unit represented by the chemical formula (168).

A solvent in the reaction of the invention is not particularly restricted as long as it is inert to the reaction and is capable of dissolving the starting material to a certain extent, but can be an aliphatic hydrocarbon such as hexane, cyclohexane, heptane, ligroin and petroleum ether; an aromatic hydrocarbon such as benzene, toluene and xylene; an ether such as diethyl ether, diisopropyl ether, tetrahydrofuran, dioxane, dimethoxyethane and diethylene glycol dimethyl ether; or an amide such as formamide, N,N-dimethylformamide, N,N-dimethylacetamide, N-methyl-2-pyrrolidone, N-methylpyrrolidone and hexamethyl phosphorotriamide, preferably tetrahydrofuran.

The reaction is executed in the presence of a base. The base to be employed can be an alkyl lithium such as methyl lithium and butyl lithium; an alkali metal disilazide such as lithium hexamethyl disilazide, sodium hexamethyl disilazide and potassium hexamethyl disilazide; or a lithium amide such as lithium diisopropylamide and lithium dicyclohexaylamide, preferably lithium diisopropylamide. In the invention, the base is employed in an amount of 0.001-100 times in moles, preferably 0.01-10 times in moles, with respect to the unit represented by the chemical formula (168).

In the method of the invention, a reaction temperature is usually −78° C. to 40° C., preferably −78° C. to 30° C.

In the method of the invention, a reaction time is usually within a range of 10 minutes to 24 hours, preferably 10 minutes to 4 hours.

On the other hand, in the polyhydroxyalkanoate having a unit represented by the chemical formula (5) of the invention, a polyhydroxyalkanoate having a unit represented by a chemical formula (29) can be produced by a method of employing a polyhydroxyalkanoate having a unit represented by a chemical formula (30) as a starting material and oxidizing a double bond portion of a side chain of such polyhydroxyalkanoate, a method of employing a polyhydroxyalkanoate having a unit represented by a chemical formula (31) and hydrolyzing a side chain ester portion thereof in the presence of an acid or an alkali, or by executing a hydrogenolysis method comprising a catalytic reduction thereof:

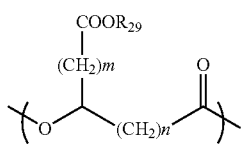

(29)

wherein $R_{29}$ represents hydrogen, or a group capable of forming a salt; m represents an integer selected from 3-8; n is 0; and in case plural units are present, $R_{29}$, m and n have the aforementioned meanings independently for each unit;

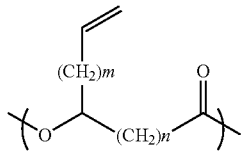

(30)

wherein m represents an integer selected from 3-8; n is 0; and in case plural units are present, m and n have the aforementioned meanings independently for each unit;

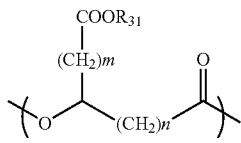

(31)

wherein $R_{31}$ represents a linear or branched alkyl with 1-12 carbon atoms or an aralkyl group; m represents an integer selected from 3-8; n is 0; and in case plural units are present, $R_{31}$, m and n have the aforementioned meanings independently for each unit.

Also in the polyhydroxyalkanoate having a unit represented by the chemical formula (5) of the invention; a polyhydroxyalkanoate having a unit represented by a chemical formula (32) can be produced by a method of employing a polyhydroxyalkanoate having a unit represented by a chemical formula (33) as a starting material and oxidizing a double bond portion of a side chain of such polyhydroxyalkanoate, a method of employing a polyhydroxyalkanoate having a unit represented by a chemical formula (34) and hydrolyzing a side chain ester portion thereof in the presence of an acid or an alkali, or by executing a hydrogenolysis comprising a catalytic reduction thereof:

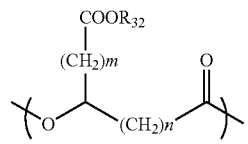

(32)

wherein $R_{32}$ represents hydrogen, or a group capable of forming a salt; m represents an integer selected from 0-8; n represents an integer selected from 2-4; and in case plural units are present, $R_{32}$, m and n have the aforementioned meanings independently for each unit;

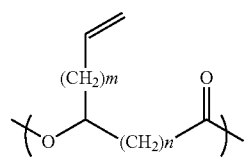

(33)

wherein m represents an integer selected from 0-8; n represents an integer selected from 2-4; and in case plural units are present, m and n have the aforementioned meanings independently for each unit;

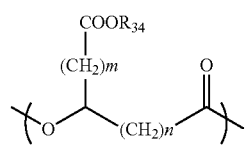

(34)

wherein $R_{34}$ represents a linear or branched alkyl with 1-12 carbon atoms or an aralkyl group; m represents an integer selected from 0-8; n represents an integer selected from 2-4; and in case plural units are present, $R_{34}$, m and n have the aforementioned meanings independently for each unit.

(Producing Method for Polyhydroxyalkanoate Represented by Chemical Formulas (29) and (32))

In the following there will be explained a method of the invention for producing a polyhydroxyalkanoate having a unit represented by a chemical formula (29) by an oxidation reaction of a polyhydroxyalkanoate having a unit represented by a chemical formula (30), and a method for producing a polyhydroxyalkanoate having a unit represented by a chemical formula (32) by an oxidation reaction of a polyhydroxyalkanoate having a unit represented by a chemical formula (33).

For obtaining a carboxylic acid by an oxidative cleavage of a carbon-carbon double bond with an oxidant, there are known, for example, a method of utilizing a permanganate salt (J. Chem. Soc., Perkin. Trans., 1, 806 (1973)), a method of utilizing a bichromate salt (Org. Synth., 4, 698 (1963)), a method of utilizing a periodate salt (J. Org. Chem., 46, 19 (1981), a method of utilizing nitric acid (Japanese Patent Application Laid-open No. S59-190945), and a method of utilizing ozone (J. Am. Chem. Soc., 81, 4273 (1959)). Also, Comptes Rendus de l' Academie des Sciences-Series IIC-Chemistry, 4, 289-293 (2001), discloses a method of reacting a terminal carbon-carbon double bond in a side chain of a polyhydroxyalkanoate produced by microorganisms with potassium permanganate as an oxidant under acidic conditions to obtain a carboxylic acid. Similar methods can also be employed in the invention.

Potassium permanganate is generally employed as permanganate salt as an oxidant. Since the oxidative cleavage reaction is a stoichiometric reaction, an amount of the permanganate salt is usually 1 mole equivalent or larger, preferably 2-10 mole equivalents with respect to 1 mole of the unit represented by the chemical formula (30) or (33).

For obtaining a reaction system of an acidic condition, an inorganic acid or an organic acid such as sulfuric acid, hydrochloric acid, acetic acid or nitric acid is employed. However, sulfuric acid, nitric acid or hydrochloric acid may cause a cleavage of an ester bond in the main chain, thereby resulting in a decrease in the molecular weight. An amount of acid is usually 0.2-2000 mole equivalents, preferably 0.4-1000 mole equivalents with respect to 1 mole of the unit represented by the chemical formula (30) or (33). An amount of 0.2 mole equivalents or larger provides a preferable yield while an amount of 2000 mole equivalents or less can reduce decomposition by-products by the acid, so that the aforementioned range is preferable. Also a crown ether may be employed for accelerating the reaction. In such case, the crown ether and permanganate salt form a complex to provide an increased reactivity. As the crown ether, there is usually employed dibenzo-18-crown-6-ether, dicyclo-18-crown-6-ether, or 18-crown-6-ether. An amount of the crown ether is usually 0.005-2.0 mole equivalents, preferably 0.01-1.5 mole equivalents with respect to 1 mole of permanganate salt.

The solvent in the oxidation reaction of the invention is not particularly restricted as long as it is inert to the reaction, and can be, for example, water, acetone, an ether such as tetrahydrofuran and dioxane; an aromatic hydrocarbon such as benzene, an aliphatic hydrocarbon such as hexane and heptane; or a halogenated hydrocarbon such as methyl chloride, dichloromethane and chloroform. Among these, in consideration of the solubility of polyhydroxyalkanoate, there is preferred a halogenated hydrocarbon such as methyl chloride, dichloromethane and chloroform, and acetone.

In the oxidation reaction of the invention, the polyhydroxyalkanoate containing a unit represented by the chemical formula (30) or (33), the permanganate salt and the acid may be reacted by collectively charging together with the solvent from the beginning, or may be reacted by respective additions in continuous or intermittent manner. The reaction may also be executed by dissolving or suspending the permanganate salt only in the solvent and adding the polyhydroxyalkanoate and the acid continuously or intermittently to the system, or by dissolving or suspending the polyhydroxyalkanoate only in the solvent and adding the permanganate salt and the acid continuously or intermittently to the system. The reaction may further be executed by charging the polyhydroxyalkanoate and the acid and adding the permanganate salt continuously or intermittently to the system, or by charging the permanganate salt and the acid and adding the polyhydroxyalkanoate continuously or intermittently to the system, or charging the polyhydroxyalkanoate and the permanganate salt and adding the acid continuously or intermittently to the system.

A reaction temperature is usually −40 to 40° C., preferably −10 to 30° C. A reaction time depends on a stoichiometric ratio of the unit represented by the chemical formula (30) or (33) and permanganate salt, on the reaction temperature, but is normally selected within a range of 2 to 48 hours.

The aforementioned oxidation reaction can be applied to a preparation of a polyhydroxyalkanoate having a unit represented by a chemical formula (36) by an oxidation reaction from a polyhydroxyalkanoate having a unit represented by a chemical formula (35), and this constitutes a novel producing method of the invention:

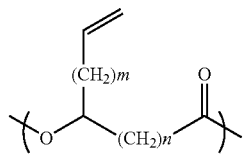
(35)

wherein m is 1 or 2; and n is 0:

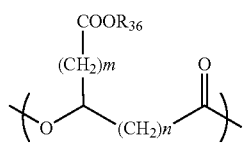
(36)

wherein $R_{36}$ is hydrogen or a group capable of forming a salt; m is 1 or 2; and n is 0.

In the following, there will be explained in detail a method of producing, from a polyhydroxyalkanoate having a unit represented by a chemical formula (31), a polyhydroxyalkanoate having a unit represented by a chemical formula (29) by a hydrolysis in the presence of an acid or an alkali or a hydrogenolysis comprising a catalytic reduction on a side chain ester portion, and a method of producing, from a polyhydroxyalkanoate having a unit represented by a chemical formula (34), a polyhydroxyalkanoate having a unit represented by a chemical formula (32) by a hydrolysis in the presence of an acid or an alkali or a hydrogenolysis comprising a catalytic reduction on a side chain ester portion.

In the method of hydrolysis in the presence of an acid or an alkali, there can be employed, in an aqueous solution or in a hydrophilic solvent such as methanol, ethanol, tetrahydrofuran, dioxane, dimethylformamide and dimethylsulfoxide, an aqueous solution of an inorganic acid such as hydrochloric acid, sulfuric acid, nitric acid and phosphoric acid, or an organic acid such as trifluoroacetic acid, trichloroacetic acid, p-toluenesulfonic acid and methanesulfonic acid, an aqueous solution of an aqueous caustic alkali such as sodium hydroxide and potassium hydroxide, or of an alkali carbonate such as sodium carbonate and potassium carbonate, or an alcohol solution of a metal alkoxide such as sodium methoxide and sodium ethoxide. A reaction temperature is usually 0 to 40° C., preferably 0 to 30° C. A reaction time is usually 0.5 to 48 hours. However a hydrolysis with any acid or alkali may cause a cleavage of the ester bond of the main chain, resulting in a decrease in the molecular weight.

Preparation of a carboxylic acid by hydrogenolysis comprising catalytic reduction is executed in the following manner. A catalytic reduction is executed by reacting hydrogen under a normal or elevated pressure in a suitable solvent and in the presence of a reduction catalyst, at a temperature within a range of −20° C. to the boiling point of the employed solvent, preferably 0 to 50° C. The solvent to be employed can be, for example, water, methanol, ethanol, propanol, hexafluoroisopropanol, ethyl acetate, diethyl ether, tetrahydrofuran, dioxane, benzene, toluene, dimethylformamide, pyridine, or N-methylpyrrolidone. Also a mixture of these may also be employed. The reduction catalyst can be a single catalyst or a catalyst carried on a carrier, such as of palladium, platinum and rhodium, or Raney nickel. A reaction time is usually 0.5 to 72 hours. A reaction liquid containing thus generated polyhydroxyalkanoate having a unit represented by the chemical formula (29) or (32) is subjected to a filtration for eliminating the catalyst and a solvent elimination for example by a distillation to recover a crude polymer. The obtained polyhydroxyalkanoate having a unit represented by the chemical formula (29) or (32) can be, if necessary, isolated and purified. Such isolation and purification are not particularly restricted, and may be executed for example by a re-precipitation with a solvent in which the polyhydroxyalkanoate having a unit represented by the chemical formula (29) or (32) is insoluble, a column chromatography, or a dialysis. However even a catalytic reduction may also cause a cleavage of the ester bond of the main chain, resulting in a decrease in the molecular weight.

Also in the polyhydroxyalkanoate having a unit represented by the chemical formula (5) of the invention, a polyhydroxyalkanoate having a unit represented by a chemical formula (37) can be produced by an esterification, employing a polyhydroxyalkanoate having a unit represented by a chemical formula (38) as a starting material and employing an estifying agent.

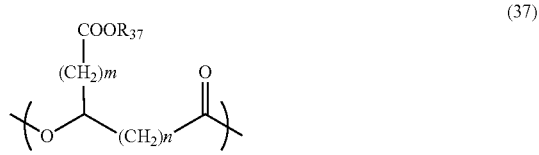

(37)

wherein $R_{37}$ represents a linear or branched alkyl with 1-12 carbon atoms, an aralkyl group or a substituent having a sugar; n represents an integer selected from 0, 2, 3, 4; m represents an integer selected from 2-8 in case n is 0, or an integer selected from 0-8 in case n is an integer selected from 2-4; and in case plural units are present, $R_{37}$, m and n have the aforementioned meanings independently for each unit:

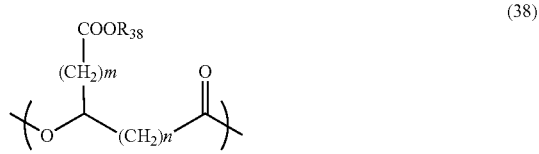

(38)

wherein $R_{38}$ represents hydrogen, or a group capable of forming a salt; n represents an integer selected from 0, 2, 3, 4; m represents an integer selected from 2-8 in case n is 0, or an integer selected from 0-8 in case n is an integer selected from 2-4; and in case plural units are present, $R_{38}$, m and n have the aforementioned meanings independently for each unit.

As the esterifying agent, diazomethane and a DMF dimethylacetal can be employed. For example, a polyhydroxyalkanoate having a unit represented by a chemical formula (38) easily reacts with trimethylsilyldiazomethane, DMF dimethyl acetal, DMF diethylacetal, DMF dipropylacetal, DMF-t-butylacetal or DMF dineopentylacetal to provide a corresponding ester. Also an esterified polyhydroxyalkanoate can be obtained by a reaction, utilizing an acid catalyst or a condensing agent such as DCC, with an alcohol such as methanol, ethanol, propanol, isopropyl alcohol, butyl alcohol, sec-butyl alcohol, tert-butyl alcohol, pentyl alcohol, neopentyl alcohol, hexyl alcohol, heptyl alcohol, octyl alcohol, nonyl alcohol, decyl alcohol and lauryl alcohol, or with a sugar for introducing a sugar structure, such as D-glucose and D-fructose.

Also a polyhydroxyalkanoate having a unit represented by a chemical formula (170) can be produced by a step of reacting a polyhydroxyalkanoate having a unit represented by a chemical formula (168) as a starting material with a base, and a step of reacting a compound obtained in the aforementioned step with a compound represented by a chemical formula (169).

Examples of the compound represented by the chemical formula (169) include methyl chloroformate, ethyl chloroformate, propyl chloroformate, isopropyl chloroformate, butyl chloroformate, cyclohexyl chloroformate, benzyl chloroformate, methyl bromoformate, ethyl bromoformate, propyl bromoformate, isopropyl bromoformate, butyl bromoformate, cyclohexyl bromoformate, benzyl bromoformate, methyl chloroacetate, ethyl chloroacetate, propyl chloroacetate, isopropyl chloroacetate, butyl chloroacetate, cyclohexyl chloroacetate, benzyl chloroacetate, methyl bromoacetate, ethyl bromoacetate, propoyl bromoacetate, isopropyl bromoacetate, butyl bromoacetate, cyclohexyl-bromoacetate, benzyl bromoacetate, methyl 3-chloropropionate, ethyl 3-chloropropionate, propyl 3-chloropropionate, isopropyl 3-chloropropionate, butyl 3-chloropropionate, cyclohexyl 3-chloropropionate, benzyl 3-chloropropionate, methyl 3-bromopropionate, ethyl 3-bromopropionate, propyl 3-bromopropionate, isopropyl 3-bromopropionate, butyl 3-bromopropionate, cyclohexyl 3-bromopropionate, benzyl 3-bromopropionate, methyl 4-chlorobutyrate, ethyl 4-chlorobutyrate, propyl 4-chlorobutyrate, isopropyl 4-chlorobutyrate, butyl 4-chlorobutyrate, cyclohexyl 4-chlorobutyrate, benzyl 4-chlorobutyrate, methyl 4-bromobutyrate, ethyl 4-bromobutyrate, propyl 4-bromobutyrate, isopropyl 4-bromobutyrate, butyl 4-bromobutyrate, cyclohexyl 4-bromobutyrate, benzyl 4-bromobutyrate, methyl 5-chlorovalerate, ethyl 5-chlorovalerate, propyl 5-chlorovalerate, isopropyl 5-chlorovalerate, butyl 5-chlorovalerate, cyclohexyl 5-chlorovalerate, benzyl 5-chlorovalerate, methyl 5-bromovalerate, ethyl 5-bromovalerate, propyl 5-bromovalerate, isopropyl 5-bromovalerate, butyl 5-bromovalerate, cyclohexyl 5-bromovalerate, benzyl 5-bromovalerate, methyl 6-chlorohexanoate, ethyl 6-chlorohexanoate, propyl 6-chlorohexanoate, isopropyl 6-chlorohexanoate, butyl 6-chlorohexanoate, cyclohexyl 6-chlorohexanoate, benzyl 6-chlorohexanoate, methyl 6-bromohexanoate, ethyl 6-bromohexanoate, propyl 6-bromohexanoate, isopropyl 6-bromohexanoate, butyl 6-bromohexanoate, cyclohexyl 6-bromohexanoate, benzyl 6-bromohexanoate, methyl 7-chloroheptanoate, ethyl 7-chloroheptanoate, propyl 7-chloroheptanoate, isopropyl 7-chloroheptanoate, butyl 7-chliorheptanoate, cyclohexyl 7-chloroheptanoate, benzyl 7-chloroheptanoate, methyl 7-bromoheptanoate, ethyl 7-bromoheptanoate, propyl 7-bromoheptanoate, isopropyl 7-bromoheptanoate, butyl 7-bromoheptanoate, cyclohexyl 7-bromoheptanoate, benzyl 7-bromooctanoate, methyl 8-chlorooctanoate, ethyl 8-chlorooctanoate, propyl 8-chlorooctanoate, isopropyl 8-chlorooctanoate, butyl 8-chlorooctanoate, cyclohexyl 8-chlorooctanoate, benzyl 8-chlorooctanoate, methyl 8-bromooctanoate, ethyl 8-bromooctanoate, propyl 8-bromooctanoate, isopropyl 8-bromooctanoate, butyl 8-bromooctanoate, cyclohexyl 8-bromooctanoate, benzyl 8-bromooctanoate, methyl 9-chlorononanoate, ethyl 9-chlorononanoate, propyl 9-chlorononanoate, isopropyl 9-chlorononanoate, butyl 9-chlorononanoate, cyclohexyl 9-chlorononanoate, benzyl 9-chlorononanoate, methyl 9-bromononanoate, ethyl 9-bromononanoate, propyl 9-bromononanoate, isopropyl 9-bromononanoate, butyl 9-bromononanoate, cyclohexyl 9-bromononanoate, and benzyl 9-bromononanoate.

Now there will be explained the reaction between polyhydroxyalkanoate having a unit represented by the chemical formula (168) and the compound represented by the chemical formula (169).

The present invention can be achieved by executing an addition reaction of the compound represented by the chemical formula (169) with an α-methylene group adjacent to a carbonyl group in the polymer main chain. More specifically, under a condition of addition reaction, a polyhydroxyalkanoate having a unit represented by the chemical formula (168) is reacted with a base capable of forming an anion in the α-methylene group adjacent to a carbonyl group in the polymer main chain of the polyhydroxyalkanoate having the unit represented by the chemical formula (168), and the compound represented by the chemical formula (169) is then reacted. In the invention, the compound represented by the chemical formula (169) is employed in an amount of 0.001-100 times in moles, preferably 0.01-10 times in moles, with respect to the unit represented by the chemical formula (168).

A solvent in the reaction of the invention is not particularly restricted as long as it is inert to the reaction and is capable of dissolving the starting material to a certain extent, but can be an aliphatic hydrocarbon such as hexane, cyclohexane, heptane, ligroin or petroleum ether; an aromatic hydrocarbon such as benzene, toluene or xylene; an ether such as diethyl ether, diisopropyl ether, tetrahydrofuran, dioxane, dimethoxyethane or diethylene glycol dimethyl ether; or an amide such as formamide, N,N-dimethylformamide, N,N-dimethylacetamide, N-methyl-2-pyrrolidone, N-methylpyrrolidone or hexamethyl phosphorotriamide, preferably tetrahydrofuran.

The reaction is executed in the presence of a base. The base to be employed can be an alkyl lithium such as methyl lithium and butyl lithium; an alkali metal disilazide such as lithium hexamethyl disilazide, sodium hexamethyl disilazide and potassium hexamethyl disilazide; or a lithium amide such as lithium diisopropylamide or lithium dicyclohexylamine, preferably lithium diisopropylamide. In the invention, the base is employed in an amount of 0.001-100 times in moles, preferably 0.01-10 times in moles, with respect to the unit represented by the chemical formula (168).

In the method of the invention, a reaction temperature is usually −78° C. to 40° C., preferably −78° C. to 30° C.

In the method of the invention, a reaction time is usually within a range of 10 minutes to 24 hours, preferably 10 minutes to 4 hours.

In the method of the invention, among the chemical formula (172), a compound of a chemical formula (176) included in the chemical formula (5) includes the novel compounds of the invention and the method for producing such novel compounds. A chemical formula (177) includes the novel producing method of the invention:

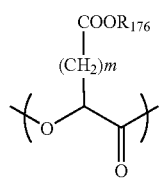

(176)

wherein m represents an integer selected from 2-8; $R_{176}$ represents a linear or branched alkyl group with 1-12 carbon atoms, or an aralkyl group; and in case plural units are present, $R_{176}$ and m have the aforementioned meanings independently for each unit:

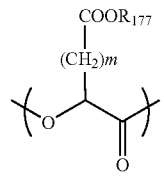

(177)

wherein m represents an integer selected from 0-1; $R_{177}$ represents a linear or branched alkyl group with 1-12 carbon atoms, or an aralkyl group; and in case plural units are present, $R_{177}$ and m have the aforementioned meanings independently for each unit.

(Producing Method for Polyhydroxyalkanoate Having a Unit Represented by Chemical Formula (6))

(A) Producing method for obtaining polyhydroxyalkanoate having a unit represented by a chemical formula (6) from a cyclic diester In the polyhydroxyalkanoate having a unit represented by the chemical formula (6) of the invention, a polyhydroxyalkanoate having a unit represented by a chemical formula (39) can be produced by polymerizing a compound represented by a chemical formula (8) or a compound represented by a chemical formula (10) in the presence of a catalyst:

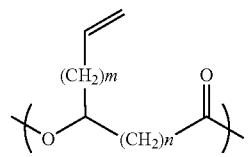

(39)

wherein m represents an integer selected from 2-8; n represents 0; and in case plural units are present, m and n have the aforementioned meanings independently for each unit:

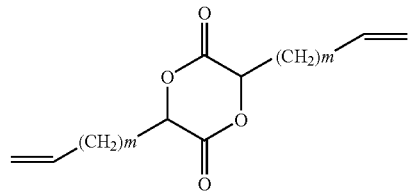

(10)

wherein m represents an integer selected from 2-8.

The compound represented by the chemical formula (10) is a novel compound in the invention. In the following, there will be explained a synthesizing method for the compound (10) which is one of the compounds contained in the novel compounds (8) of the invention.

(a) Producing Method of Novel Intramolecular Cyclic Diester

A compound, which is one of the novel compounds (10) and is represented by a chemical formula (40) with m=2:

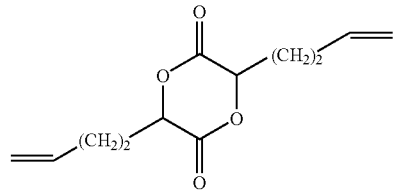

(40)

can be obtained by a dehydration condensation of 2-hydroxy-5-hexenoic acid represented by a chemical formula (41):

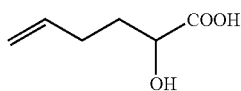
(41)

The compound represented by the chemical formula (40) can be obtained, for example, in a reactor equipped with a Dean-Stark trap, by subjecting the compound (41) and a catalyst promoting a dehydration condensation such as p-toluenesulfonic acid to an azeotropic dehydration in toluene and under a nitrogen atmosphere for 24 hours or more and suitably removing the water accumulated in the Dean-Stark trap.

Also compounds represented by a chemical formula (42) may be employed in a similar synthesizing method to obtain corresponding compounds of the chemical formula (10) with m=3-8.

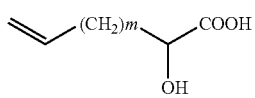
(42)

(m = 3 - 8)

An intramolecular cyclic diester, which is thus produced novel compound (8), can be employed into a step of producing a polyester having a unit represented by the chemical formula (39).

(b) Polyester Producing Method Utilizing Intramolecular Cyclic Diester

Preparation of a polyester having a unit represented by the chemical formula (39), utilizing the intramolecular cyclic diester which is the novel compound (8) of the invention, is not particularly restricted in a polymerization method, and there can be employed, for example, a solution polymerization method, a slurry polymerization method, or a mass polymerization method. Also a polymerization solvent, if employed, is not particularly restricted and can be, for example, an inert solvent such as an aliphatic or cyclic hydrocarbon with 5-18 carbon atoms or an aromatic hydrocarbon with 6-20 carbon atoms, tetrahydrofuran, chloroform, o-dichlorobenzene or dioxane.

In the invention, a catalyst to be employed in the polymerization can be a known ring-opening polymerization catalyst, such as tin dichloride, tin tetrachloride, stannous fluoride, stannous acetate, stannous stearate, stannous octanoate, stannous oxide, stannic oxide or another tin salt. There can also be employed triethoxy aluminum, tri-n-propoxy aluminum, tri-iso-propoxy aluminum, tri-n-butoxy aluminum, tri-iso-butoxy aluminum, aluminum chloride, di-iso-propyl zinc, dimethyl zinc, diethyl zinc, zinc chloride, tetra-n-propoxy titanium, tetra-n-butoxy titanium, tetra-t-butoxy titanium, antimony trifluoride, lead oxide, lead stearate, titanium tetrachloride, boron trifluoride, boron trifluoride ether complex, triethylamine, or tributylamine. Such catalyst is employed in an amount of 0.0001-10 wt. %, preferably 0.001-5 wt. % with respect to the total amount of the monomer compound.

In the ring-opening polymerization of the invention, a known polymerization initiator may be employed. More specifically, there can be employed an aliphatic alcohol, which can be monohydric, dihydric or polyhydric, or saturated or unsaturated. Specific examples include a monohydric alcohol such as methanol, ethanol, propanol, butanol, pentanol, hexanol, heptanol, nonanol, decanol, lauryl alcohol, myristyl alcohol, cetyl alcohol, stearyl alcohol, p-tert-butylbenzyl alcohol, a dihydric alcohol such as ethylene glycol, butanediol, hexanediol, nonanediol, or tetramethylene glycol, a polyhydric alcohol such as glycerol, sorbitol, xylitol, ribitol or erythritol, methyl lactate and ethyl lactate. Such aliphatic alcohol is usually employed in a proportion of 0.01-10 wt. % with respect to the total amount of the monomer, though a certain difference exists by the type of alcohol to be employed.

In the invention, a temperature of the ring-opening polymerization reaction is, in consideration of a polymer generating rate and a thermal decomposition temperature of the generated polymer, 100-200° C., preferably 120-180° C.

In the invention, the ring-opening polymerization reaction may be executed in an inert atmosphere such as nitrogen or argon, or under a reduced or increased pressure, and the catalyst and the alcohol may be added in succession.

(B) Producing Method for Obtaining Polyhydroxyalkanoate Having a Unit Represented by a Chemical Formula (6) from an Intramolecular Ring-Closed Compound of ω-Hydroxycarboxylic Acid In the polyhydroxyalkanoate having a unit represented by the chemical formula (6) of the invention, a polyhydroxyalkanoate having a unit represented by a chemical formula (43) can be produced by polymerizing an intramolecular ring-closed compound represented by a chemical formula (12) in the presence of a catalyst:

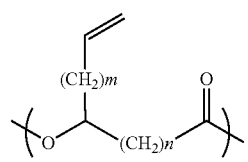
(43)

wherein n represents an integer selected from 2-4; m represents an integer selected from 0-8 in case n represents 2 or 3, or an integer selected from 0 and 2-8 in case n is 4; and in case plural units are present, m and n have the aforementioned meanings independently for each unit.

Preparation of a polyester having a unit represented by the chemical formula (43), utilizing the intramolecular ring-closed compound of ω-hydroxycarboxylic acid represented by the chemical formula (12) of the invention, is not particularly restricted in a polymerization method, and there can be employed, for example, a solution polymerization method, a slurry polymerization method, or a mass polymerization method. Also a polymerization solvent, if employed, is not particularly restricted and can be, for example, an inert solvent such as an aliphatic or cyclic hydrocarbon with 5-18 carbon atoms or an aromatic hydrocarbon with 6-20 carbon atoms, tetrahydrofuran, chloroform, o-dichlorobenzene or dioxane.

In the invention, a catalyst to be employed in the polymerization can be a known ring-opening polymerization catalyst, such as tin dichloride, tin tetrachloride, stannous fluoride, stannous acetate, stannous stearate, stannous octanoate, stannous oxide, stannic oxide or another tin salt. There can also be employed triethoxy aluminum, tri-n-propoxy aluminum, triiso-propoxy aluminum, tri-n-butoxy aluminum, tri-iso-butoxy aluminum, aluminum chloride, di-iso-propyl zinc, dimethyl zinc, diethyl zinc, zinc chloride, tetra-n-propoxy titanium, tetra-n-butoxy titanium, tetra-t-butoxy titanium, antimony trifluoride, lead oxide, lead stearate, titanium tetrachloride, boron trifluoride, boron trifluoride ether complex, triethylamine, tributylamine, boron trifluoride boron trifluoride ether complex, triethylamine, or tributylamine.

Such catalyst is employed in an amount of 0.0001-10 wt. %, preferably 0.001-5 wt. % with respect to the total amount of the monomer compound.

In the ring-opening polymerization of the invention, a known polymerization initiator may be employed. More specifically, there can be employed an aliphatic alcohol, which can be monohydric, dihydric or polyhydric, or saturated or unsaturated. Specific examples include a monohydric alcohol such as methanol, ethanol, propanol, butanol, pentanol, hexanol, heptanol, nonanol, decanol, lauryl alcohol, myristyl alcohol, cetyl alcohol, stearyl alcohol and p-tert-buthylbenzyl alcohol, a dihydric alcohol such as ethylene glycol, butanediol, hexanediol, nonanediol and tetramethylene glycol; a polyhydric alcohol such as glycerol, sorbitol, xylitol, ribitol and erythritol; methyl lactate and ethyl lactate. Such aliphatic alcohol is usually employed in a proportion of 0.01-10 wt. % with respect to the total amount of the monomer, though a certain difference exists by the type of alcohol to be employed. A temperature of the ring-opening polymerization reaction is 25-200° C., preferably 50-200° C., and more preferably 100-180° C.

In the invention, the ring-opening polymerization reaction may be executed in an inert atmosphere such as nitrogen or argon, or under a reduced or increased pressure, and the catalyst and the alcohol may be added in succession.

On the other hand, in the polyhydroxyalkanoate having a unit represented by the chemical formula (5) of the invention, a polyhydroxyalkanoate having a unit represented by a chemical formula (44) can be produced by a ring-opening polymerization, utilizing, as a starting material, a cyclic diester compound which is a novel compound represented by the chemical formula (14):

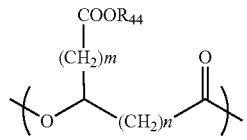

(44)

wherein $R_{44}$ represents a linear or branched alkyl group with 1-12 carbon atoms or an aralkyl group; n represents an integer selected from 0, 2, 3 and 4; m represents an integer selected from 2-8 in case n is 0 or an integer selected from 0-8 in case n is selected from 2-4.

In this case, the unit of the synthesized polyhydroxyalkanoate assumes a structure of a repeating unit represented by the chemical formula (15):

The compound represented by the chemical formula (14) is a novel compound of the invention. In the following, there will be explained a synthesizing method for the compound represented by a chemical formula (45), which is one of the novel compounds (14) of the invention.

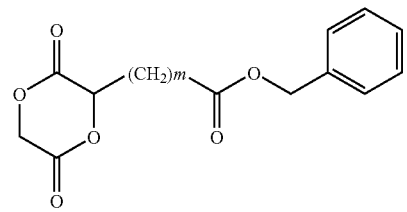

(45)

wherein m represents an integer selected from 2-8.

(a) Producing Method of Novel Intramolecular Cyclic diester

A synthesizing method for the compound represented by a chemical formula (45), which is one of the novel compounds (14) of the invention will be explained. For example, L-3-(2-benzyloxycarbonyl)ethyl-1,4-dioxane-2,5-dione represented by a chemical formula (46) with m=2 can be synthesized from L-glutamic acid as a starting material. More specifically, a γ-carboxyl group of L-glutamic acid is esterified with benzyl alcohol, as indicated in a chemical formula (47). Then a diazo hydrolysis is executed to convert an amino group into a hydroxyl group as indicate in a chemical formula (48). Then in an ether or an aromatic hydrocarbon, preferably diethyl ether as a solvent and in the presence of a base such as triethylamine, a coupling reaction is executed with bromoacetyl chloride to obtain a compound represented by a chemical formula (49). Then in a non-protonic polar solvent such as dimethylformamide or N-methylpyrrolidone, an intramolecular cyclization is executed with sodium hydrogencarbonate to obtain L-3-(2-benzyloxycarbonyl)ethyl-1,4-dioxane-2,5-dione represented by a chemical formula (46).

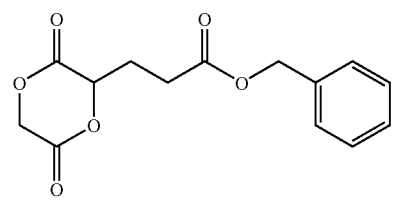

(46)

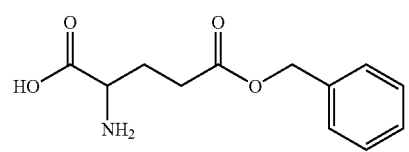

(47)

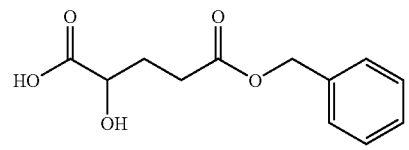

(48)

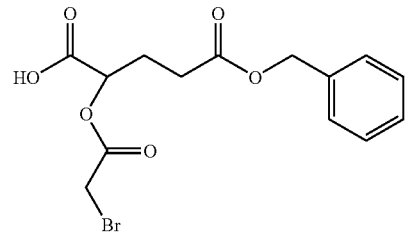

(49)

Also compounds represented by a chemical formula (50) may be employed in a similar synthesizing method to obtain corresponding compounds of the chemical formula (45) with m=3-8.

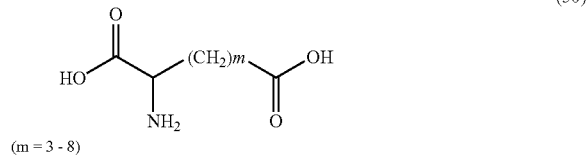

(50)

(m = 3 - 8)

An intramolecular cyclic diester, which is thus produced novel compound (14), can be employed in a step of producing a polyester having a unit represented by the chemical formula (44).

(b) Polyester Producing Method Utilizing Intramolecular Cyclic Diester

Preparation of a polyester having a unit represented by the chemical formula (44), utilizing the intramolecular cyclic diester which is the novel compound (14) of the invention, is not particularly restricted in a polymerization method, and there can be employed, for example, a solution polymerization method, a slurry polymerization method, or a mass polymerization method. Also a polymerization solvent, if employed, is not particularly restricted and can be, for example, an inert solvent such as an aliphatic or cyclic hydrocarbon with 5-18 carbon atoms or an aromatic hydrocarbon with 6-20 carbon atoms, tetrahydrofuran, chloroform, o-dichlorobenzene or dioxane.

In the invention, a catalyst to be employed in the polymerization can be a known ring-opening polymerization catalyst, such as tin dichloride, tin tetrachloride, stannous fluoride, stannous acetate, stannous stearate, stannous octanoate, stannous oxide, stannic oxide or another tin salt. There can also be employed triethoxy aluminum tri-n-propoxy aluminum, tri-sio-propoxy aluminum, tri-n-butoxy aluminum, tri-sio-butoxy aluminum, aluminum chloride, di-iso-propyl zinc, dimethyl zinc, diethyl zinc, zinc chloride, tetra-n-propoxy titanium, tetra-n-butoxy titanium, tetra-t-butoxy titanium, antimony trifluoride, lead oxide, lead stearate, titanium tetrachloride, boron trifluoride, boron trifluoride ether complex, triethylamine, or tributylamine. Such catalyst is employed in an amount of 0.0001-10 wt. %, preferably 0.001-5 wt. % with respect to the total amount of the monomer compound.

In the ring-opening polymerization of the invention, a known polymerization initiator may be employed. More specifically, there can be employed an aliphatic alcohol, which can be monohydric, dihydric or polyhydric, or saturated or unsaturated. Specific examples include a monohydric alcohol such as methanol, ethanol, propanol, butanol, pentanol, hexanol, heptanol, nonanol, decanol, lauryl alcohol, myristyl alcohol, cetyl alcohol, stearyl alcohol and p-tert-butylbenzyl alcohol; a dihydric alcohol such as ethylene glycol, butanediol, hexanediol, nonanediol, and tetramethylene glycol; a polyhydric alcohol such as glycerol, sorbitol, xylitol, ribitol and erythritol; methyl lactate and ethyl lactate. Such aliphatic alcohol is usually employed in a proportion of 0.01-10 wt. % with respect to the total amount of the monomer, though a certain difference exists by the type of alcohol to be employed.

In the invention, a temperature of the ring-opening polymerization reaction is, in consideration of a polymer generating rate and a thermal decomposition temperature of the generated polymer, 100-200° C., preferably 120-180° C.

In the invention, the ring-opening polymerization reaction may be executed in an inert atmosphere such as nitrogen and argon, or under a reduced or increased pressure, and the catalyst and the alcohol may be added in succession.

Polyhydroxyalkanoate of the invention is principally comprised of the unit represented by the foregoing chemical formula (1), (5) or (6), but may also be constructed as a copolymer containing a second component, in order to modify physical properties such as mechanical characteristics or decomposition characteristics. For example a unit represented by the chemical formula (7) may be further included in the molecule.

(7)

wherein $R_7$ represents a linear or branched alkylene with 1-11 carbon atoms, alkyleneoxyalkylene group (each alkylene group being independently with 1-2 carbon atoms), a linear or branched alkenyl group with 1-11 carbon atoms or an alkylidene group with 1-5 carbon atoms which is unsubstituted or substituted with an aryl group; and in case plural units are present, $R_7$ has the aforementioned meanings independently for each unit.

The second component can specifically be a cyclic diester of an α-hydroxycarboxylic acid or a lactone which is an intramolecular ring-closed compound of ω-hydroxycarboxylic acid. Specific examples of cyclic diester of α-hydroxycarboxylic acid include intermolecular cyclic diesters such asglycolic acid, lactic acid, α-hydroxybutylic acid, α-hydroxyisobutylic acid, α-hydroxyvaleric acid, α-hydroxyisovaleric acid, α-hydroxy-α-methylbutylic acid, α-hydroxycaproic acid, α-hydroxyisocaproic acid, α-hydroxy-β-methylvaleric acid, α-hydroxyheptanoic acid, mandelic acid and β-phenyllacetic acid. Also in case of presence of an asymmetric carbon, there may be employed an L-isomer, a D-isomer, a racemic body or a meso-form thereof. Also the cyclic diester may be formed from different α-oxyacids, for example one between glycolic acid and lactic acid, such as 3-methyl-2,5-diketo-1,4-dioxane. Also examples of a lactone which is an intramolecular ring-closed compound of an ω-hydroxycarboxylic acid include β-propiolactone, β-butyrolactone, β-isovalerolactone, β-caprolactone, β-isocaprolactone, β-methyl-β-valerolactone, γ-butyrolactone, γ-valerolactone, δ-valerolactone, ε-caprolactone, 11-oxydecanolactone, p-dioxanone, and 1,5-dioxepan-2-one, but these examples are not restrictive.

A number-averaged molecular weight of polyhydroxyalkanoate obtained by polymerization has various values depending on conditions such as a type and an amount of the polymerization catalyst, a polymerization temperature and a polymerization time, but is preferably within a range of 1,000 to 1,000,000.

The molecular weight of polyhydroxyalkanoate of the invention can be measured as a relative molecular weight or an absolute molecular weight. In a simpler method, it can be measured for example by GPC (gel permeation chromatography). In a GPC measurement, polyhydroxyalkanoate is dissolved in a solvent and subjected to a measurement in a moving phase. A detector such as a differential refractive index detector (RI) or an ultraviolet detector (UV) can be employed according to the polyhydroxyalkanoate to be measured. The molecular weight is obtained as a relative value in a comparison with a sample (polystyrene or polymethyl methacrylate). The solvent can be selected from those capable of dissolving the polymer, such as dimethylformamide (DMF), dimethyl sulfoxide (DMSO), chloroform, tetrahydrofuran (THF), toluene and hexafluoroisopropanol (HFIP). In case of a polar solvent, the measurement can also be executed by a salt addition.

Also in the invention, it is preferable to employ a polyhydroxyalkanoate of which a ratio (Mw/Mn) of the weight-averaged molecular weight (Mw) and the number-averaged molecular weight (Mn) is within a range of 1-10.

In the chemical reaction of the invention, a reaction solvent, a reaction temperature, a reaction time, a purification method and the like are not limited to those described in the foregoing.

EXAMPLES

In the following, the present invention will be clarified further by examples, but the invention is not limited to such examples.

Example 1

Synthesis of 3,6-di(3-butenyl)-1,4-dioxane-2,5-dione, Represented by Chemical Formula (10), m=2, from 2-hydroxy-5-hexenoic Acid In a 1-L flask equipped with a reflux condenser and a Dean-Stark trap, 3.0 g of 2-hydroxy-5-hexenoic acid, 400 ml of toluene and 30 mg of p-toluenesulfonic acid were added and refluxed under a nitrogen atmosphere. Water accumulated in the trap was eliminated from time to time. The mixture was cooled after refluxing for 72 hours. It was washed twice with 10 ml of a saturated aqueous solution of sodium hydrogencarbonate, and an obtained crude product was vacuum distilled in the presence of zinc oxide to obtain 1.06 g of desired 3,6-di(3-butenyl)-1,4-dioxane-2,5-dione (yield 41%).

A NMR analysis was conducted under following conditions to specify the structure of the obtained compound.
<Measuring instrument> FT-NMR: Bruker DPX400
resonance frequency: $^1$H=400 MHz
<Measuring condition>
measured species: $^1$H
solvent: DMSO-$d_6$
temperature: room temperature As a result, the obtained compound was confirmed as desired 3,6-di(3-butenyl)-1,4-dioxane-2,5-dione.

Example 2

Synthesis of 3,6-di(4-pentenyl)-1,4-dioxane-2,5-dione, Represented by Chemical Formula (10), m=3, from 2-hydroxy-6-heptenoic Acid A process of Example 1 was reproduced except for employing 2-hydroxy-6-heptenoic acid instead of 2-hydroxy-5-hexenoic acid to obtain 1.10 g (yield 42%) of 3,6-di(4-pentenyl)-1,4-dioxane-2,5-dione.

A NMR analysis conducted under conditions same as in Example 1 for specifying the structure of the obtained compound confirmed desired 3,6-di(4-pentenyl)-1,4-dioxane-2,5-dione.

Example 3

Synthesis of 3,6-di(5-hexenyl)-1,4-dioxane-2,5-dione, Represented by Chemical Formula (10), m=4, from 2-hydroxy-7-octenoic Acid A process of Example 1 was reproduced except for employing 2-hydroxy-7-octenoic acid instead of 2-hydroxy-5-hexenoic acid to obtain 1.05 g (yield 40%) of 3,6-di(5-hexenyl)-1,4-dioxane-2,5-dione.

A NMR analysis conducted under conditions same as in Example 1 for specifying the structure of the obtained compound confirmed desired 3,6-di(5-hexenyl)-1,4-dioxane-2,5-dione.

Example 4

Synthesis of 3,6-di(6-heptenyl)-1,4-dioxane-2,5-dione, Represented by Chemical Formula (10), m=5, from 2-hydroxy-8-octenoic Acid A process of Example 1 was reproduced except for employing 2-hydroxy-8-nonenoic acid instead of 2-hydroxy-5-hexenoic acid to obtain 1.07 g (yield 40%) of 3,6-di(6-hexenyl)-1,4-dioxane-2,5-dione.

A NMR analysis conducted under conditions same as in Example 1 for specifying the structure of the obtained compound confirmed desired 3,6-di(6-heptenyl)-1,4-dioxane-2,5-dione.

Example 5

Synthesis of 3,6-di(2-propenyl)-1,4-dioxane-2,5-dione, Represented by Chemical Formula (10), m=1, from 2-hydroxy-4-pentenoic Acid A process of Example 1 was reproduced except for employing 2-hydroxy-4-pentenoic acid instead of 2-hydroxy-5-hexenoic acid to obtain 1.09 g (yield 43%) of 3,6-di(2-propenyl)-1,4-dioxane-2,5-dione.

A NMR analysis conducted under conditions same as in Example 1 for specifying the structure of the obtained compound confirmed desired 3,6-di(2-propenyl)-1,4-dioxane-2,5-dione.

Example 6

Polyester Synthesis Utilizing 3,6-di(3-butenyl)-1,4-dioxane-2,5-dione 1.12 g (5.0 mmol) of 3,6-di(3-butenyl)-1,4-dioxane-2,5-dione, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.95 g of a polymer. A NMR analysis was conducted under following conditions to specify the structure of the obtained compound.
<Measuring instrument> FT-NMR: Bruker DPX400
resonance frequency: $^1$H=400 MHz
<Measuring condition>
measured species: $^1$H
solvent: TMS/CDCl$_3$
temperature: room temperature As a result, a polyhydroxyalkanoate formed by a unit represented by a chemical formula (51) was confirmed:

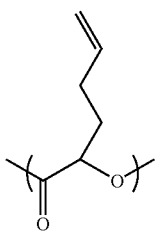

(51)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=16,500 and a weight-averaged molecular weight Mw=20,000.

Example 7

Polyester Synthesis Utilizing
3,6-di(3-butenyl)-1,4-dioxane-2,5-dione and
L-lactide 0.11 g (0.5 mmol) of 3,6-di(3-butenyl)-1,4-dioxane-2,5-dione, 0.65 g (4.5 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.63 g of a polymer. A NMR analysis conducted under conditions same as in Example 6 for specifying the structure of the obtained compound confirmed a polyhydroxyalkanoate copolymer comprising units represented by a chemical formula (52) as monomer units. A proportion of the monomer units was confirmed as 9 mol % of unit A and 91 mol % of unit B.

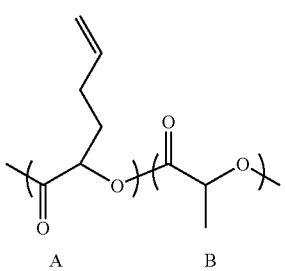

(52)

A    B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=18,200 and a weight-averaged molecular weight Mw=24,000.

Example 8

Polyester Synthesis Utilizing
3,6-di(4-pentenyl)-1,4-dioxane-2,5-dione and
L-lactide 0.13 g (0.5 mmol) of 3,6-di(4-pentenyl)-1,4-dioxane-2,5-dione, 0.65 g (4.5 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.66 g of a polymer.

A NMR analysis conducted under conditions same as in Example 6 for specifying the structure of the obtained compound confirmed a polyhydroxyalkanoate copolymer comprising units represented by a chemical formula (53) as monomer units. A proportion of the monomer units was confirmed as 9 mol % of unit A and 91 mol % of unit B.

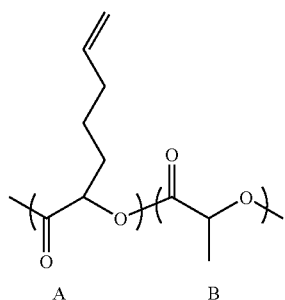

(53)

A    B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=17,800 and a weight-averaged molecular weight Mw=24,200.

Example 9

Polyester Synthesis Utilizing
3,6-di(5-hexenyl)-1,4-dioxane-2,5-dione and
L-lactide 0.14 g (0.5 mmol) of 3,6-di(5-hexenyl)-1,4-dioxane-2,5-dione, 0.65 g (4.5 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.62 g of a polymer. A NMR analysis conducted under conditions same as in Example 6 for specifying the structure of the obtained compound confirmed a polyhydroxyalkanoate copolymer comprising units represented by a chemical formula (54) as monomer units. A proportion of the monomer units was confirmed as 8 mol % of unit A and 92 mol % of unit B.

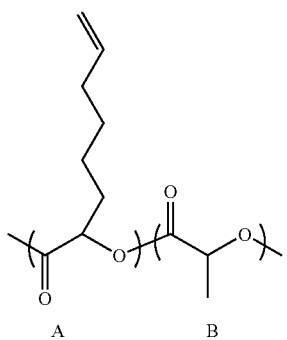

(54)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=16,500 and a weight-averaged molecular weight Mw=21,900.

Example 10

Polyester Synthesis Utilizing 3,6-di(6-heptenyl)-1,4-dioxane-2,5-dione and L-lactide 0.15 g (0.5 mmol) of 3,6-di(6-heptenyl)-1,4-dioxane-2,5-dione, 0.65 g (4.5 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was 20 sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.64 g of a polymer. A NMR analysis conducted under conditions same as in Example 6 for specifying the structure of the obtained compound confirmed a polyhydroxyalkanoate copolymer comprising units represented by a chemical formula (55) as monomer units. A proportion of the monomer units was confirmed as 7 mol % of unit A and 93 mol % of unit B.

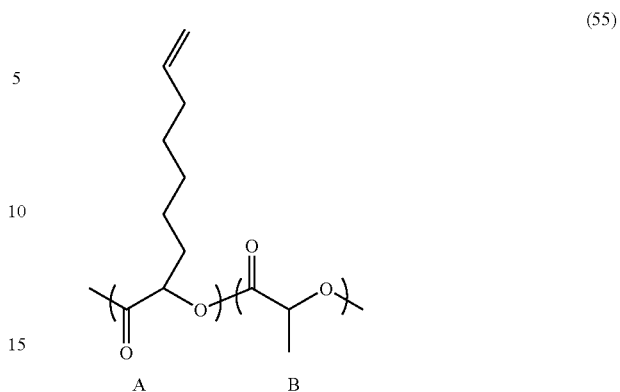

(55)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=15,700 and a weight-averaged molecular weight Mw=21,800.

Example 11

Polyester Synthesis Utilizing 3,6-di(2-propenyl)-1,4-dioxane-2,5-dione and L-lactide 0.10 g (0.5 mmol) of 3,6-di(2-propenyl)-1,4-dioxane-2,5-dione, 0.65 g (4.5 mmol) of L-lactide, 2 ml of a 0.01M toluene solution of tin octylate (tin 2-ethylhexanoate)- and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.65 g of a polymer. A NMR analysis conducted under conditions same as in Example 6 for specifying the structure of the obtained compound confirmed a polyhydroxyalkanoate copolymer comprising units represented by a chemical formula (56) as monomer units. A proportion of the monomer units was confirmed as 9 mol % of unit A and 91 mol % of unit B.

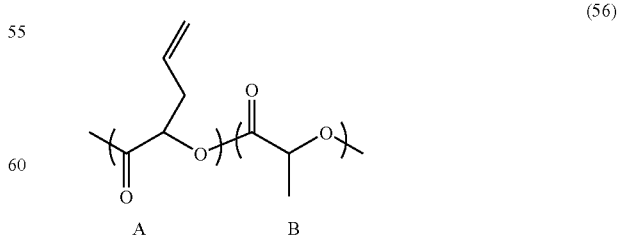

(56)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=17,200 and a weight-averaged molecular weight Mw=22,500.

Example 12

Polyester Synthesis Utilizing
3,6-di(2-propenyl)-1,4-dioxane-2,5-dione and L-lactide 0.98 g (5.0 mmol) of 3,6-di(2-propenyl)-1,4-dioxane-2,5-dione, 6.49 g (45.0 mmol) of L-lactide, 20 ml of a 0.01M toluene solution of tin octylate (tin 2-ethylhexanoate) and 20 ml of a 0.01M toluene solution of p-tert-butylbenzyl alcohol were charged in a polymerization ampoule, then subjected to a drying for 2 hours under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 6.55 g of a polymer. A NMR analysis conducted under conditions same as in Example 6 for specifying the structure of the obtained compound confirmed a polyhydroxyalkanoate copolymer comprising units represented by a chemical formula (57) as monomer units. A proportion of the monomer units was confirmed as 9 mol % of unit A and 91 mol % of unit B.

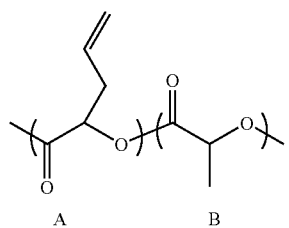

(57)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=17,400 and a weight-averaged molecular weight Mw=23,300.

Example 13

Polyester Synthesis Utilizing
3,6-di(2-propenyl)-1,4-dioxane-2,5-dione and L-lactide 0.049 g (0.25 mmol) of 3,6-di(2-propenyl)-1,4-dioxane-2,5-dione, 0.68 g (4.75 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.64 g of a polymer. A NMR analysis conducted under conditions same as in Example 6 for specifying the structure of the obtained compound confirmed a polyhydroxyalkanoate copolymer comprising units represented by a chemical formula (58) as monomer units. A proportion of the monomer units was confirmed as 4 mol % of unit A and 96 mol % of unit B.

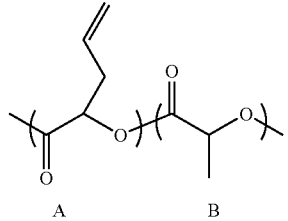

(58)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=18,000 and a weight-averaged molecular weight Mw=22,500.

Example 14

Polyester Synthesis Utilizing
3,6-di(2-propenyl)-1,4-dioxane-2,5-dione and L-lactide 0.15 g (0.75 mmol) of 3,6-di(2-propenyl)-1,4-dioxane-2,5-dione, 0.61 g (4.25 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.64 g of a polymer. A NMR analysis conducted under conditions same as in Example 6 for specifying the structure of the obtained compound confirmed a polyhydroxyalkanoate copolymer comprising units represented by a chemical formula (59) as monomer units. A proportion of the monomer units was confirmed as 14 mol % of unit A and 86 mol % of unit B.

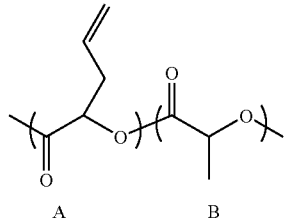

(59)

An average molecular weight of the obtained polyhydroxyalkanoate was evaluated by gel permeation chromatography

Example 15

Polyester Synthesis Utilizing 3,6-di(2-propenyl)-1,4-dioxane-2,5-dione and L-lactide 0.20 g (1.0 mmol) of 3,6-di(2-propenyl)-1,4-dioxane-2,5-dione, 0.58 g (4.0 mmol) of L-lactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform-required for the dissolving. The precipitate was recovered and dried under a reduced pressure to obtain 0.62 g of a polymer. A NMR analysis conducted under conditions same as in Example 6 for specifying the structure of the obtained compound confirmed a polyhydroxyalkanoate copolymer comprising units represented by a chemical formula (60) as monomer units. A proportion of the monomer units was confirmed as 18 mol % of unit A and 82 mol % of unit B.

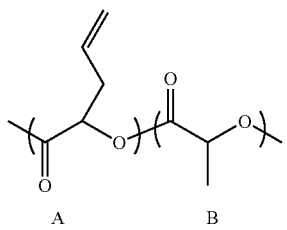

(60)

A B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=14,700 and a weight-averaged molecular weight Mw=18,600.

Example 16

Polyester Synthesis Utilizing 3,6-di(2-propenyl)-1,4-dioxane-2,5-dione and glycolide (1,4-dioxane-2,5-dione)

0.10 g (0.5 mmol) of 3,6-di(2-propenyl)-1,4-dioxane-2,5-dione, 0.52 g (4.5 mmol) of glycolide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.53 g of a polymer. A NMR analysis conducted under conditions same as in Example 6 for specifying the structure of the obtained compound confirmed a polyhydroxyalkanoate copolymer comprising units represented by a chemical formula (61) as monomer units. A proportion of the monomer units was confirmed as 10 mol % of unit A and 90 mol % of unit B.

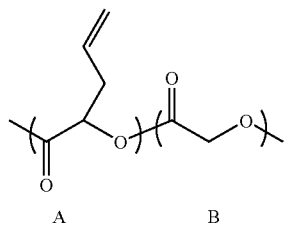

(61)

A B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=18,500 and a weight-averaged molecular weight Mw=24,200.

Example 17

Polyester Synthesis Utilizing 3,6-di(2-propenyl)-1,4-dioxane-2,5-dione and mandelide (3,6-diphenyl-1,4-dioxane-2,5-dione)

0.10 g (0.5 mmol) of 3,6-di(2-propenyl)-1,4-dioxane-2,5-dione, 1.21 g (4.5 mmol) of mandelide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.05 g of a polymer. A NMR analysis conducted under conditions same as in Example 6 for specifying the structure of the obtained compound confirmed a polyhydroxyalkanoate copolymer comprising units represented by a chemical formula (62) as monomer units. A proportion of the monomer units was confirmed as 8 mol % of unit A and 92 mol % of unit B.

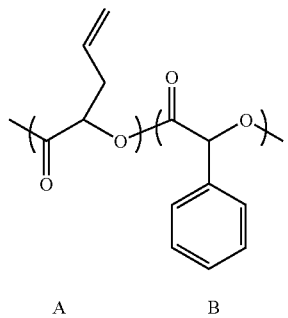

(62)

A B

Example 18

Oxidation Reaction of Polyhydroxyalkanoate Synthesized in Example 6 and Comprised of a Unit Represented by the Chemical Formula (51)

0.50 g of polyhydroxyalkanoate synthesized in Example 6 and comprised of a unit represented by the chemical formula (51) were placed in an eggplant-shaped flask and dissolved by adding 30 ml of acetone. The solution was placed on an iced bath, then added with 5 ml of acetic acid and 3.54 g of 18-crown-6-ether were added and agitated. Then, on an iced bath, 2.82 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.48 g of polymer. A NMR analysis conducted under conditions same as in Example 6 for specifying the structure of the obtained compound confirmed a polyhydroxyalkanoate containing a unit represented by a chemical formula (63) as a monomer unit.

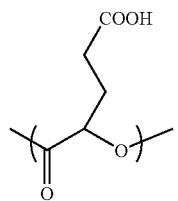

(63)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=12,400 and a weight-averaged molecular weight Mw=16,200.

Example 19

Oxidation Reaction of Polyhydroxyalkanoate Synthesized in Example 7 and Comprised of a Unit Represented by the Chemical Formula (52)

0.50 g of polyhydroxyalkanoate copolymer (A: 9 mol %, B: 91 mol %) synthesized in Example 7 and comprised of a unit represented by the chemical formula (52) were placed in an eggplant-shaped flask and dissolved by adding 30 ml of acetone. The solution was placed on an iced bath, then added with 5 ml of acetic acid and 0.47 g of 18-crown-6-ether were added and agitated. Then, on an iced bath, 0.38 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (64) as monomer units.

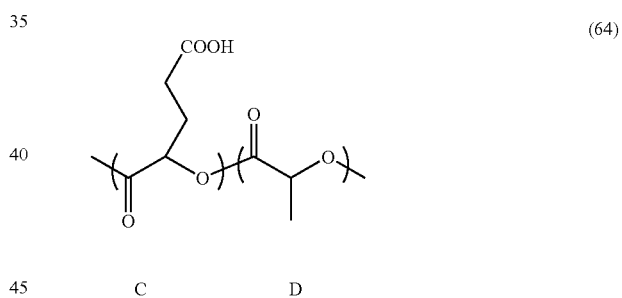

(64)

An average molecular weight of the obtained polyhydroxyalkanoate was evaluated by gel permeation chromatography (GPC: Tosoh. HLC-8220, column: Tosoh TSK-GEL Super HM-H, solvent: chloroform, converted as polystyrene). As a result, there were obtained a number-averaged molecular weight Mn=13,200 and a weight-averaged molecular weight Mw=18,200.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 31 mg of polyhydroxyalkanoate.

A NMR analysis conducted under conditions same as in Example 6 confirmed that polyhydroxyalkanoate represented by the chemical formula (64) was a copolymer with a proportion by 8 mol % of unit C and 92 mol % of unit D.

Example 20

Oxidation Reaction of Polyhydroxyalkanoate Synthesized in Example 8 and Comprised of a Unit Represented by the Chemical Formula (53)

0.50 g of polyhydroxyalkanoate copolymer (A: 9 mol %, B: 91 mol %) synthesized in Example 8 and comprised of a unit represented by the chemical formula (53) were placed in an eggplant-shaped flask and dissolved by adding 30 ml of acetone. The solution was placed on an iced bath, then added with 5 ml of acetic acid and 0.46 g of 18-crown-6-ether were added and agitated. Then, on an iced bath, 0.37 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.42 g of polymer. A NMR analysis conducted under conditions same as in Example 6 for specifying the structure of the obtained compound confirmed a polyhydroxyalkanoate comprising units represented by a chemical formula (65) as monomer units.

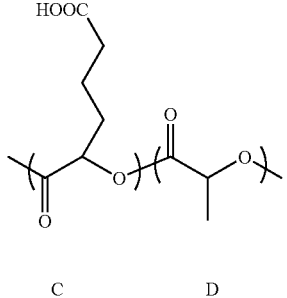

(65)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight $Mn=13,000$ and a weight-averaged molecular weight $Mw=18,100$.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

A NMR analysis conducted under conditions same as in Example 6 confirmed that polyhydroxyalkanoate represented by the chemical formula (65) was a copolymer with a proportion by 8 mol % of unit C and 92 mol % of unit D.

Example 21

Oxidation Reaction of Polyhydroxyalkanoate Synthesized in Example 9 and Comprised of a Unit Represented by the Chemical Formula (54)

0.50 g of polyhydroxyalkanoate copolymer (A: 8 mol %, B: 92 mol %) synthesized in Example 9 and comprised of a unit represented by the chemical formula (54) were placed in an eggplant-shaped flask and dissolved by adding 30 ml of acetone. The solution was placed on an iced bath, then added with 5 ml of acetic acid and 0.40 g of 18-crown-6-ether were added and agitated. Then, on an iced bath, 0.32 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (66) as monomer units.

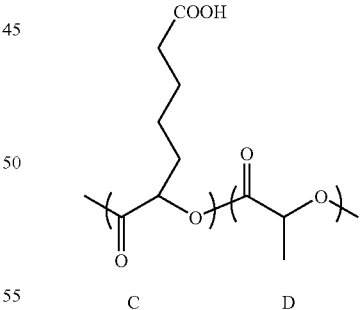

(66)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight $Mn=11,700$ and a weight-averaged molecular weight $Mw=16,400$.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (66) was a copolymer with a proportion by 8 mol % of unit C and 92 mol % of unit D.

Example 22

Oxidation Reaction of Polyhydroxyalkanoate Synthesized in Example 10 and Comprised of a Unit Represented by the Chemical Formula (55)

0.50 g of polyhydroxyalkanoate copolymer (A: 7 mol %, B: 93 mol %) synthesized in Example 10 and comprised of a unit represented by the chemical formula (55) were placed in an eggplant-shaped flask and dissolved by adding 30 ml of acetone. The solution was placed on an iced bath, then added with 5 ml of acetic acid and 0.35 g of 18-crown-6-ether were added and agitated. Then, on an iced bath, 0.28 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH 1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.42 g of polymer. A NMR analysis conducted under conditions same as in Example 6 for specifying the structure of the obtained compound confirmed a polyhydroxyalkanoate comprising units represented by a chemical formula (67) as monomer units.

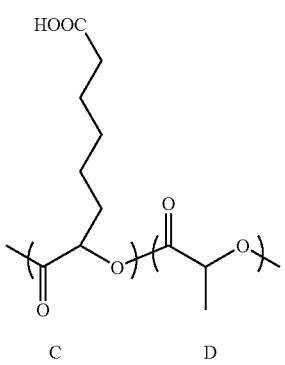

(67)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=11,400 and a weight-averaged molecular weight Mw=16,300.

Also, for calculating the units of the obtained polyhydroxyalkanoate, a terminal carboxyl group in the side chain of polyhydroxyalkanoate was subjected to methylesterification with trimethylsilyl diazomethane.

30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 30 mg of polyhydroxyalkanoate.

A NMR analysis conducted under conditions same as in Example 6 confirmed that polyhydroxyalkanoate represented by the chemical formula (67) was a copolymer with a proportion by 7 mol % of unit C and 93 mol % of unit D.

Example 23

Oxidation Reaction of Polyhydroxyalkanoate Synthesized in Example 11 and Comprised of a Unit Represented by the Chemical Formula (56)

0.50 g of polyhydroxyalkanoate copolymer (A: 9 mol %, B: 91 mol %) synthesized in Example 11 and comprised of a unit represented by the chemical formula (56) were placed in an eggplant-shaped flask and dissolved by adding 30 ml of acetone. The solution was placed on an iced bath, then added with 5 ml of acetic acid and 0.48 g of 18-crown-6-ether were added and agitated. Then, on an iced bath, 0.38 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.45 g of polymer. A NMR analysis conducted under conditions same as in Example 6 for specifying the structure of the obtained compound confirmed a polyhydroxyalkanoate comprising units represented by a chemical formula (68) as monomer units.

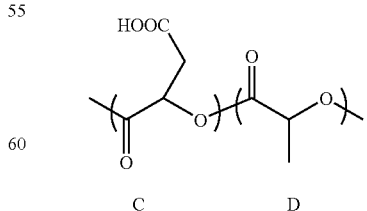

(68)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=12,800 and a weight-averaged molecular weight Mw=17,700.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

A NMR analysis conducted under conditions same as in Example 6 confirmed that polyhydroxyalkanoate represented by the chemical formula (68) was a copolymer with a proportion by 8 mol % of unit C and 92 mol % of unit D.

Example 24

Oxidation Reaction of Polyhydroxyalkanoate Synthesized in Example 12 and Comprised of a Unit Represented by the Chemical Formula (57)

6.00 g of polyhydroxyalkanoate copolymer (A: 9 mol %, B: 91 mol %) synthesized in Example 12 and comprised of a unit represented by the chemical formula (57) were placed in an eggplant-shaped flask and dissolved by adding 360 ml of acetone. The solution was placed on an iced bath, then added with 60 ml of acetic acid and 5.75 g of 18-crown-6-ether were added and agitated. Then, on an iced bath, 4.59 g of potassium permanganate were slowly added, and the mixture was agitated for 2 hours on an iced bath and further for 18 hours at the room temperature. After the reaction, 720 ml of ethyl acetate and 540 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 600 ml of water, 600 ml of methanol, and 3 times with 600 ml of water, and the polymer was recovered. It was then dissolved in THF, and re-precipitated in methanol of a 50-times amount of that of THF required for the dissolving. The precipitate was recovered and dried under a reduced pressure to obtain 5.30 g of polymer. A NMR analysis conducted under conditions same as in Example 6 for specifying the structure of the obtained compound confirmed a polyhydroxyalkanoate comprising units represented by a chemical formula (69) as monomer units.

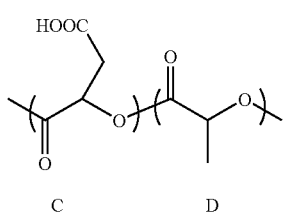

(69)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=13,200 and a weight-averaged molecular weight Mw=18,300.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (69) was a copolymer with a proportion by 8 mol % of unit C and 92 mol % of unit D.

Example 25

Oxidation Reaction of Polyhydroxyalkanoate Synthesized in Example 13 and Comprised of a Unit Represented by the Chemical Formula (58)

0.50 g of polyhydroxyalkanoate copolymer (A: 4 mol %, B: 96 mol %) synthesized in Example 13 and comprised of a unit represented by the chemical formula (58) were placed in an eggplant-shaped flask and dissolved by adding 30 ml of acetone. The solution was placed on an iced bath, then added with ml of acetic acid and 0.22 g of 18-crown-6-ether were added and agitated. Then, on an iced bath, 0.17 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.45 g of polymer. A NMR analysis conducted under conditions same as in Example 6 for specifying the structure of the obtained compound confirmed a polyhydroxyalkanoate comprising units represented by a chemical formula (70) as monomer units.

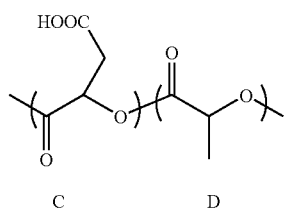

(70)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=12,800 and a weight-averaged molecular weight Mw=16,500.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

A NMR analysis conducted under conditions same as in Example 6 confirmed that polyhydroxyalkanoate represented by the chemical formula (70) was a copolymer with a proportion by 4 mol % of unit C and 96 mol % of unit D.

Example 26

Oxidation Reaction of Polyhydroxyalkanoate Synthesized in Example 14 and Comprised of a Unit Represented by the Chemical Formula (59)

0.50 g of polyhydroxyalkanoate copolymer (A: 14 mol %, B: 86 mol %) synthesized in Example 14 and comprised of a unit represented by the chemical formula (59) were placed in an eggplant-shaped flask and dissolved by adding 30 ml of acetone. The solution was placed on an iced bath, then added with 5 ml of acetic acid and 0.73 g of 18-crown-6-ether were added and agitated. Then, on an iced bath, 0.58 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (71) as monomer units.

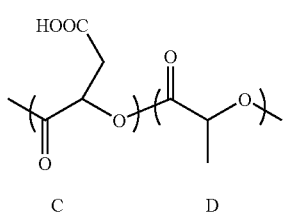

(71)

C    D

An average molecular weight of the obtained polyhydroxyalkanoate was evaluated by gel permeation chromatography (GPC: Tosoh HLC-8220, column: Tosoh TSK-GEL Super HM-H, solvent chloroform, converted as polystyrene). As a result, there were obtained a number-averaged molecular weight Mn=10,600 and a weight-averaged molecular weight Mw=13,800.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 27 mg of polyhydroxyalkanoate.

A NMR analysis conducted under conditions same as in Example 6 confirmed that polyhydroxyalkanoate represented by the chemical formula (71) was a copolymer with a proportion by 13 mol % of unit C and 87 mol % of unit D.

Example 27

Oxidation Reaction of Polyhydroxyalkanoate Synthesized in Example 15 and Comprised of a Unit Represented by the Chemical Formula (60)

0.50 g of polyhydroxyalkanoate copolymer (A: 18 mol %, B: 82 mol %) synthesized in Example 15 and comprised of a unit represented by the chemical formula (60) were placed in an eggplant-shaped flask and dissolved by adding 30 ml of acetone. The solution was placed on an iced bath, then added with 5 ml of acetic acid and 0.93 g of 18-crown-6-ether were added and agitated. Then, on an iced bath, 0.74 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.43 g of polymer. A NMR analysis conducted under conditions same as in Example 6 for specifying the structure of the obtained compound confirmed a polyhydroxyalkanoate comprising units represented by a chemical formula (72) as monomer units.

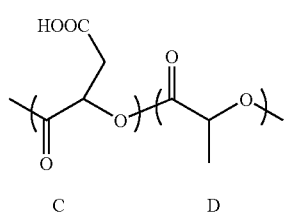

(72)

C    D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=10,100 and a weight-averaged molecular weight Mw=13,200.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (72) was a copolymer with a proportion by 16 mol % of unit C and 84 mol % of unit D.

Example 28

Oxidation Reaction of Polyhydroxyalkanoate Synthesized in Example 16 and Comprised of a Unit Represented by the Chemical Formula (61)

0.50 g of polyhydroxyalkanoate copolymer (A: 10 mol %, B: 90 mol %) synthesized in Example 16 and comprised of a unit represented by the chemical formula (61) were placed in an eggplant-shaped flask and dissolved by adding 30 ml of acetone. The solution was placed on an iced bath, then added with 5 ml of acetic acid and 0.64 g of 18-crown-6-ether were added and agitated. Then, on an iced bath, 0.51 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (73) as monomer units.

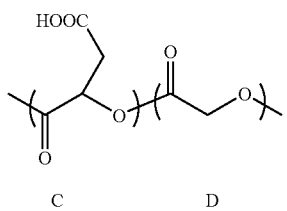

(73)

C     D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=13,200 and a weight-averaged molecular weight Mw=17,700.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 30 mg of polyhydroxyalkanoate.

A NMR analysis conducted under conditions same as in Example 6 confirmed that polyhydroxyalkanoate represented by the chemical formula (73) was a copolymer with a proportion by 9 mol % of unit C and 91 mol % of unit D.

Example 29

Oxidation Reaction of Polyhydroxyalkanoate Synthesized in Example 17 and Comprised of a Unit Represented by the Chemical Formula (62)

0.50 g of polyhydroxyalkanoate copolymer (A: 8 mol %, B: 92 mol %) synthesized in Example 17 and comprised of a unit represented by the chemical formula (62) were placed in an eggplant-shaped flask and dissolved by adding 30 ml of acetone. The solution was placed on an iced bath, then added with 5 ml of acetic acid and 0.24 g of 18-crown-6-ether were added and agitated. Then, on an iced bath, 0.19 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. hereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (74) as monomer units.

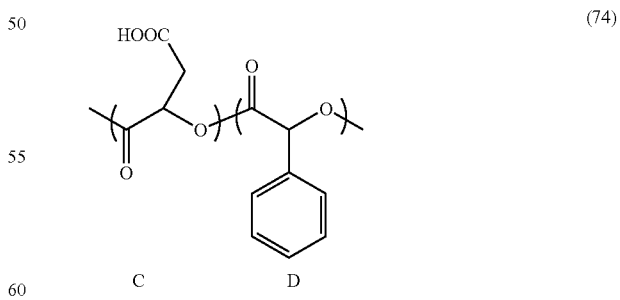

(74)

C     D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=12,500 and a weight-averaged molecular weight Mw=24,300.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

A NMR analysis conducted under conditions same as in Example 6 confirmed that polyhydroxyalkanoate represented by the chemical formula (74) was a copolymer with a proportion by 7 mol % of unit C and 93 mol % of unit D.

Example 30

Condensation Reaction of Polyhydroxyalkanoate Synthesized in Example 19 and Comprised of a Unit Represented by the Chemical Formula (64), and 2-aminobenzenesulfonic Acid In a nitrogen atmosphere, 0.40 g of polyhydroxyalkanoate copolymer (C: 8 mol %, D: 92 mol %) obtained in Example 19 and comprised of a unit represented by the chemical formula (64) and 0.36 g of 2-aminobenzenesulfonic acid were placed in a 100-ml three-necked flask, agitated with 15.0 ml of pyridine, further added with 1.09 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transform infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (75) as monomer units.

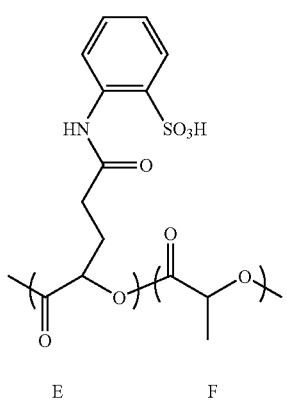

(75)

It was also confirmed that polyhydroxyalkanoate represented by the chemical formula (75) was a copolymer with a proportion by 8 mol % of unit E and 92 mol % of unit F.

An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=11,300 and a weight-averaged molecular weight Mw=16,000.

Example 31

Condensation Reaction of Polyhydroxyalkanoate Synthesized in Example 20 and Comprised of a Unit Represented by the Chemical Formula (65), and 2-aminobenzenesulfonic Acid In a nitrogen atmosphere, 0.40 g of polyhydroxyalkanoate copolymer (C: 8 mol %, D: 92 mol %) obtained in Example 20 and comprised of a unit represented by the chemical formula (65) and 0.36 g of 2-aminobenzenesulfonic acid were placed in a 100-ml three-necked flask, agitated with 15.0 ml of pyridine, further added with 1.07 ml of triphenyl phosphite and heated for 6 hours at 12° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.33 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (76) as monomer units.

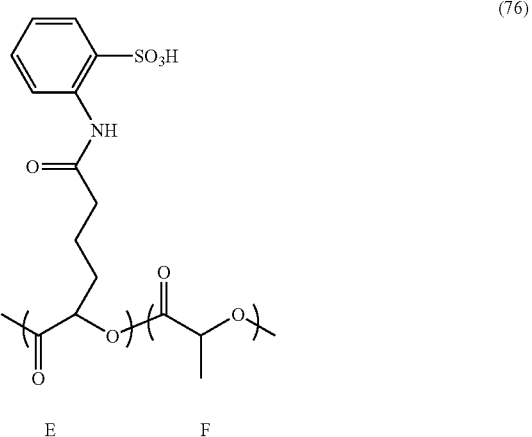

(76)

It was also confirmed that polyhydroxyalkanoate represented by the chemical formula (76) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene).

As a result, there were obtained a number-averaged molecular weight Mn=11,500 and a weight-averaged molecular weight Mw=17,300.

Example 32

Condensation Reaction of Polyhydroxyalkanoate Synthesized in Example 21 and Comprised of a Unit Represented by the Chemical Formula (66), and 2-aminobenzenesulfonic Acid In a nitrogen atmosphere, 0.40 g of polyhydroxyalkanoate copolymer (C: 8 mol %, D: 92 mol %) obtained in Example 21 and comprised of a unit represented by the chemical formula (66) and 0.35 g of 2-aminobenzenesulfonic acid were placed in a 100-ml three-necked flask, agitated with 15.0 ml of pyridine, further added with 1.06 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (77) as monomer units.

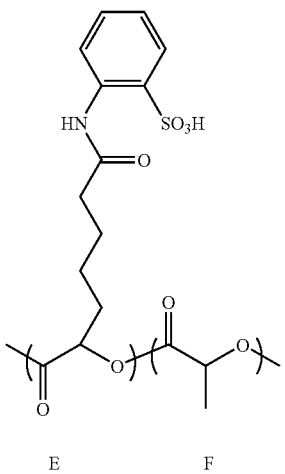

(77)

It was also confirmed that polyhydroxyalkanoate represented by the chemical formula (77) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5µ MIXED-G, solvent: DMF/LiBr 0.1% (w/v), converted as polystyrene).

As a result, there were obtained a number-averaged molecular weight Mn=10,100 and a weight-averaged molecular weight Mw=14,300.

Example 33

Condensation Reaction of Polyhydroxyalkanoate Synthesized in Example 22 and Comprised of a Unit Represented by the Chemical Formula (67), and 2-aminobenzenesulfonic Acid In a nitrogen atmosphere, 0.40 g of polyhydroxyalkanoate copolymer (C: 7 mol %, D: 93 mol %) obtained in Example 22 and comprised of a unit represented by the chemical formula (67) and 0.31 g of 2-aminobenzenesulfonic acid were placed in a 100-ml three-necked flask, agitated with 15.0 ml of pyridine, further added with 0.92 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.33 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (78) as monomer units.

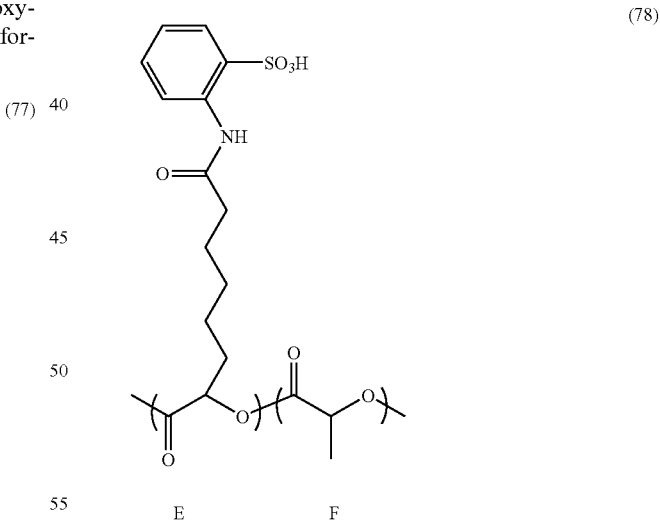

(78)

It was also confirmed that polyhydroxyalkanoate represented by the chemical formula (78) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=9,900 and a weight-averaged molecular weight Mw=14,400.

Example 34

Condensation Reaction of Polyhydroxyalkanoate Synthesized in Example 23 and Comprised of a Unit Represented by the Chemical Formula (68), and 2-aminobenzenesulfonic Acid In a nitrogen atmosphere, 0.40 g of polyhydroxyalkanoate copolymer (C: 8 mol %, D: 92 mol %) obtained in Example 23 and comprised of a unit represented by the chemical formula (68) and 0.37 g of 2-aminobenzenesulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 1.50 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 $cm^{-1}$ attributable to a carboxylic acid, and a new peak at 1658 $cm^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (79) as monomer units.

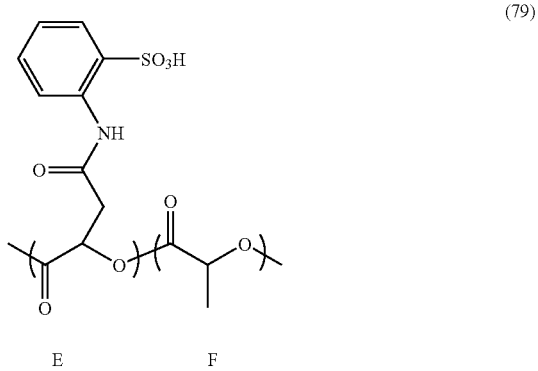

(79)

E  F

It was also confirmed that polyhydroxyalkanoate represented by the chemical formula (79) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight. Mn=11,800 and a weight-averaged molecular weight Mw=16,600.

Example 35

Condensation Reaction of Polyhydroxyalkanoate Synthesized in Example 24 and Comprised of a Unit Represented by the Chemical Formula (69), and p-toluidine-2-sulfonic acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.39 g of p-toluidine-2-sulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.33 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 $cm^{-1}$ attributable to a carboxylic acid, and a new peak at 1658 $cm^{-1}$ attributable to an amide group.

A result of $^1$H-NMR confirmed, by a shift in a peak resulting from an aromatic ring of the p-toluidine-2-sulfonic acid structure, that the polymer was a polyhydroxyalkanoate comprising units represented by a chemical formula (80) as monomer units.

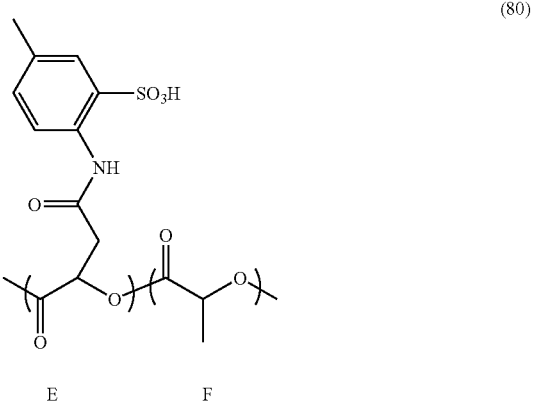

(80)

E  F

It was also confirmed that polyhydroxyalkanoate represented by the chemical formula (80) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,000 and a weight-averaged molecular weight Mw=15,700.

Example 36

Condensation Reaction of Polyhydroxyalkanoate Synthesized in Example 24 and Comprised of a Unit Represented by the Chemical Formula (69), and 4-aminobenzenesulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.37 g of 4-aminobenzenesulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.31 g of a polymer. The structure of the obtained polymer was analyzed by ¹H-NMR (FT-NMR: Bruker DPX 400, resonance frequency: 400, MHz, measured species: ¹H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of ¹H-NMR confirmed, by a shift in a peak resulting from an aromatic ring of the 4-aminobenzenesulfonic acid structure, that the polymer was a polyhydroxyalkanoate comprising units represented by a chemical formula (81) as monomer units.

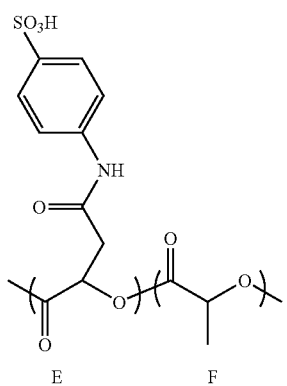

(81)

It was also confirmed that polyhydroxyalkanoate represented by the chemical formula (81) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=10,700 and a weight-averaged molecular weight Mw=15,700.

Example 37

Condensation Reaction of Polyhydroxyalkanoate Synthesized in Example 24 and Comprised of a Unit Represented by the Chemical Formula (69), and 3-aminobenzenesulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.37 g of 3-aminobenzenesulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by ¹H-NMR (FT-NMR: Bruker DPX 400, resonance frequency: 400 MHz, measured species: ¹H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of ¹H-NMR confirmed, by a shift in a peak resulting from an aromatic ring of the 3-aminobenzenesulfonic acid structure, that the polymer was a polyhydroxyalkanoate comprising units represented by a chemical formula (82) as monomer units.

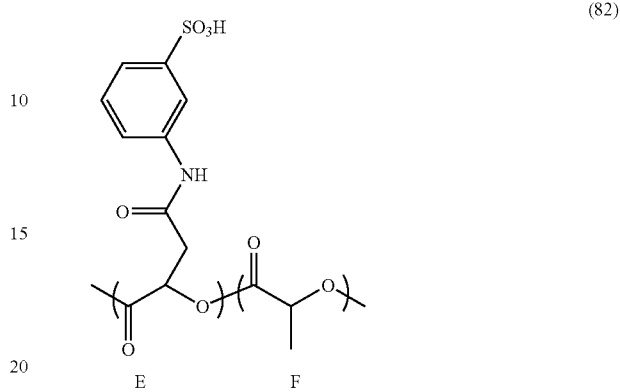

(82)

It was also confirmed that polyhydroxyalkanoate represented by the chemical formula (82) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,300 and a weight-averaged molecular weight Mw=16,200.

Example 38

Condensation Reaction of Polyhydroxyalkanoate Synthesized in Example 24 and Comprised of a Unit Represented by the Chemical Formula (69), and 4-methoxyaniline-2-sulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.43 g of 4-methoxyaniline-2-sulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by ¹H-NMR (FT-NMR: Bruker DPX 400, resonance frequency: 400 MHz, measured species: ¹H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of ¹H-NMR confirmed, by a shift in a peak resulting from an aromatic ring of the 4-methoxyaniline-2-sulfonic acid structure, that the polymer was a polyhydroxyalkanoate comprising units represented by a chemical formula (83) as monomer units.

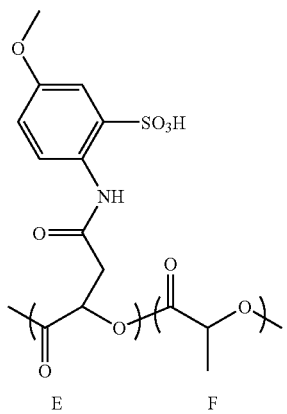

(83)

E  F

It was also confirmed that polyhydroxyalkanoate represented by the chemical formula (83) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,000 and a weight-averaged molecular weight Mw=16,100.

Example 39

Condensation Reaction of Polyhydroxyalkanoate Synthesized in Example 24 and Comprised of a Unit Represented by the Chemical Formula (69), and 4-aminobenzenesulfonic Acid Phenyl Ester In a nitrogen atmosphere, 0.40 g of polyhydroxyalkanoate copolymer (C: 8 mol %, D: 92 mol %) obtained in Example 24 and comprised of a unit represented by the chemical formula (69) and 0.53 g of 4-aminobenzenesulfonic acid phenyl ester were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.35 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 4-aminobenzenesulfonic acid phenyl ester structure, that the polymer was a polyhydroxyalkanoate comprising units represented by a chemical formula (84) as monomer units.

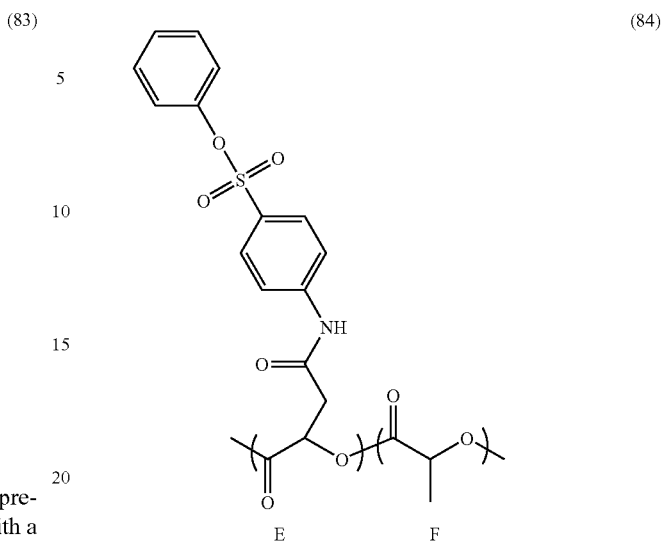

(84)

E  F

It was also confirmed that polyhydroxyalkanoate represented by the chemical formula (84) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,500 and a weight-averaged molecular weight Mw=17,100.

Example 40

Condensation Reaction of Polyhydroxyalkanoate Synthesized in Example 24 and Comprised of a Unit Represented by the Chemical Formula (69), and 2-aminobenzenesulfonic Acid Phenyl Ester In a nitrogen atmosphere, 0.40 g of polyhydroxyalkanoate copolymer (C: 8 mol %, D: 92 mol %) obtained in Example 24 and comprised of a unit represented by the chemical formula (69) and 0.53 g of 2-aminobenzenesulfonic acid phenyl ester were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR, confirmed, by a shift in a peak resulting from an aromatic ring of the 2-aminobenzenesulfonic acid phenyl ester structure, that the polymer was a polyhydroxyalkanoate comprising units represented by a chemical formula (85) as monomer units.

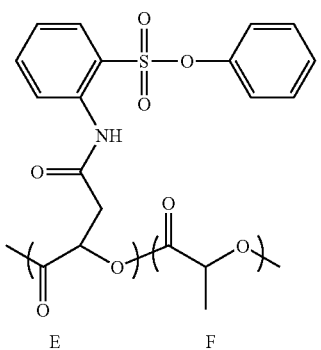

(85)

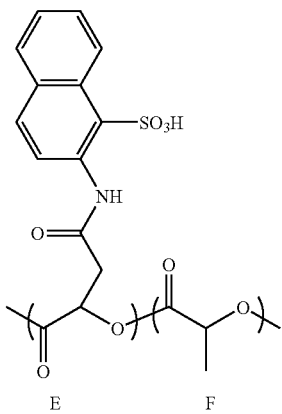

(86)

It was also confirmed that polyhydroxyalkanoate represented by the chemical formula (85) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,300 and a weight-averaged molecular weight Mw=16,800.

It was also confirmed that polyhydroxyalkanoate represented by the chemical formula (86) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene.). As a result, there were obtained a number-averaged molecular weight Mn=11,000 and a weight-averaged molecular weight Mw=16,600.

Example 41

Condensation Reaction of Polyhydroxyalkanoate Synthesized in Example 24 and Comprised of a Unit Represented by the Chemical Formula (69), and 2-amino-1-naphthalenesulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.47 g of 2-amino-1-naphthalenesulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.37 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-amino-1-naphthalenesulfonic acid structure, that the polymer was a polyhydroxyalkanoate comprising units represented by a chemical formula (86) as monomer units.

Example 42

Condensation Reaction of Polyhydroxyalkanoate Synthesized in Example 24 and Comprised of a Unit Represented by the Chemical Formula (69), and 1-naphthylamine-8-sulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.47 g of 1-naphthylamine-8-sulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.36 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 1-naphthylamine-8-sulfonic acid structure, that the polymer was a polyhydroxyalkanoate comprising units represented by a chemical formula (87) as monomer units.

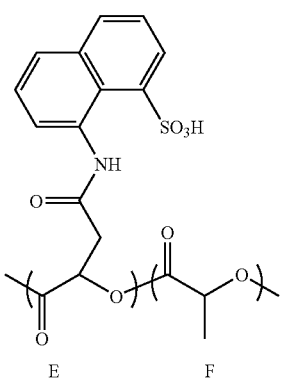

(87)

E  F

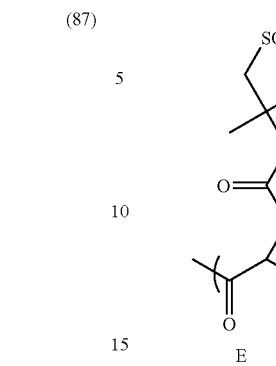

(88)

E  F

It was also confirmed that polyhydroxyalkanoate represented by the chemical formula (87) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=10,900 and a weight-averaged molecular weight Mw=17,100.

It was also confirmed that polyhydroxyalkanoate represented by the chemical formula (88) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 0.5μ MIXED-C, solvent: DMF/LiBr 0.1% (w/v), converted as polystyrene). As a result, there were obtained a number-averaged molecular weight Mn=10,300 and a weight-averaged molecular weight Mw=14,700.

Example 43

Condensation Reaction of Polyhydroxyalkanoate Synthesized in Example 24 and Comprised of a Unit Represented by the Chemical Formula (69), and 2-amino-2-methylpropanesulfonic Acid In a nitrogen atmosphere, 0.40 g of polyhydroxyalkanoate copolymer (C: 8 mol %, D: 92 mol %) obtained in Example 24 and comprised of a unit represented by the chemical formula (69) and 0.32 g of 2-amino-2-methylpropanesulfonic acid were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.33 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak resulting from a methylene group of the 2-amino-2-methylpropanesulfonic acid structure, that the polymer was a polyhydroxyalkanoate comprising units represented by a chemical formula (88) as monomer units.

Example 44

Condensation Reaction of Polyhydroxyalkanoate Synthesized in Example 24 and Comprised of a Unit Represented by the Chemical Formula (69), and Taurin In a nitrogen atmosphere, 0.40 g of polyhydroxyalkanoate copolymer (C: 8 mol %, D: 92 mol %) obtained in Example 24 and comprised of a unit represented by the chemical formula (69) and 0.26 g of taurin were placed in a 100-ml three-necked flask, agitated with 15.0 ml of pyridine, further added with 1.10 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.33 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR. 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak resulting from a methylene group of the taurin structure, that the polymer was a polyhydroxyalkanoate comprising units represented by a chemical formula (89) as monomer units.

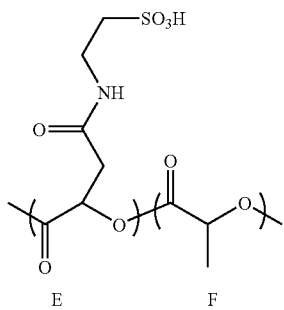

(89)

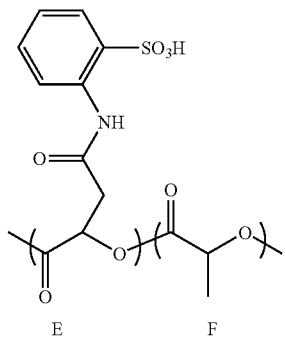

(90)

It was also confirmed that polyhydroxyalkanoate represented by the chemical formula (89) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, 0.10 there were obtained a number-averaged molecular weight Mn=9,900 and a weight-averaged molecular weight Mw=14,100.

It was also confirmed that polyhydroxyalkanoate represented by the chemical formula (90) was a copolymer with a proportion by 4 mol % of unit E and 96 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=12,000 and a weight-averaged molecular weight Mw=15,800.

Example 45

Condensation Reaction of Polyhydroxyalkanoate Synthesized in Example 25 and Comprised of a Unit Represented by the Chemical Formula (70), and 2-aminobenzenesulfonic Acid In a nitrogen atmosphere, 0.40 g of polyhydroxyalkanoate copolymer (C: 4 mol %, D: 96 mol %) obtained in Example 25 and comprised of a unit represented by the chemical formula (70) and 0.18 g of 2-aminobenzenesulfonic acid were placed in a 100-ml three-necked flask, agitated with 15.0 ml of pyridine, further added with 0.57 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (90) as monomer units.

Example 46

Condensation Reaction of Polyhydroxyalkanoate Synthesized in Example 26 and Comprised of a Unit Represented by the Chemical Formula (71), and 2-aminobenzenesulfonic Acid In a nitrogen atmosphere, 0.40 g of polyhydroxyalkanoate copolymer (C: 13 mol %, D: 87 mol %) obtained in Example 26 and comprised of a unit represented by the chemical formula (71) and 0.58 g of 2-aminobenzenesulfonic acid were placed in a 100-ml three-necked flask, agitated with 15.0 ml of pyridine, further added with 1.74 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (91) as monomer units.

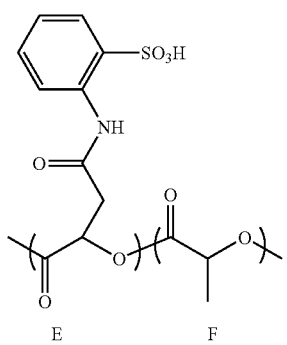

(91)

E    F

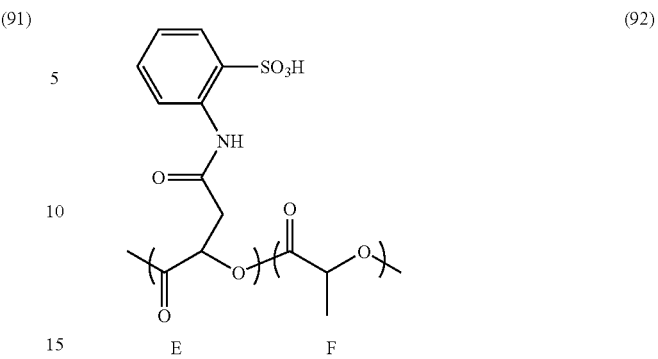

(92)

E    F

It was also confirmed that polyhydroxyalkanoate represented by the chemical formula (91) was a copolymer with a proportion by 13 mol % of unit E and 87 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=9,500 and a weight-averaged molecular weight Mw=12,600.

It was also confirmed that polyhydroxyalkanoate represented by the chemical formula (92) was a copolymer with a proportion by 16 mol % of unit E and 84 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=9,100 and a weight-averaged molecular weight Mw=12,200.

Example 47

Condensation Reaction of Polyhydroxyalkanoate Synthesized in Example 27 and Comprised of a Unit Represented by the Chemical Formula (72), and 2-aminobenzenesulfonic Acid In a nitrogen atmosphere, 0.40 g of polyhydroxyalkanoate copolymer (C: 16 mol %, D: 84 mol %) obtained in Example 27 and comprised of a unit represented by the chemical formula (72) and 0.70 g of 2-aminobenzenesulfonic acid were placed in a 100-ml three-necked flask, agitated with 15.0 ml of pyridine, further added with 2.11 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer.

The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (92) as monomer units.

Example 48

Condensation Reaction of Polyhydroxyalkanoate Synthesized in Example 28 and Comprised of a Unit Represented by the Chemical Formula (73), and 2-aminobenzenesulfonic Acid In a nitrogen atmosphere, 0.40 g of polyhydroxyalkanoate copolymer (C: 9 mol %, D: 91 mol %) obtained in Example 28 and comprised of a unit represented by the chemical formula (73) and 0.49 g of 2-aminobenzenesulfonic acid were placed in a 100-ml three-necked flask, agitated with 15.0 ml of pyridine, further added with 1.48 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.35 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (93) as monomer units.

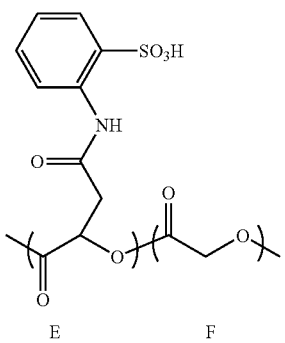

(93)

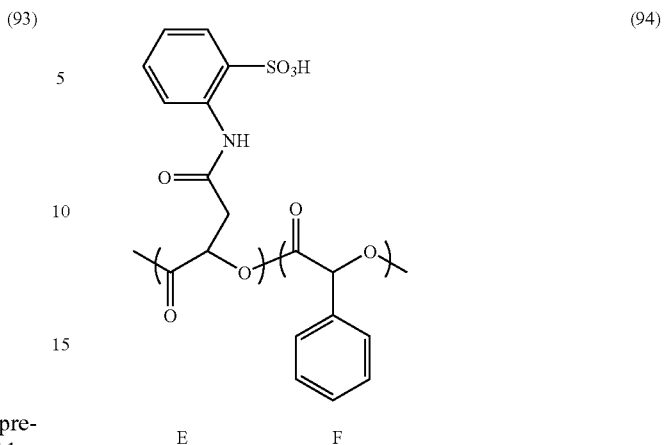

(94)

It was also confirmed that polyhydroxyalkanoate represented by the chemical formula (93) was a copolymer with a proportion by 9 mol % of unit E and 91 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,900 and a weight-averaged molecular weight Mw=16,200.

It was also confirmed that polyhydroxyalkanoate represented by the chemical formula (94) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,400 and a weight-averaged molecular weight Mw=23,100.

Example 49

Condensation Reaction of Polyhydroxyalkanoate Synthesized in Example 29 and Comprised of a Unit Represented by the Chemical Formula (74), and 2-aminobenzenesulfonic Acid In a nitrogen atmosphere, 0.40 g of polyhydroxyalkanoate copolymer (C: 7 mol %, D: 93 mol %) obtained in Example 29 and comprised of a unit represented by the chemical formula (74) and 0.18 g of 2-aminobenzenesulfonic acid were placed in a 100-ml three-necked flask, agitated with 15.0 ml of pyridine, further added with 0.55 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by 1H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak resulting from an aromatic ring of the 2-aminobenzenesulfonic acid structure, that the polymer was a polyhydroxyalkanoate comprising units represented by a chemical formula (94) as monomer units.

Example 50

Esterification Reaction of Polyhydroxyalkanoate Synthesized in Example 30 and Comprised of a Unit Represented by the Chemical Formula (75)

0.30 g of polyhydroxyalkanoate copolymer (E: 8 mol %, F: 92 mol %) obtained in Example 30 and comprised of a unit represented by the chemical formula (75) were placed in an eggplant-shaped flask, dissolved by adding 21.0 ml of chloroform and 7.0 ml of methanol, and cooled to 0° C. Then 1.35 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer.

The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by a chemical formula (95) as monomer units.

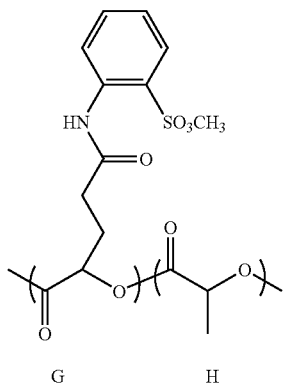

(95)

G  H

It was also confirmed that polyhydroxyalkanoate represented by the chemical formula (95) was a copolymer with a proportion by 8 mol % of unit G and 92 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=10,900 and a weight-averaged molecular weight Mw=15,600.

Example 51

Esterification Reaction of Polyhydroxyalkanoate Synthesized in Example 33 and Comprised of a Unit Represented by the Chemical Formula (78)

0.30 g of polyhydroxyalkanoate copolymer (E: 7 mol %, F: 93 mol %) obtained in Example 33 and comprised of a unit represented by the chemical formula. (78) were placed in an eggplant-shaped flask, dissolved by adding 21.0 ml of chloroform and 7.0 ml of methanol, and cooled to 0° C. Then 1.17 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer.

The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by ¹H-NMR (FT-NMR: Bruker DPX 400, resonance frequency: 400 MHz, measured species: ¹H, solvent: deuterized DMSO, temperature: room temperature). A result of ¹H-NMR confirmed, based on a peak attributable to methyl sulfonate at 3-4 ppm, that the polymer was a polyhydroxyalkanoate comprising units represented by a chemical formula (96) as monomer units.

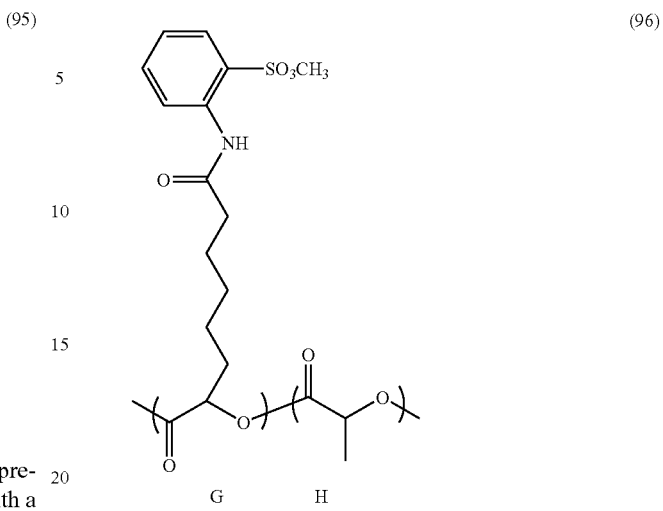

(96)

G  H

It was also confirmed that polyhydroxyalkanoate represented by the chemical formula (96) was a copolymer with a proportion by 7 mol % of unit G and 93 mol % of unit H.

Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=9,700 and a weight-averaged molecular weight Mw=13,800.

Example 52)

Esterification Reaction of Polyhydroxyalkanoate Synthesized in Example 34 and Comprised of a Unit Represented by the Chemical Formula (79)

0.30 g of polyhydroxyalkanoate copolymer (E: 8 mol %, F: 92 mol %) obtained in Example 34 and comprised of a unit represented by the chemical formula (79) were placed in an eggplant-shaped flask, dissolved by adding 21.0 ml of chloroform and 7.0 ml of methanol, and cooled to 0° C. Then 1.36 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer.

The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.31 g of a polymer. The structure of the obtained polymer was analyzed by ¹H-NMR (FT-NMR: Bruker DPX 400, resonance frequency: 400 MHz, measured species: ¹H, solvent: deuterized DMSO, temperature: room temperature). A result of ¹H-NMR confirmed, based on a peak attributable to methyl sulfonate at 3-4 ppm, that the polymer was a polyhydroxyalkanoate comprising units represented by a chemical formula (97) as monomer units.

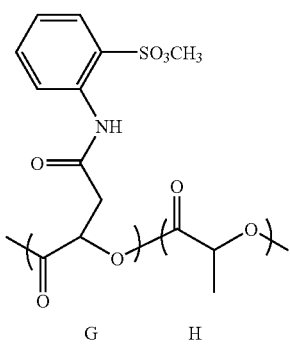

(97)

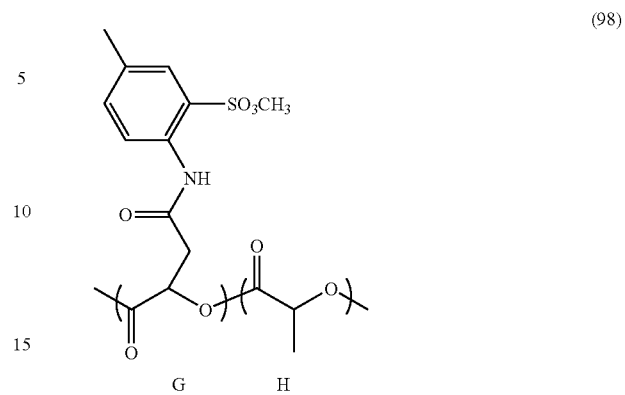

(98)

It was also confirmed that polyhydroxyalkanoate represented by the chemical formula (97) was a copolymer with a proportion by 8 mol % of unit G and 92 mol % of unit H.

Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5 μ MIXED-C, solvent: DMF/LiBr 0.1% (w/v), converted as polystyrene). As a result, there were obtained a number-averaged molecular weight Mn=11,600 and a weight-averaged molecular weight Mw=16,900.

It was also confirmed that polyhydroxyalkanoate represented by the chemical formula (98) was a copolymer with a proportion by 8 mol % of unit G and 92 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=10,500 and a weight-averaged molecular weight Mw=15,500.

Example 53

Esterification Reaction of Polyhydroxyalkanoate Synthesized in Example 35 and Comprised of a Unit Represented by the Chemical Formula (80)

0.30 g of polyhydroxyalkanoate copolymer (E: 8 mol %, F: 92 mol %) obtained in Example 35 and comprised of a unit represented by the chemical formula (80) were placed in an eggplant-shaped flask, dissolved by adding 21.0 ml of chloroform and 7.0 ml of methanol, and cooled to 0° C. Then 1.35 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by a chemical formula (98) as monomer units.

Example 54

Esterification Reaction of Polyhydroxyalkanoate Synthesized in Example 38 and Comprised of a Unit Represented by the Chemical Formula (83)

0.30 g of polyhydroxyalkanoate copolymer (E: 8 mol %, F: 92 mol %) obtained in Example 38 and comprised of a unit represented by the chemical formula (83) were placed in an eggplant-shaped flask, dissolved by adding 21.0 ml of chloroform and 7.0 ml of methanol, and cooled to 0° C. Then 1.33 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by a chemical formula (99) as monomer units.

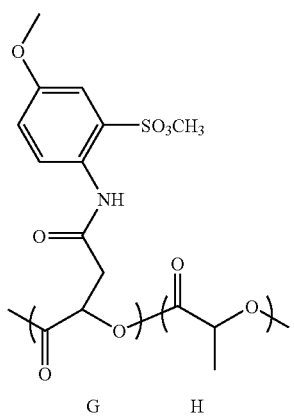

(99)

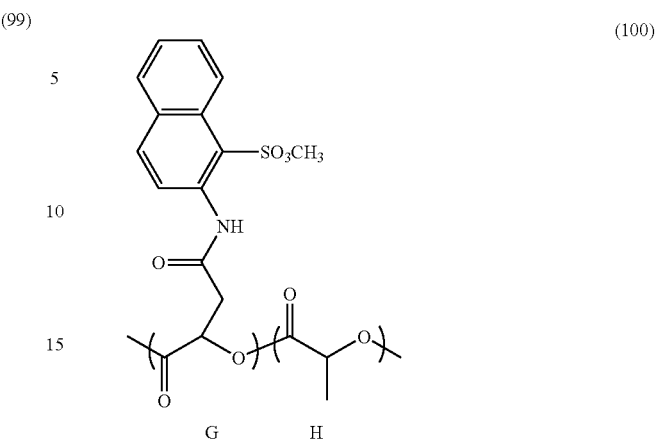

(100)

It was also confirmed that polyhydroxyalkanoate represented by the chemical formula (99) was a copolymer with a proportion by 8 mol % of unit G and 92 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=10,700 and a weight-averaged molecular weight Mw=15,900.

It was also confirmed that polyhydroxyalkanoate represented by the chemical formula (99) was a copolymer with a proportion by 8 mol % of unit G and 92 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=10,900 and a weight-averaged molecular weight Mw=17,200.

Example 55

Esterification Reaction of Polyhydroxyalkanoate Synthesized in Example 41 and Comprised of a Unit Represented by the Chemical Formula (86)

0.30 g of polyhydroxyalkanoate copolymer (E: 8 mol %, F: 92 mol %) obtained in Example 41 and comprised of a unit represented by the chemical formula (86) were placed in an eggplant-shaped flask, dissolved by adding 21.0 ml of chloroform and 7.0 ml of methanol, and cooled to 0° C. Then 1.30 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by a chemical formula (100) as monomer units.

Example 56

Esterification Reaction of Polyhydroxyalkanoate Synthesized in Example 43 and Comprised of a Unit Represented by the Chemical Formula (88)

0.30 g of polyhydroxyalkanoate copolymer (E: 8 mol %, F: 92 mol %) obtained in Example 43 and comprised of a unit represented by the chemical formula (88) were placed in an eggplant-shaped flask, dissolved by adding 21.0 ml of chloroform and 7.0 ml of methanol, and cooled to 0° C. Then 1.39 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.31 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by chemical formula (101) as monomer units.

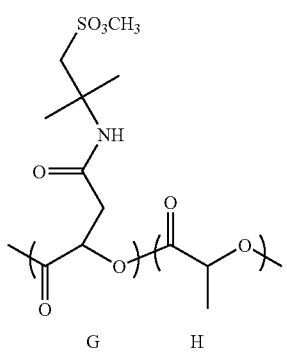

(101)

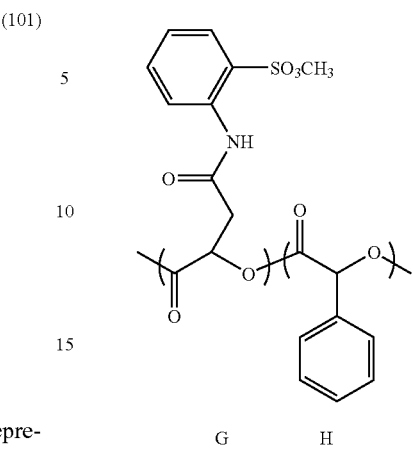

(102)

It was also confirmed that polyhydroxyalkanoate represented by the chemical formula (101) was a copolymer with a proportion by 8 mol % of unit G and 92 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=9,900 and a weight-averaged molecular weight. Mw=14,500.

It was also confirmed that polyhydroxyalkanoate represented by the chemical formula (102) was a copolymer with a proportion by 7 mol % of unit G and 93 mol % of unit H. Also an acid value titration utilizing a potentiometric titration apparatus AT510 (manufactured by Kyoto Electron Co.) did not show a peak attributable to a sulfonic acid, thus clarifying that the sulfonic acid was converted to methyl sulfonate. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=11,200 and a weight-averaged molecular weight Mw=23,000.

Example 57

Esterification Reaction of Polyhydroxyalkanoate Synthesized in Example 49 and Comprised of a Unit Represented by the Chemical Formula (94)

0.30 g of polyhydroxyalkanoate copolymer (E: 7 mol %, F: 93 mol %) obtained in Example 49 and comprised of a unit represented by the chemical formula (94) were placed in an eggplant-shaped flask, dissolved by adding 21.0 ml of chloroform and 7.0 ml of methanol, and cooled to 0° C. Then 0.73 ml of a 2 mol/L hexane solution of trimethylsilyl diazomethane (manufactured by Aldrich Inc.) were added and the mixture was agitated for 4 hours. After the reaction, the solvent was distilled off in an evaporator to recover a polymer. The polymer was re-dissolved dissolved by adding 21.0 ml of chloroform and 7.0 ml of methanol, and the solvent was distilled off in an evaporator. This process was repeated three times. The recovered polymer was dried under a reduced pressure to obtain 0.30 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). A result of $^1$H-NMR confirmed, based on a peak attributable to methyl sulfonate at 3-4 ppm, that the polymer was a polyhydroxyalkanoate comprising units represented by chemical formula (102) as monomer units.

Example 58

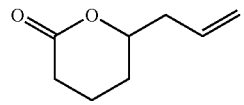

(103)

Polyester Synthesis Employing Tetrahydro-6-(2-propenyl)-2H-pyran-2-one Represented by Chemical Formula (103)

1.40 g (10.0 mmol) of tetrahydro-6-(2-propenyl)-2H-pyran-2-one, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.46 g of a polymer. A NMR analysis conducted under conditions same as in Example 6 for specifying the structure of the obtained polymer confirmed a polyhydroxyalkanoate comprising units represented by a chemical formula (104) as monomer units.

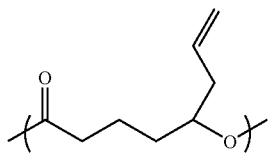
(104)

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=10,100 and a weight-averaged molecular weight Mw=12,100.

Example 59

Polyester Synthesis Employing tetrahydro-6-(2-propenyl)-2H-pyran-2-one and L-lactide 0.42 g (3.0 mmol) of tetrahydro-6-(2-propenyl)-2H-pyran-2-one, 1.01 g (7.0 mmol) of L-lactide, 20 µl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.84 g of a polymer. A NMR analysis conducted under conditions same as in Example 6 for specifying the structure of the obtained polymer confirmed a polyhydroxyalkanoate copolymer comprising units represented by a chemical formula (105) as monomer units. It was also confirmed that the monomer units had a proportion of unit A by 17 mol % and unit B by 83 mol %.

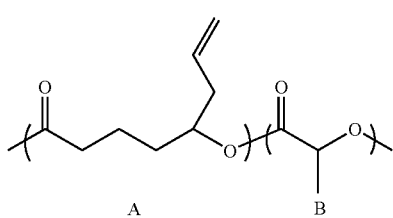
(105)

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=68,100 and a weight-averaged molecular weight Mw=104,200.

Example 60

Polyester Synthesis Employing tetrahydro-6-(2-propenyl)-2H-pyran-2-one and L-lactide 0.28 g (2.0 mmol) of tetrahydro-6-(2-propenyl)-2H-pyran-2-one, 1.15 g (8.0 mmol) of L-lactide, 20 µl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.06 g of a polymer. A NMR analysis conducted under conditions same as in Example 6 for specifying the structure of the obtained polymer confirmed a polyhydroxyalkanoate copolymer comprising units represented by a chemical formula (106) as monomer units. It was also confirmed that the monomer units had a proportion of unit A by 11 mol % and unit B by 89 mol %.

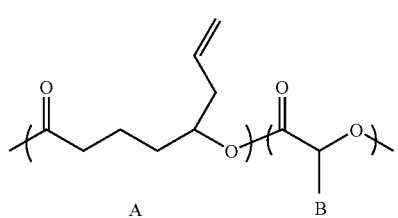
(106)

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=142,500 and a weight-averaged molecular weight Mw=233,700.

Example 61

Polyester Synthesis Employing tetrahydro-6-(2-propenyl)-2H-pyran-2-one and Mandelide 0.28 g (2.0 mmol) of tetrahydro-6-(2-propenyl)-2H-pyran-2-one, 2.15 g (8.0 mmol) of mandelide, 20 µl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.59 g of a polymer. A NMR analysis conducted under conditions same as in Example 6 for specifying the structure of the obtained polymer confirmed a polyhydroxyalkanoate copolymer comprising units represented by a chemical formula (107) as monomer units. It was also confirmed that the monomer units had a proportion of unit A by 12 mol % and unit B by 88 mol %.

(107)

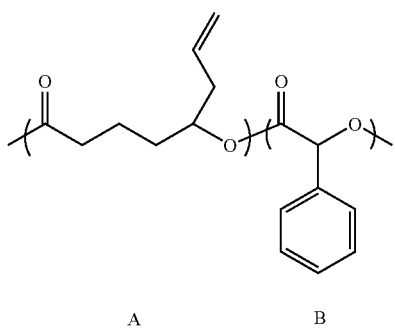

A      B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn 12,000 and a weight-averaged molecular weight Mw=24,200.

Example 62

(108)

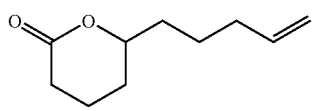

Polyester Synthesis Employing tetrahydro-6-(4-pentenyl)-2H-pyran-2-one Represented by Chemical Formula (108) and L-Lactide 0.34 g (2.0 mmol) of tetrahydro-6-(4-pentenyl)-2H-pyran-2-one, 1.15 g (8.0 mmol) of L-lactide, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.89 g of a polymer. A NMR analysis conducted under conditions same as in Example 6 for specifying the structure of the obtained polymer confirmed a polyhydroxyalkanoate copolymer comprising units represented by a chemical formula (109) as monomer units. It was also confirmed that the monomer units had a proportion of unit A by 8 mol % and unit B by 92 mol %.

(109)

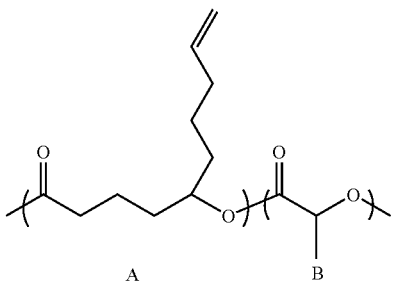

A      B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn 49,000 and a weight-averaged molecular weight Mw 88,200.

Example 63

Polyester Synthesis Employing tetrahydro-6-(4-pentenyl)-2H-pyran-2-one and δ-valerolactone 0.34 g (2.0 mmol) of tetrahydro-6-(4-pentenyl)-2H-pyran-2-one, 0.80 g (8.0 mmol) of δ-valerolactone, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.89 g of a polymer. A NMR analysis conducted under conditions same as in Example 6 for specifying the structure of the obtained polymer confirmed a polyhydroxyalkanoate copolymer comprising units represented by a chemical formula (110) as monomer units. It was also confirmed that the monomer units had a proportion of unit A by 8 mol % and unit B by 92 mol %.

(110)

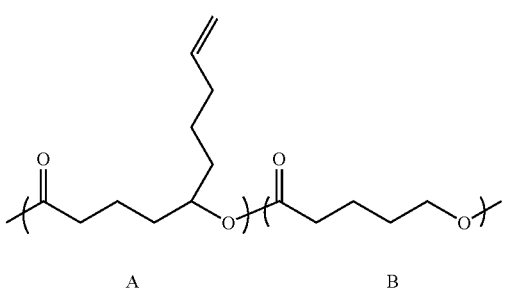

A      B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polysty-

Example 64

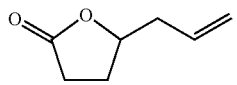
(111)

Polyester Synthesis Employing dihydro-5-(2-propenyl)-2(3H)-furanone and L-lactide 0.63 g (5.0 mmol) of dihydro-5-(2-propenyl)-2(3H)-furanone, 0.72 g (5.0 mmol) of L-lactide, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.58 g of a polymer. A NMR analysis conducted under conditions same as in Example 6 for specifying the structure of the obtained polymer confirmed a polyhydroxyalkanoate copolymer comprising units represented by a chemical formula (112) as monomer units. It was also confirmed that the monomer units had a proportion of unit A by 7 mol % and unit B by 93 mol %.

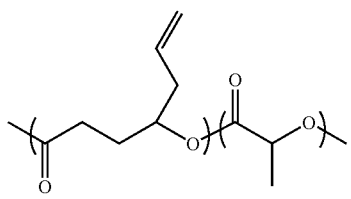
(112)

A     B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=7,200 and a weight-averaged molecular weight Mw=9,300.

Example 65

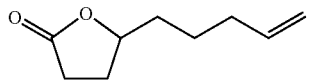
(113)

Polyester Synthesis Employing dihydro-5-(4-pentenyl)-2(3H)-furanone Represented by Chemical Formula (113) and δ-valerolactone 0.77 g (5.0 mmol) of dihydro-5-(4-pentenyl)-2(3H)-furanone, 0.40 g (5.0 mmol) of δ-valerolactone, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.39 g of a polymer. A NMR analysis conducted under conditions same as in Example 6 for specifying the structure of the obtained polymer confirmed a polyhydroxyalkanoate copolymer comprising units represented by a chemical formula (114) as monomer units. It was also confirmed that the monomer units had a proportion of unit A by 6 mol % and unit B by 94 mol %.

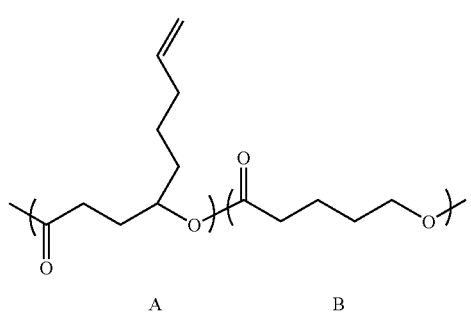
(114)

A     B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,400 and a weight-averaged molecular weight Mw=8,600.

Example 66

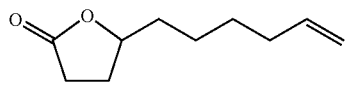
(115)

Polyester Synthesis Employing dihydro-5-(5-hexenyl)-2(3H)-furanone Represented by Chemical Formula (115) and glycolide 0.84 g (5.0 mmol) of dihydro-5-(5-hexenyl)-2(3H)-furanone, 0.58 g (5.0 mmol) of glycolide, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 0.53 g of a polymer. A NMR analysis conducted under conditions same as in Example 6 for specifying the structure of the obtained polymer confirmed a polyhydroxyalkanoate copolymer comprising units represented by a chemical formula (116) as monomer units. It was also confirmed that the monomer units had a proportion of unit A by 7 mol % and unit B by 93 mol %.

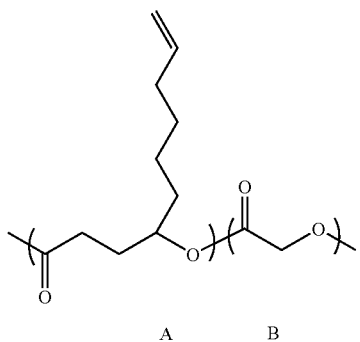

(116)

A   B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,800 and a weight-averaged molecular weight Mw=8,800.

Example 67

Oxidation Reaction of Polyhydroxyalkanoate Synthesized in Example 60 and Comprised of a Unit Represented by the Chemical Formula (106)

0.50 g of polyhydroxyalkanoate copolymer (A: 11 mol %, B: 89 mol %) obtained in Example 60 and comprised of a unit represented by the chemical formula (106) were placed in an eggplant-shaped flask and dissolved by adding 30 ml of acetone. The solution was placed on an iced bath, then added with 5 ml of acetic acid and 0.55 g of 18-crown-6-ether were added and agitated. Then, on an iced bath, 0.44 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 56 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.43 g of polymer. A NMR analysis conducted under conditions same as in Example 6 for specifying the structure of the obtained compound confirmed a polyhydroxyalkanoate comprising units represented by a chemical formula (117) as monomer units.

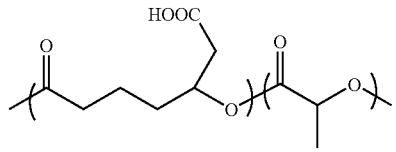

(117)

C   D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=98,500 and a weight-averaged molecular weight Mw=166,400.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate. A NMR analysis conducted under conditions same as in Example 6 confirmed that polyhydroxyalkanoate represented by the chemical formula (117) was a copolymer with a proportion by 10 mol % of unit C and 90 mol % of unit D.

Example 68

Oxidation Reaction of Polyhydroxyalkanoate Synthesized in Example 61 and Comprised of a Unit Represented by the Chemical Formula (107)

0.50 g of polyhydroxyalkanoate copolymer (A: 12 mol %, B: 88 mol %) obtained in Example 61 and comprised of a unit represented by the chemical formula (107) were placed in an eggplant-shaped flask and dissolved by adding 30 ml of acetone. The solution was placed on an iced bath, then added with 5 ml of acetic acid and 0.35 g of 18-crown-6-ether were added and agitated. Then, on an iced bath, 0.28 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (118) as monomer units.

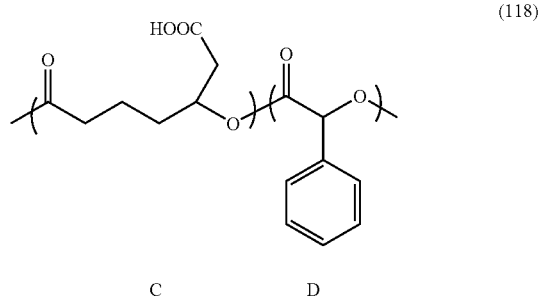

(118)

C  D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=8,400 and a weight-averaged molecular weight Mw=16,300.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 30 mg of polyhydroxyalkanoate.

A NMR analysis conducted under conditions same as in Example 6 confirmed that polyhydroxyalkanoate represented by the chemical formula (118) was a copolymer with a proportion by 11 mol % of unit C and 89 mol % of unit D.

Example 69

Oxidation Reaction of Polyhydroxyalkanoate Synthesized in Example 62 and Comprised of a Unit Represented by the Chemical Formula (109)

0.50 g of polyhydroxyalkanoate copolymer (A: 8 mol %, B: 92 mol %) obtained in Example 62 and comprised of a unit represented by the chemical formula (109) were placed in an eggplant-shaped flask and dissolved by adding 30 ml of acetone. The solution was placed on an iced bath, then added with 5 ml of acetic acid and 0.40 g of 18-crown-6-ether were added and agitated. Then, on an iced bath, 0.32 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=0.1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.43 g of polymer. A NMR analysis conducted under conditions same as in Example 6 for specifying the structure of the obtained compound confirmed a polyhydroxyalkanoate comprising units represented by a chemical formula (119) as monomer units.

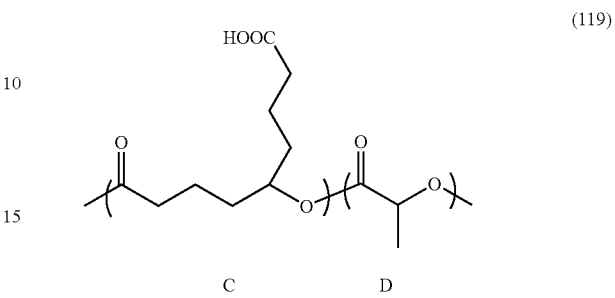

(119)

C  D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=32,500 and a weight-averaged molecular weight Mw=59,500.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (119) was a copolymer with a proportion by 7 mol % of unit C and 93 mol % of unit D.

Example 70

Oxidation Reaction of Polyhydroxyalkanoate Synthesized in Example 63 and Comprised of a Unit Represented by the Chemical Formula (110)

0.50 g of polyhydroxyalkanoate copolymer (A: 8 mol %, B: 92 mol %) obtained in Example 63 and comprised of a unit represented by the chemical formula (110) were placed in an eggplant-shaped flask and dissolved by adding 30 ml of acetone. The solution was placed on an iced bath, then added with 5 ml of acetic acid and 0.30 g of 18-crown-6-ether were added and agitated. Then, on an iced bath, 0.24 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.42 g of polymer. A NMR analysis conducted under conditions same as in Example 6 for specifying the structure of the obtained compound confirmed a polyhydroxyalkanoate comprising units represented by a chemical formula (120) as monomer units.

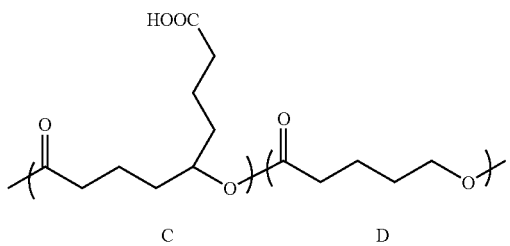

(120)

C  D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=7,300 and a weight-averaged molecular weight Mw=9,900.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 27 mg of polyhydroxyalkanoate.

A NMR analysis conducted under conditions same as in Example 6 confirmed that polyhydroxyalkanoate represented by the chemical formula (120) was a copolymer with a proportion by 7 mol % of unit C and 93 mol % of unit D.

Example 71

Oxidation Reaction of Polyhydroxyalkanoate Synthesized in Example 64 and Comprised of a Unit Represented by the Chemical Formula (112)

0.50 g of polyhydroxyalkanoate copolymer (A: 7 mol %, B: 93 mol %) obtained in Example 64 and comprised of a unit represented by the chemical formula (112) were placed in an eggplant-shaped flask and dissolved by adding 30 ml of acetone. The solution was placed on an iced bath, then added with 5 ml of acetic acid and 0.37 g of 18-crown-6-ether were added and agitated. Then, on an iced bath, 0.29 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.43 g of polymer. A NMR analysis conducted under conditions same as in Example 6 for specifying the structure of the obtained compound confirmed a polyhydroxyalkanoate comprising units represented by a chemical formula (121) as monomer units.

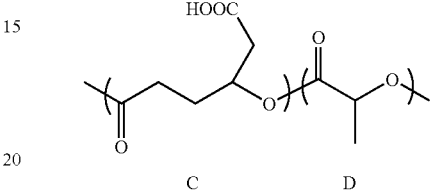

(121)

C  D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,400 and a weight-averaged molecular weight Mw=8,400.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 27 mg of polyhydroxyalkanoate.

A NMR analysis conducted under conditions same as in Example 6 confirmed that polyhydroxyalkanoate represented by the chemical formula (121) was a copolymer with a proportion by 7 mol % of unit C and 93 mol % of unit D.

Example 72

Oxidation Reaction of Polyhydroxyalkanoate Synthesized in Example 66 and Comprised of a Unit Represented by the Chemical Formula (116)

0.50 g of polyhydroxyalkanoate copolymer (A: 7 mol %, B: 93 mol %) obtained in Example 66 and comprised of a unit represented by the chemical formula (116) were placed in an eggplant-shaped flask and dissolved by adding 30 ml of acetone. The solution was placed on an iced bath, then added with 5 ml of acetic acid and 0.42 g of 18-crown-6-ether were added and agitated. Then, on an iced bath, 0.34 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in 3 ml of THF, and re-precipitated in methanol of a 50-times amount of that of THF required for the dissolving. The precipitate was recovered and dried under a reduced pressure to obtain 0.45 g of polymer. A NMR analysis conducted under conditions same as in Example 6 for specifying the structure of the obtained compound confirmed a polyhydroxyalkanoate comprising units represented by a chemical formula (122) as monomer units.

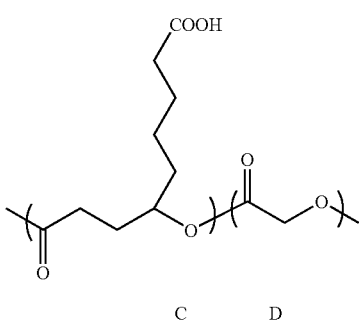

(122)

C   D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,200 and a weight-averaged molecular weight Mw=8,400.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (122) was a copolymer with a proportion by 7 mol % of unit C and 93 mol % of unit D.

Example 73

Condensation Reaction of Polyhydroxyalkanoate Synthesized in Example 67 and Comprised of a Unit Represented by the Chemical Formula (117), and 2-Aminobenzenesulfonic Acid In a nitrogen atmosphere, 0.40 g of polyhydroxyalkanoate copolymer (C: 10 mol %, D: 90 mol %) obtained in Example 67 and comprised of a unit represented by the chemical formula (117) and 0.43 g of 2-aminobenzenesulfonic acid were placed in a 100-ml three-necked flask, agitated with 15.0 ml of pyridine, further added with 1.29 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak derived from an aromatic ring of the 2-aminobenzenesulfonic acid structure, that the polymer was a polyhydroxyalkanoate comprising units represented by a chemical formula (123) as monomer units.

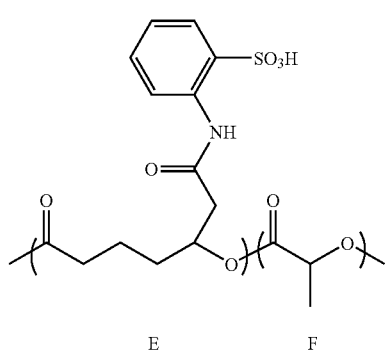

(123)

E   F

It was also confirmed that polyhydroxyalkanoate represented by the chemical formula (123) was a copolymer with a proportion by 10 mol % of unit E and 90 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=83,500 and a weight-averaged molecular weight Mw=146,500.

Example 74

Condensation Reaction of Polyhydroxyalkanoate Synthesized in Example 68 and Comprised of a Unit Represented by the Chemical Formula (118), and 4-methoxyaniline-2-sulfonic Acid In a nitrogen atmosphere, 0.40 g of polyhydroxyalkanoate copolymer (C: 11 mol %, D: 89 mol %) obtained in Example 68 and comprised of a unit represented by the chemical formula (118) and 0.33 g of 4-methoxyaniline-2-sulfonic acid were placed in a 100-mil three-necked flask, agitated with 15.0 ml of pyridine, further added with 0.84 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.35 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak derived from an aromatic ring of the 4-methoxyaniline-2-sulfonic acid structure, that the polymer was a polyhydroxyalkanoate comprising units represented by a chemical formula (124) as monomer units.

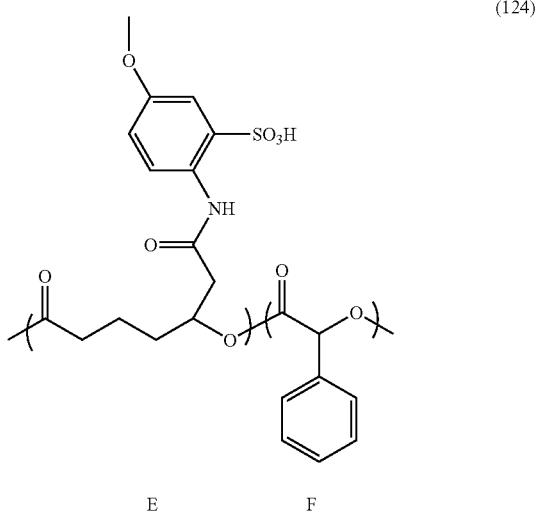

(124)

E    F

It was also confirmed that polyhydroxyalkanoate represented by the chemical formula (124) was a copolymer with a proportion by 11 mol % of unit E and 89 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=8,400 and a weight-averaged molecular weight Mw=16,400.

Example 75

Condensation Reaction of Polyhydroxyalkanoate Synthesized in Example 69 and Comprised of a Unit Represented by the Chemical Formula (119), and 2-amino-1-naphthalenesulfonic Acid In a nitrogen atmosphere, 0.40 g of polyhydroxyalkanoate copolymer (C: 7 mol %, D: 93 mol %) obtained in Example 69 and comprised of a unit represented by the chemical formula (119) and 0.39 g of 2-amino-1-naphthalenesulfonic acid were placed in a 100-ml three-necked flask, agitated with 15.0 ml of pyridine; further added with 0.91 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak derived from an aromatic ring of the 2-amino-1-naphthalenesulfonic acid structure, that the polymer was a polyhydroxyalkanoate comprising units represented by a chemical formula (125) as monomer units.

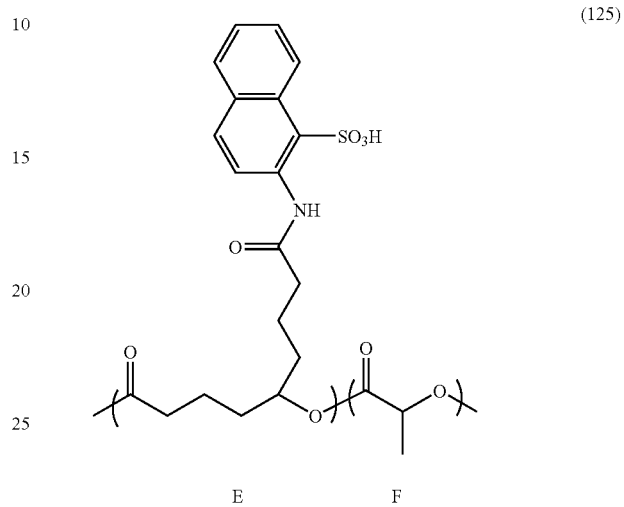

(125)

E    F

It was also confirmed that polyhydroxyalkanoate represented by the chemical formula (125) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=30,100 and a weight-averaged molecular weight Mw=54,500.

Example 76

Condensation Reaction of Polyhydroxyalkanoate Synthesized in Example 70 and Comprised of a Unit Represented by the Chemical Formula (120), and 2-amino-2-methylpropanesulfonic Acid In a nitrogen atmosphere, 0.40 g of polyhydroxyalkanoate copolymer (C: 7 mol %, D: 93 mol %) obtained in Example 70 and comprised of a unit represented by the chemical formula (120) and 0.20 g of 2-amino-2-methylpropanesulfonic acid were placed in a 100-ml three-necked flask, agitated with 15.0 ml of pyridine, further added with 0.69 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed by a shift in a peak derived from a methylene group of the 2-amino-2-methylpropanesulfonic acid structure, that the polymer was a polyhydroxyalkanoate comprising units represented by a chemical formula (126) as monomer units.

(126)

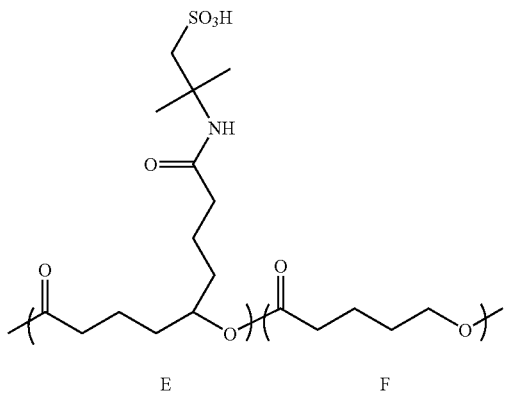

It was also confirmed that polyhydroxyalkanoate represented by the chemical formula (126) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=7,000 and a weight-averaged molecular weight Mw=9,700.

Example 77

Condensation Reaction of Polyhydroxyalkanoate Synthesized in Example 71 and Comprised of a Unit Represented by the Chemical Formula (121), and 2-aminobenzenesulfonic Acid Phenyl Ester In a nitrogen atmosphere, 0.40 g of polyhydroxyalkanoate copolymer (C: 7 mol %, D: 93 mol %) obtained in Example 71 and comprised of a unit represented by the chemical formula (121) and 0.45 g of 2-aminobenzenesulfonic acid phenyl ester were placed in a 100-ml three-necked flask, agitated with 15.0 ml of pyridine, further added with 0.95 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.36 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak derived from an aromatic ring of the 2-aminobenzenesulfonic acid phenyl ester structure, that the polymer was a polyhydroxyalkanoate comprising units represented by a chemical formula (127) as monomer units.

(127)

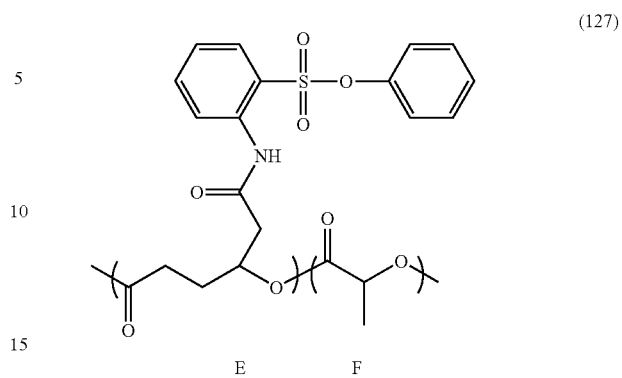

It was also confirmed that polyhydroxyalkanoate represented by the chemical formula (127) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=6,200 and a weight-averaged molecular weight Mw=8,200.

Example 78

Condensation Reaction of Polyhydroxyalkanoate Synthesized in Example 72 and Comprised of a Unit Represented by the Chemical Formula (122), and Taurin In a nitrogen atmosphere, 0.40 g of polyhydroxyalkanoate copolymer (C: 7 mol %, D: 93 mol %) obtained in Example 72 and comprised of a unit represented by the chemical formula (122) and 0.26 g of taurin were placed in a 100-ml three-necked flask, agitated with 15.0 ml of pyridine, further added with 1.09 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak derived from a methylene group of taurin structure, that the polymer was a polyhydroxyalkanoate comprising units represented by a chemical formula (128) as monomer units.

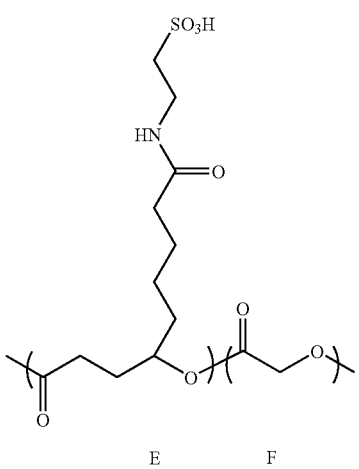

(128)

E  F

It was also confirmed that polyhydroxyalkanoate represented by the chemical formula (128) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn 6,300 and a weight-averaged molecular weight Mw 8,700.

Example 79

Synthesis of L-3-(2-benzyloxycarbonyl)ethyl-1,4-dioxane-2,5-dione Represented by the Chemical Formula (46)

20 g of L-glutamic acid were dissolved in 200 ml of 80% sulfuric acid, maintained at 70° C. and reacted with 500 g of benzyl alcohol to obtain a crude product containing a compound represented by the chemical formula (47) in which a γ-carboxyl group was protected. 100 g of the crude product was added to 1400 ml of 1N sulfuric acid, then, under agitation at 0-5° C., 100 ml of an aqueous solution containing 45.2 g of sodium nitrite were dropwise added over about 3 hours, and the mixture was agitated for 30 minutes. Then 30 ml of an aqueous solution containing 9.4 g of sodium nitrite were dropwise added over about 30 minutes, and the mixture was let to stand overnight at the room temperature. The mixture was then extracted with ether, and an extract was dried over sodium sulfate and concentrated, and remaining crude crystals were purified by silica gel chromatography and recrystallization to obtain a compound represented by the chemical formula (48). 20 g of this compound and 17.4 g of bromoacetyl chloride were dissolved in 300 ml of ether, then cooled to 5° C. or lower and 50 ml of an ether solution containing 9.5 g of triethylamine, corresponding to 1.1 molar equivalents were dropwise added over 30 minutes. The reaction mixture was further agitated for 6 hours at the room temperature, then filtered and 50 ml of water were added to the filtrate which was then agitated for 30 minutes. Water was added and separated several times, and the ether layer was dried by adding sodium sulfate and concentrated to obtain 28.3 g of a compound represented by the chemical formula (49) with an yield of 94%.

A solution of 10 g of the compound of the chemical formula (49) in 50 ml of DMF was dropwise added over about 8 hours, at the room temperature, to a solution (inhomogeneous solution) of 3.6 g of sodium hydrogencarbonate in 950 ml of DMF. The mixture was reacted for further 12 hours at the same temperature, then filtered and concentrated, and a residue was washed with 50 ml of isopropanol. A while powder obtained after a filtration was dissolved in 200 ml of acetone, then the insoluble substance was filtered off and the filtrate was concentrated. A residue was washed with a small amount of isopropanol, separated by filtration and sufficiently dried. The white powder was sublimated and recrystallized from 400 ml of isopropanol to obtain 1.9 g of L-3-(2-benzyloxycarbonyl)ethyl-1,4-dioxane-2,5-dione represented by the chemical formula (46) (yield 24%).

Example 80

Synthesis of L-3-(3-benzyloxycarbonyl)propyl-1,4-dioxane-2,5-dione Represented by a Chemical Formula (129)

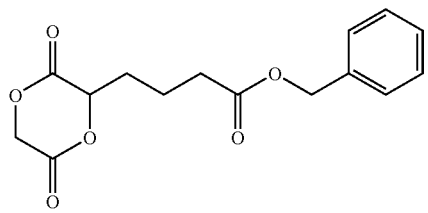

(129)

20 g of L-2-aminoadipic acid were dissolved in 200 ml of 80% sulfuric acid, maintained at 70° C. and reacted with 500 g of benzyl alcohol to obtain a crude product containing a compound represented by a chemical formula (130) in which a 6-carboxyl group was protected. 100 g of the crude product was added to 1400 ml of 1N sulfuric acid, then, under agitation at 0-5° C., 100 ml of an aqueous solution containing 41.7 g of sodium nitrite were dropwise added over about 3 hours, and the mixture was agitated for 30 minutes. Then 30 ml of an aqueous solution containing 8.9 g of sodium nitrite were dropwise added over about 30 minutes, and the mixture was let to stand overnight at the room temperature. The mixture was then extracted with ether, and an extract was dried over sodium sulfate and concentrated, and remaining crude crystals were purified by silica gel chromatography and recrystallization to obtain a compound represented by a chemical formula (131). 20 g of this compound and 16.4 g of bromoacetyl chloride were dissolved in 300 ml of ether, then cooled to 5° C. or lower and 50 ml of an ether solution containing 8.8 g of triethylamine, corresponding to 1.1 molar equivalents were dropwise added over 30 minutes. The reaction mixture was further agitated for 6 hours at the room temperature, then filtered and 50 ml of water were added to the filtrate which was then agitated for 30 minutes. Water was added and separated several times, and the ether layer was dried by adding sodium sulfate and concentrated to obtain 27.0 g of a compound represented by a chemical formula (132) with an yield of 92%.

A solution of 10 g of the compound of the chemical formula (132) in 50 ml of DMF was dropwise added over about 8 hours, at the room temperature, to a solution (inhomogeneous solution) of 3.4 g of sodium hydrogencarbonate in 950 ml of DMF. The mixture was reacted for further 12 hours at the same temperature, then filtered and concentrated, and a residue was washed with 50 ml of isopropanol. A white powder obtained after a filtration was dissolved in 200 ml of acetone, then the insoluble substance was filtered off and the filtrate was concentrated. A residue was washed with a small amount of isopropanol, separated by filtration and sufficiently dried. The white powder was sublimated and recrystallized from 400 ml of isopropanol to obtain 2.1 g of L-3-(3-benzyloxycarbonyl)propyl-1,4-dioxane-2,5-dione represented by a chemical formula (129) (yield 26%).

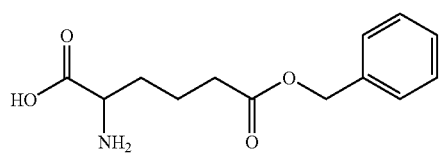

(130)

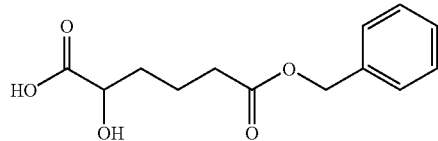

(131)

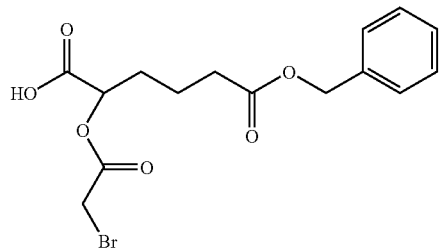

(132)

Example 81

Synthesis of 3-(5-benzyloxycarbonyl)pentyl-1,4-dioxane-2,5-dione Represented by a Chemical Formula (133)

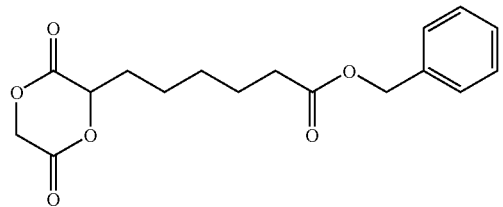

(133)

20 g of 2-aminosebacic acid were dissolved in 200 ml of 80% sulfuric acid, maintained at 70° C. and reacted with 500 g of benzyl alcohol to obtain a crude product containing a compound represented by a chemical formula (134) in which a 8-carboxyl group was protected. 100 g of the crude product was added to 1400 ml of 1N sulfuric acid, then, under agitation at 0-5° C., 100 ml of an aqueous solution containing 37.6 g of sodium nitrite were dropwise added over about 3 hours, and the mixture was agitated for 30 minutes. Then 30 ml of an aqueous solution containing 8.0 g of sodium nitrite were dropwise added over about 30 minutes, and the mixture was let to stand overnight at the room temperature. The mixture was then extracted with ether, and an extract was dried over sodium sulfate and concentrated, and remaining crude crystals were purified by silica gel chromatography and recrystallization to obtain a compound represented by a chemical formula (135). 20 g of this compound and 14.7 g of bromoacetyl chloride were dissolved in 300 ml of ether, then cooled to 5° C. or lower and 50 ml of an ether solution containing 7.9 g of triethylamine, corresponding to 1.1 molar equivalents were dropwise added over 30 minutes. The reaction mixture was further agitated for 6 hours at the room temperature, then filtered and 50 ml of water were added to the filtrate which was then agitated for 30 minutes. Water was added and separated several times, and the ether layer was dried by adding sodium sulfate and concentrated to obtain 25.8 g of a compound represented by a chemical formula (136) with an yield of 90%.

A solution of 10 g of the compound of the chemical formula (136) in 50 ml of DMF was dropwise added over about 8 hours, at the room temperature, to a solution (inhomogeneous solution) of 3.0 g of sodium hydrogencarbonate in 950 ml of DMF. The mixture was reacted for further 12 hours at the same temperature, then filtered and concentrated, and a residue was washed with 50 ml of isopropanol. A white powder obtained after a filtration was dissolved in 200 ml of acetone, then the insoluble substance was filtered off and the filtrate was concentrated. A residue was washed with a small amount of isopropanol, separated by filtration and sufficiently dried. The white powder was sublimated and recrystallized from 400 ml of isopropanol to obtain 2.0 g of L-3-(5-benzyloxycarbonyl)pentyl-1,4-dioxane-2,5-dione represented by the chemical formula (133) (yield 25%).

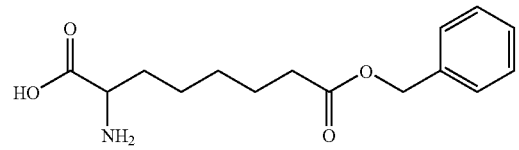

(134)

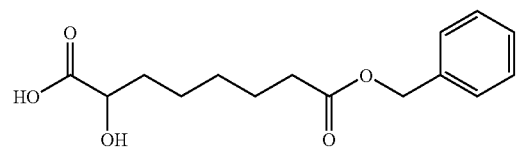

(135)

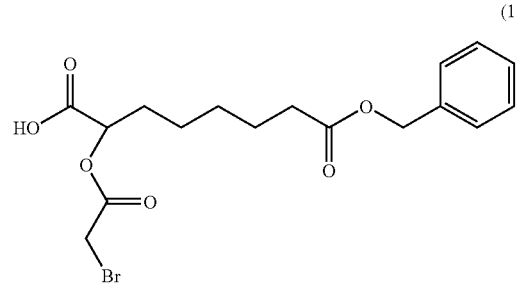

(136)

Example 82

Polyester Synthesis Utilizing L-3-(2-benzyloxycarbonyl)ethyl-1,4-dioxane-2,5-dione and L-lactide 0.29 g (1.0 mmol) of L-3-(2-benzyloxycarbonyl)ethyl-1,4-dioxane-2,5-dione synthesized in Example 79, 1.44 g (10.0 mmol) of L-lactide, and 4 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.47 g of a polymer. A NMR analysis conducted under conditions same as in Example 6 for specifying the structure of the obtained compound confirmed a polyhydroxyalkanoate copolymer comprising units represented by a chemical formula (137) as monomer units. A proportion of the monomer units was confirmed as 6 mol % of unit A and 94 mol % of unit B.

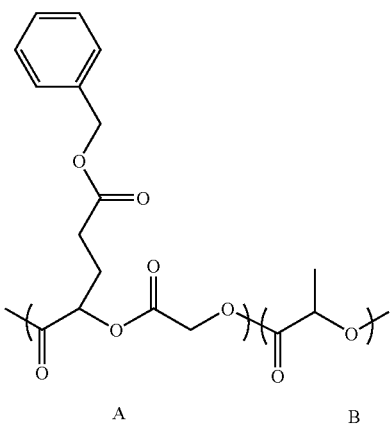

(137)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=46,200 and a weight-averaged molecular weight Mw=61,900. 1.00 g of the obtained polyhydroxyalkanoate copolymer, represented by the chemical formula (137), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.80 g of a polymer. A NMR analysis conducted under conditions same as in Example 6 for specifying the structure of the obtained compound confirmed a polyhydroxyalkanoate copolymer comprising units represented by a chemical formula (138) as monomer units. Also a proportion of the monomer units was confirmed as 6 mol % of unit C and 94 mol % of unit D.

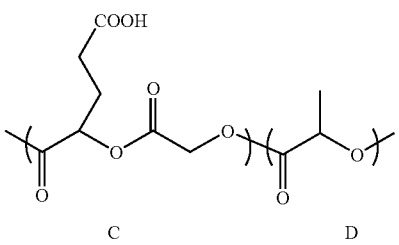

(138)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=38,100 and a weight-averaged molecular weight Mw=53,700.

Example 83

Polyester Synthesis Utilizing L-3-(2-benzyloxycarbonyl)ethyl-1,4-dioxane-2,5-dione and L-lactide 0.56 g (2.0 mmol) of L-3-(2-benzyloxycarbonyl)ethyl-1,4-dioxane-2,5-dione synthesized in Example 79, 1.44 g (10.0 mmol) of L-lactide, and 5 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.70 g of a polymer. A NMR analysis conducted under conditions same as in Example 6 for specifying the structure of the obtained compound confirmed a polyhydroxyalkanoate copolymer comprising units represented by a chemical formula (139) as monomer units. A proportion of the monomer units was confirmed as 12 mol % of unit A and 88 mol % of unit B.

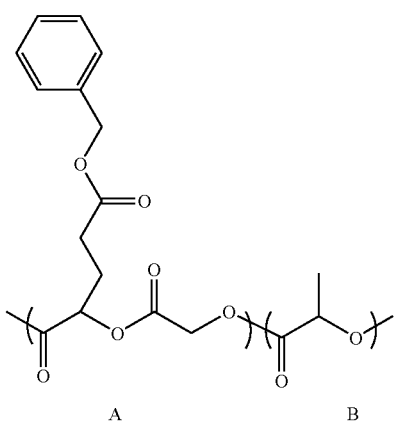

(139)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=52,100 and a weight-averaged molecular weight Mw=66,700. 1.00 g of the obtained polyhydroxyalkanoate copolymer, represented by the chemical formula (139), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.68 g of a polymer.

A NMR analysis conducted under conditions same as in Example 6 for specifying the structure of the obtained compound confirmed a polyhydroxyalkanoate copolymer comprising units represented by a chemical formula (140) as monomer units. Also a proportion of the monomer units was confirmed as 12 mol % of unit C and 88 mol % of unit D.

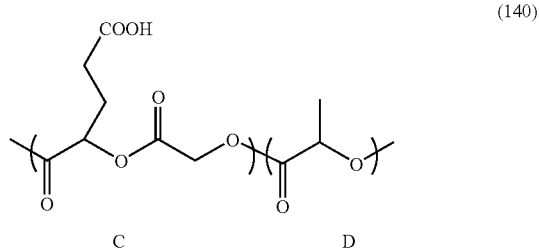
(140)

C        D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=43,700 and a weight-averaged molecular weight Mw=59,400.

Example 84

Polyester Synthesis Utilizing L-3-(2-benzyloxycarbonyl)ethyl-1,4-dioxane-2,5-dione and L-lactide 1.11 g (4.0 mmol) of L-3-(2-benzyloxycarbonyl)ethyl-1,4-dioxane-2,5-dione synthesized in Example 79, 1.44 g (10.0 mmol) of L-lactide, and 6 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 2.23 g of a polymer. A NMR analysis conducted under conditions same as in Example 6 for specifying the structure of the obtained compound confirmed a polyhydroxyalkanoate copolymer comprising units represented by a chemical formula (141) as monomer units. A proportion of the monomer units was confirmed as 22 mol % of unit A and 78 mol % of unit B.

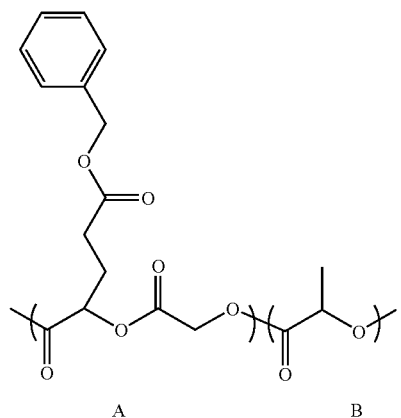
(141)

A        B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=47,300 and a weight-averaged molecular weight Mw=69,100.

1.00 g of the obtained polyhydroxyalkanoate copolymer, represented by the chemical formula (141), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.58 g of a polymer. A NMR analysis conducted under conditions same as in Example 6 for specifying the structure of the obtained compound confirmed a polyhydroxyalkanoate copolymer comprising units represented by a chemical formula (142) as monomer units. Also a proportion of the monomer units was confirmed as 22 mol % of unit C and 78 mol % of unit D.

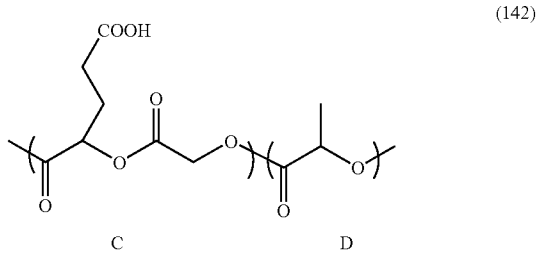
(142)

C        D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=40,400 and a weight-averaged molecular weight Mw=59,400.

Example 85

Polyester Synthesis Utilizing L-3-(3-benzyloxycarbonyl)propyl-1,4-dioxane-2,5-dione and L-Lactide 0.58 g (2.0 mmol) of L-3-(3-benzyloxycarbonyl)propyl-1,4-dioxane-2,5-dione synthesized in Example 80, 1.44 g (10.0 mmol) of L-lactide, and 5 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.70 g of a polymer. A NMR analysis conducted under conditions same as in Example 6 for specifying the structure of the obtained compound confirmed a polyhydroxyalkanoate copolymer comprising units represented by a chemical formula (143) as monomer units. A proportion of the monomer units was confirmed as 10 mol % of unit A and 90 mol % of unit B.

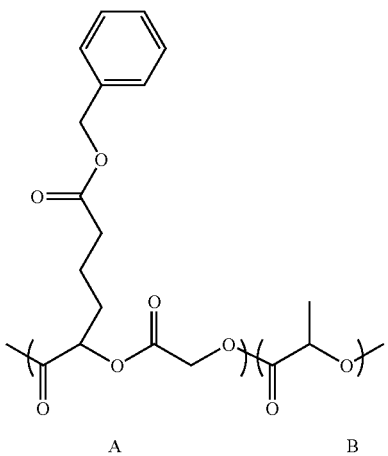

(143)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=49,600 and a weight-averaged molecular weight Mw=67,500.

1.00 g of the obtained polyhydroxyalkanoate copolymer, represented by the chemical formula (143), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.73 g of a polymer. A NMR analysis conducted under conditions same as in Example 6 for specifying the structure of the obtained compound confirmed a polyhydroxyalkanoate copolymer comprising units represented by a chemical formula (144) as monomer units. Also a proportion of the monomer units was confirmed as 10 mol % of unit C and 90 mol % of unit D.

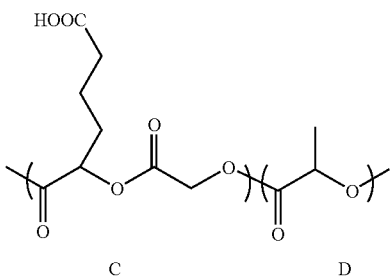

(144)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=44,200 and a weight-averaged molecular weight Mw=64,100.

Example 86

Polyester Synthesis Utilizing L-3-(3-benzyloxycarbonyl)propyl-1,4-dioxane-2,5-dione and L-lactide 1.17 g (4.0 mmol) of L-3-(3-benzyloxycarbonyl)propyl-1,4-dioxane-2,5-dione synthesized in Example 80, 1.44 g (10.0 mmol) of L-lactide, and 6 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 2.07 g of a polymer. A NMR analysis conducted under conditions same as in Example 6 for specifying the structure of the obtained compound confirmed a polyhydroxyalkanoate copolymer comprising units represented by a chemical formula (145) as monomer units. A proportion of the monomer units was confirmed as 18 mol % of unit A and 82 mol % of unit B.

(145)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=49,300 and a weight-averaged molecular weight Mw=69,100.

1.00 g of the obtained polyhydroxyalkanoate copolymer, represented by the chemical formula (145), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.65 g of a polymer. A NMR analysis conducted under conditions same as in Example 6 for specifying the structure of the obtained compound confirmed a polyhydroxyalkanoate copolymer comprising units represented by a chemical formula (146) as monomer units. Also a proportion of the monomer units was confirmed as 18 mol % of unit C and 82 mol % of unit D.

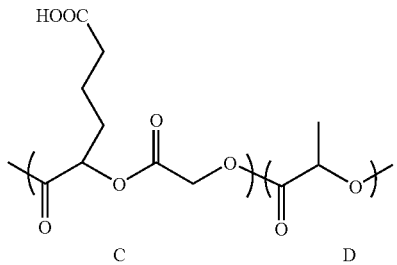

(146)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=42,300 and a weight-averaged molecular weight Mw=59,600.

Example 87

Polyester Synthesis Utilizing L-3-(3-benzyloxycarbonyl)propyl-1,4-dioxane-2,5-dione and mandelide 1.17 g (4.0 mmol) of L-3-(3-benzyloxycarbonyl)propyl-1,4-dioxane-2,5-dione synthesized in Example 80, 2.68 g (10.0 mmol) of mandelide, and 6 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 2.56 g of a polymer. A NMR analysis conducted under conditions same as in Example 6 for specifying the structure of the obtained compound confirmed a polyhydroxyalkanoate copolymer comprising units represented by a chemical formula (147) as monomer units. A proportion of the monomer units was confirmed as 22 mol % of unit A and 78 mol % of unit B.

(147)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=31,000 and a weight-averaged molecular weight Mw=56,100.

1.00 g of the obtained polyhydroxyalkanoate copolymer, represented by the chemical formula (147), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.71 g of a polymer. A NMR analysis conducted under conditions same as in Example 6 for specifying the structure of the obtained compound confirmed a polyhydroxyalkanoate copolymer comprising units represented by a chemical formula (148) as monomer units. Also a proportion of the monomer units was confirmed as 22 mol % of unit C and 78 mol % of unit D.

(148)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=27,600 and a weight-averaged molecular weight Mw=49,400.

Example 88

Polyester Synthesis Utilizing 3-(5-benzyloxycarbonyl)pentyl-1,4-dioxane-2,5-dione and L-lactide 1.28 g (4.0 mmol) of 3-(5-benzyloxycarbonyl)pentyl-1,4-dioxane-2,5-dione synthesized in Example 81, 1.44 g (10.0 mmol) of L-lactide, and 6 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.71 g of a polymer. A NMR analysis conducted under conditions same as in Example 6 for specifying the structure of the obtained compound confirmed a polyhydroxyalkanoate copolymer comprising units represented by a chemical formula (149) as monomer units. A proportion of the monomer units was confirmed as 14 mol % of unit A and 86 mol % of unit B.

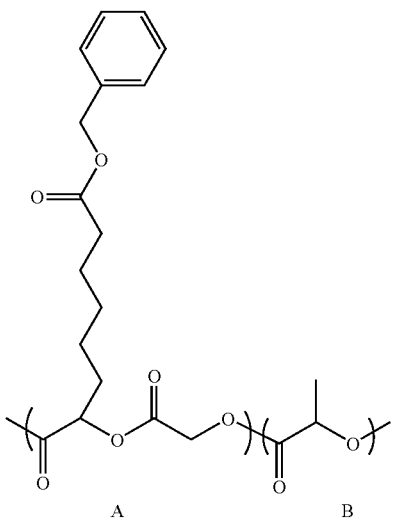

(149)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=22,000 and a weight-averaged molecular weight Mw=34,300.

1.00 g of the obtained polyhydroxyalkanoate copolymer, represented by the chemical formula (149), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.66 g of a polymer. A NMR analysis conducted under conditions same as in Example 6 for specifying the structure of the obtained compound confirmed a polyhydroxyalkanoate copolymer comprising units represented by a chemical formula (150) as monomer units. Also a proportion of the monomer units was confirmed as 14 mol % of unit C and 86 mol % of unit D.

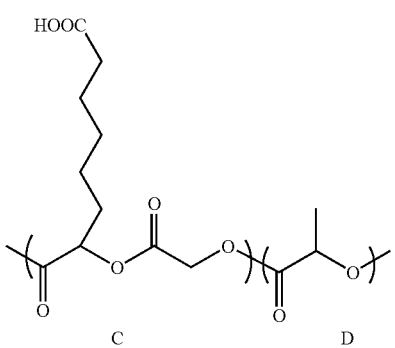

(150)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=19,600 and a weight-averaged molecular weight Mw=29,400.

Example 89

Polyester Synthesis Utilizing 3-(5-benzyloxycarbonyl)pentyl-1,4-dioxane-2,5-dione and mandelide 1.28 g (4.0 mmol) of 3-(5-benzyloxycarbonyl)pentyl-1,4-dioxane-2,5-dione synthesized in Example 81, 2.68 g (10.0 mmol) of mandelide, and 6 ml of a 0.01M toluene solution of tin octylate (tin 2-ethylhexanoate) were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.90 g of a polymer. A NMR analysis conducted under conditions same as in Example 6 for specifying the structure of the obtained compound confirmed a polyhydroxyalkanoate copolymer comprising units represented by a chemical formula (151) as monomer units. A proportion of the monomer units was confirmed as 16 mol % of unit A and 84 mol % of unit B.

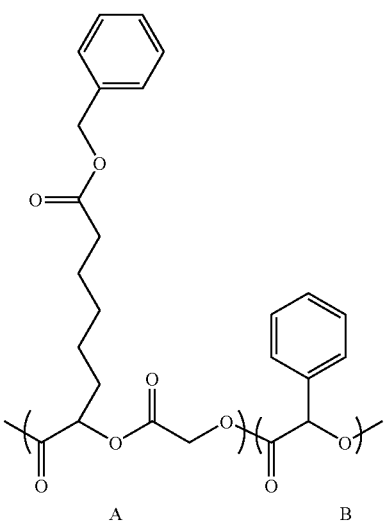

(151)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=18,000 and a weight-averaged molecular weight Mw=31,500.

1.00 g of the obtained polyhydroxyalkanoate copolymer, represented by the chemical formula (151), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.70 g of a polymer. A NMR analysis conducted under conditions same as in Example 6 for specifying the structure of the obtained compound confirmed a polyhydroxyalkanoate copolymer comprising units represented by a chemical formula (152) as monomer units. Also a proportion of the monomer units was confirmed as 16 mol % of unit C and 84 mol % of unit D.

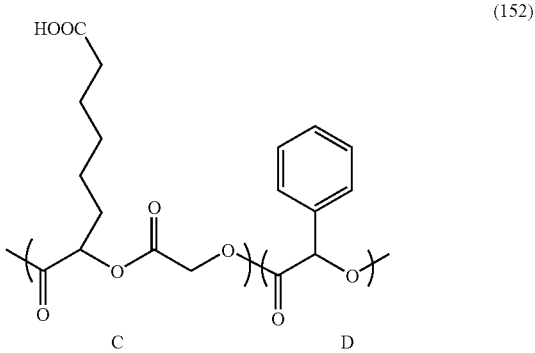

(152)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=17,600 and a weight-averaged molecular weight Mw=31,900.

Example 90

Polyester Synthesis Utilizing β-Malolactone Benzyl Ester and L-Lactide

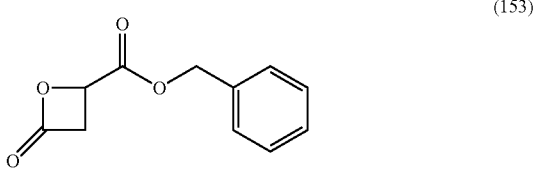

(153)

β-malolactone benzyl ester represented by a chemical formula (153) was synthesized by a method same as that disclosed in U.S. Pat. No. 4,265,247. 0.82 g (4.0 mmol) of β-malolactone benzyl ester, 1.44 g (10.0 mmol) of L-lactide, 28 μl of a 2M toluene solution of diethyl zinc and 11.2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.09 g of a polymer. A NMR analysis conducted under conditions same as in Example 6 for specifying the structure of the obtained compound confirmed a polyhydroxyalkanoate copolymer comprising units represented by a chemical formula (154) as monomer units. A proportion of the monomer units was confirmed as 8 mol % of unit A and 92 mol % of unit B.

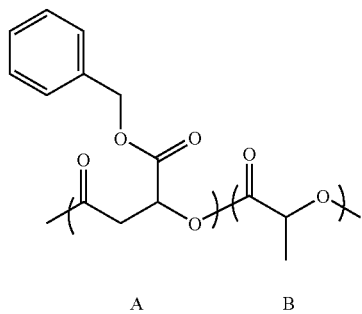

(154)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=8,200 and a weight-averaged molecular weight Mw=12,500.

1.00 g of the obtained polyhydroxyalkanoate copolymer, represented by the chemical formula (154), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.76 g of a polymer. A NMR analysis conducted under conditions same as in Example 6 for specifying the structure of the obtained compound confirmed a polyhydroxyalkanoate copolymer comprising units represented by a following chemical formula (155) as monomer units.

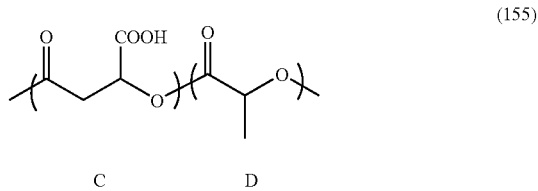

(155)

Also a proportion of the monomer units was confirmed as 8 mol % of unit C and 92 mol % of unit D.

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=7,600 and a weight-averaged molecular weight Mw=11,800.

Example 91

Polyester Synthesis Utilizing β-Malolactone Benzyl Ester and Mandelide 0.82 g (4.0 mmol) of β-malolactone benzyl ester, 2.68 g (10.0 mmol) of mandelide, 28 μl of a 2M toluene solution of diethyl zinc and 11.2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The 2.0 precipitate was recovered and dried under a reduced pressure to obtain 1.27 g of a polymer.

A NMR analysis conducted under conditions same as in Example 6 for specifying the structure of the obtained compound confirmed a polyhydroxyalkanoate 25 copolymer comprising units represented by a chemical formula (156) as monomer units. A proportion of the monomer units was confirmed as 8 mol % of unit A and 92 mol % of unit B.

(156)

A    B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,500 and a weight-averaged molecular weight Mw=11,200.

1.00 g of the obtained polyhydroxyalkanoate copolymer, represented by the chemical formula (156), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.81 g of a polymer. A NMR analysis conducted under conditions same as in Example 6 for specifying the structure of the obtained compound confirmed a polyhydroxyalkanoate copolymer comprising units represented by a chemical formula (157) as monomer units. Also a proportion of the monomer units was confirmed as 8 mol % of unit C and 92 mol % of unit D.

(157)

C    D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=6,400 and a weight-averaged molecular weight Mw=10,900.

Example 92

Condensation Reaction of Polyhydroxyalkanoate Synthesized in Example 90 and Comprised of a Unit Represented by the Chemical Formula (155), and 2-Aminobenzenesulfonic Acid Phenyl Ester In a nitrogen atmosphere, 0.40 g of a polymer synthesized from polyhydroxyalkanoate copolymer (C: 8 mol %, D: 92 mol %) obtained in Example 90 and comprised of a unit represented by chemical formula (155) and 0.53 g of 2-aminobenzenesulfonic acid phenyl ester were placed in a 100-ml three-necked flask, agitated with 15.0 ml of pyridine, further added with 1.11 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.36 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group. A result of $^1$H-NMR confirmed, by a shift in a peak derived from an aromatic ring of the 2-aminobenzenesulfonic acid phenyl ester structure, that the polymer was a polyhydroxyalkanoate comprising units represented by a chemical formula (158) as monomer units.

(158)

E    F

It was also confirmed that polyhydroxyalkanoate represented by the chemical formula (158) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene). As a result, there were obtained a number-averaged molecular weight Mn=7,300 and a weight-averaged molecular weight Mw=11,500.

Example 93

Condensation Reaction of Polyhydroxyalkanoate Synthesized in Example 91 and Comprised of a Unit Represented by the Chemical Formula (157), and 2-amino-2-methylpropanesulfonic Acid In a nitrogen atmosphere, 0.40 g of a polymer synthesized from polyhydroxyalkanoate copolymer (C: 8 mol %, D: 92 mol %) obtained in Example 91 and comprised of a unit represented by chemical formula (157) and 0.18 g of 2-amino-2-methylpropanesulfonic acid were placed in a 100-ml three-necked flask, agitated with 15.0 ml of pyridine, further added with 0.63 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer.

The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak derived from a methylene group of the 2-amino-2-methylpropanesulfonic acid structure, that the polymer was a polyhydroxyalkanoate comprising units represented by a chemical formula (159) as monomer units.

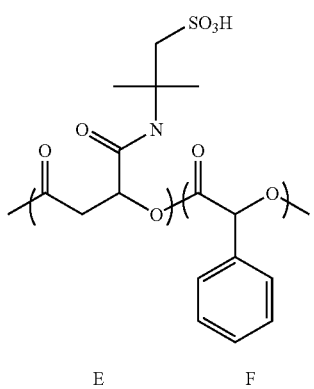

(159)

E    F

It was also confirmed that polyhydroxyalkanoate represented by the chemical formula (159) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5µ MIXED-C, solvent: DMF/LiBr 0.1% (w/v), converted as polystyrene).

As a result, there were obtained a number-averaged molecular weight Mn=6,000 and a weight-averaged molecular weight Mw=10,400.

Example 94

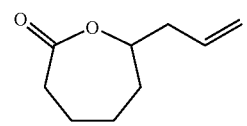

(160)

Polyester Synthesis Employing 7-(2-propenyl)-2-oxepanone Represented by Chemical Formula (160) and L-Lactide 7-(2-propenyl)-2-oxepanone represented by the chemical formula (160) and employed in this Example 94 was prepared according to a method described in Japanese Patent Application Laid-open No. H05-310721.

0.31 g (2.0 mmol) of 7-(2-propenyl)-2-oxepanone, 1.15 g (8.0 mmol) of L-lactide, 20 µl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.09 g of a polymer. A NMR analysis conducted under conditions same as in Example 6 for specifying the structure of the obtained polymer confirmed a polyhydroxyalkanoate comprising units represented by a chemical formula (161) as monomer units. It was also confirmed that a proportion of the monomer units was unit A by 11 mol % and unit B by 89 mol %.

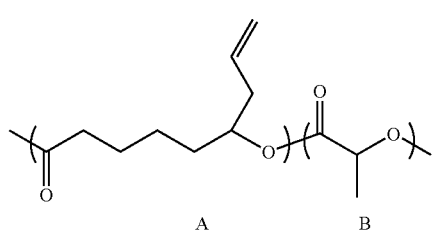

(161)

A    B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=56,400 and a weight-averaged molecular weight Mw=91,400.

Example 95

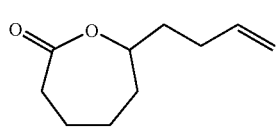

(162)

Polyester Synthesis Employing 7-(3-butenyl)-2-oxepanone Represented by Chemical Formula (162) and L-Lactide 7-(3-butenyl)-2-oxepanone represented by the chemical formula (162) and employed in this Example 95 was prepared referring to a method described in Japanese Patent Application Laid-open No. H05-310721. More specifically, 7-(3-butenyl)-2-oxepanone was synthesized by employing 2-(3-butenyl)cyclohexanone instead of 2-allylcyclohexanone described in example 43 of the aforementioned patent literature.

0.34 g (2.0 mmol) of 7-(3-butenyl)-2-oxepanone, 1.15 g (8.0 mmol) of L-lactide, 20 μl of a 2M toluene solution of di-iso-propyl zinc and 8 ml of a 0.01M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.05 g of a polymer. A NMR analysis conducted under conditions same as in Example 6 for specifying the structure of the obtained polymer confirmed a polyhydroxyalkanoate comprising units represented by a chemical formula (163) as monomer units. It was also confirmed that a proportion of the monomer units was unit A by 8 mol % and unit B by 92 mol %.

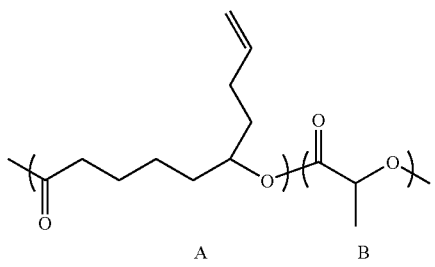

(163)

A      B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=43,500 and a weight-averaged molecular weight Mw=67,400.

Example 96

Oxidation Reaction of Polyhydroxyalkanoate Synthesized in Example 94 and Comprised of a Unit Represented by a Chemical Formula (161)

0.50 g of polyhydroxyalkanoate copolymer (A: 11 mol %, B: 89 mol %) obtained in Example 94 and comprised of a unit represented by the chemical formula (161) were placed in an eggplant-shaped flask and dissolved by adding 30 ml of acetone. The solution was placed on an iced bath, then added with 5 ml of acetic acid and 0.54 g of 18-crown-6-ether were added and agitated. Then, on an iced bath, 0.43 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.45 g of polymer. A NMR analysis conducted under conditions same as in Example 6 for specifying the structure of the obtained compound confirmed a polyhydroxyalkanoate comprising units represented by a chemical formula (164) as monomer units.

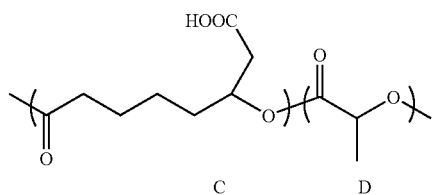

(164)

C      D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=41,300 and a weight-averaged molecular weight Mw=67,700.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate. A NMR analysis conducted under conditions same as in Example 6 confirmed that polyhydroxyalkanoate represented by the chemical formula (164) was a copolymer with a proportion by 11 mol % of unit C and 89 mol % of unit D.

Example 97

Oxidation Reaction of Polyhydroxyalkanoate Synthesized in Example 95 and Comprised of a Unit Represented by a Chemical Formula (163)

0.50 g of polyhydroxyalkanoate copolymer (A: 8 mol %, B: 92 mol %) obtained in Example 95 and comprised of a unit represented by the chemical formula (163) were placed in an eggplant-shaped flask and dissolved by adding 30 ml of acetone. The solution was placed on an iced bath, then added with 5 ml of acetic acid and 0.40 g of 18-crown-6-ether were added and agitated. Then, on an iced bath, 0.32 g of potassium permanganate were slowly added, and the mixture was agitated for 2 hours on an iced bath and further for 0.18 hours at the room temperature. After the reaction, 60 ml of ethyl acetate and 45 ml of water were added. Then sodium hydrogensulfite was added until excessive acid was eliminated.

Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in methanol of a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (165) as monomer units.

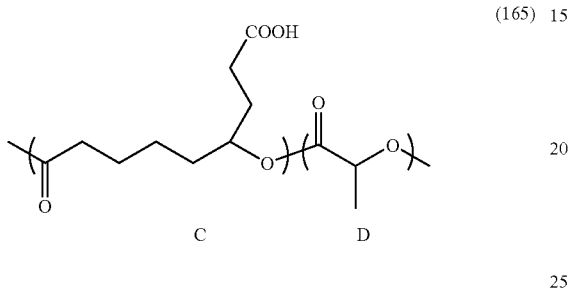

(165)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=37,500 and a weight-averaged molecular weight Mw=59,600.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 28 mg of polyhydroxyalkanoate.

A NMR analysis conducted under conditions same as in Example 6 confirmed that polyhydroxyalkanoate represented by the chemical formula (165) was a copolymer with a proportion by 8 mol % of unit C and 92 mol % of unit D.

Example 98

Condensation Reaction of Polyhydroxyalkanoate Synthesized in Example 96 and Comprised of a Unit Represented by a Chemical Formula (164), and 2-aminobenzenesulfonic Acid Phenyl Ester In a nitrogen atmosphere, 0.40 g of a polymer synthesized from polyhydroxyalkanoate copolymer (C: 11 mol %, D: 89 mol %) obtained in Example 96 and comprised of a unit represented by the chemical formula (164) and 0.66 g of 2-aminobenzenesulfonic acid phenyl ester were placed in a 100-ml three-necked flask, agitated with 15.0 ml of pyridine, further added with 1.38 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.36 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak derived from an aromatic ring of the 2-aminobenzenesulfonic acid phenyl ester structure, that the polymer was a polyhydroxyalkanoate comprising units represented by a chemical formula (166) as monomer units.

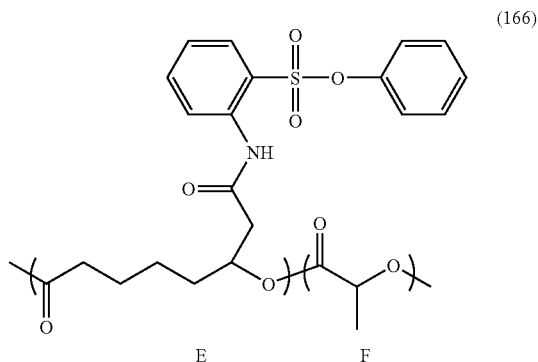

(166)

It was also confirmed that polyhydroxyalkanoate represented by the chemical formula (166) was a copolymer with a proportion by 11 mol % of unit E and 89 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=41,300 and a weight-averaged molecular weight Mw=67,700.

Example 99

Condensation Reaction of Polyhydroxyalkanoate Synthesized in Example 97 and Comprised of a Unit Represented by a Chemical Formula (165), and 2-Amino-2-methylpropanesulfonic Acid In a nitrogen atmosphere, 0.40 g of a polymer synthesized from polyhydroxyalkanoate copolymer (C: 8 mol %, D: 92 mol %) obtained in Example 97 and comprised of a unit represented by the chemical formula (165) and 0.30 g of 2-amino-2-methylpropanesulfonic acid were placed in a 100-ml three-necked flask, agitated with 15.0 ml of pyridine, further added with 1.03 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.32 g of a polymer.

The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak derived from a methylene group of the 2-amino-2-methylpropanesulfonic acid structure, that the polymer was a polyhydroxyalkanoate comprising units represented by a chemical formula (167) as monomer units.

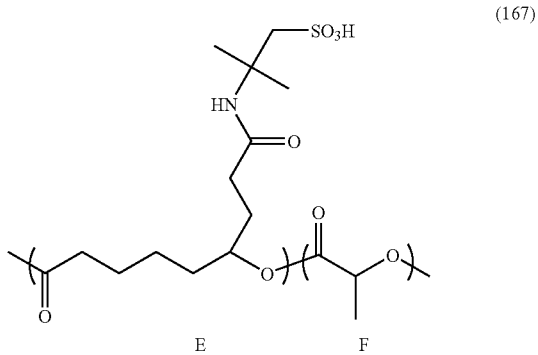

(167)

It was also confirmed that polyhydroxyalkanoate represented by the chemical formula (167) was a copolymer with a proportion by 8 mol % of unit E and 92 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=37,500 and a weight-averaged molecular weight Mw=59,600.

Example 100

Polyester Synthesis Employing Glycolide 11.61 g (100.0 mmol) of glycolide, 4.0 ml of a 0.1M toluene solution of tin octylate (tin 2-ethylhexanoate) and 4.0 ml of a 0.1M toluene solution of p-tert-butylbenzyl alcohol were charged in a polymerization ampoule, then subjected to a drying for 1 hour under a reduced pressure, and a nitrogen displacement purge, and the ampoule was sealed by fusing under a reduced pressure and heated at 150° C. to execute a ring-opening polymerization. The reaction was terminated after 10 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 9.63 g of a polymer. A NMR analysis conducted under conditions same as in Example 6 for specifying the structure of the obtained polymer confirmed a polyhydroxyalkanoate comprising units represented by a chemical formula (178) as monomer units.

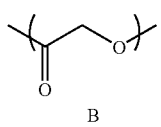

(178)

B

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight. Mn=73,000 and a weight-averaged molecular weight Mw=130,100.

Example 101

2.00 g of polyhydroxyalkanoate obtained in Example 100 and comprised of a unit represented by the chemical formula (178) were placed in an eggplant-shaped flask, and dissolved by adding 100 ml of THF. The solution was placed under a nitrogen atmosphere and agitated at −78° C. Then 18.9 ml of a 2M THF solution of lithium diisopropylamide were slowly added and the mixture was agitated for 30 minutes at −78° C. Then 12.86 g of benzyl chloroformate were added and the mixture was agitated for 30 minutes at the room temperature. After the reaction, the reaction mixture was poured into 400 ml of an aqueous solution of ammonium chloride, then 200 ml of dichloromethane were added and the organic layer was separated. The organic layer was recovered after washing three times with 100 ml of water, and the solvent was distilled off to recover a crude polymer. It was then dissolved in 12 ml of THF, and was re-precipitated in methanol of a 50-times amount of that of THF required for the dissolving. The precipitate was recovered and dried under a reduced pressure to obtain 1.22 g of polymer. A NMR analysis conducted under conditions same as in Example 6 for specifying the structure of the obtained polymer confirmed a polyhydroxyalkanoate comprising units represented by a chemical formula (179) as monomer units. It was also confirmed that a proportion of the monomer units was unit A by 8 mol % and unit B by 92 mol %.

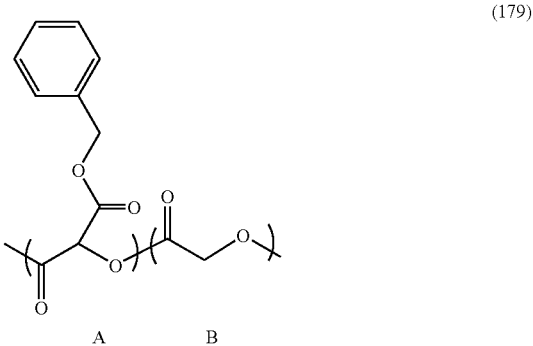

(179)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=42,100 and a weight-averaged molecular weight Mw=85,500.

1.00 g of the obtained polyhydroxyalkanoate copolymer, represented by the chemical formula (179), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.60 g of a polymer. A NMR analysis conducted under conditions same as in Example 6 for specifying the structure of the obtained compound confirmed a polyhydroxyalkanoate copolymer comprising units represented by a chemical formula (180) as monomer units. Also a proportion of the monomer units was confirmed as 8 mol % of unit C and 92 mol % of unit D.

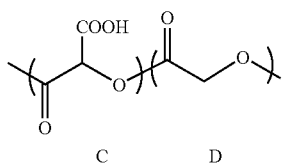

(180)

Also an average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=37,400 and a weight-averaged molecular weight Mw=78,500.

Example 102

2.00 g of polyhydroxyalkanoate obtained in Example 100 and comprised of a unit represented by the chemical formula (178) were placed in an eggplant-shaped flask, and dissolved by adding 100 ml of THF. The solution was placed under a nitrogen atmosphere and agitated at −78° C. Then 18.9 ml of a 2M THF solution of lithium diisopropylamide were slowly added and the mixture was agitated for 30 minutes at −78° C. Then 14.41 g of ethyl 5-bromovalerate were added and the mixture was agitated for 30 minutes at the room temperature. After the reaction, the reaction mixture was poured into 400 ml of an aqueous solution of ammonium chloride, then 200 ml of dichloromethane were added and the organic layer was separated. The organic layer was recovered after washing three times with 100 ml of water, and the solvent was distilled off to recover a crude polymer. It was then dissolved in 12 ml of THF, and was re-precipitated in methanol of a 50-times amount of that of THF required for the dissolving. The precipitate was recovered and dried under a reduced pressure to obtain 1.31 g of polymer. A NMR analysis conducted under conditions same as in Example 6 for specifying the structure of the obtained polymer confirmed a polyhydroxyalkanoate comprising units represented by a chemical formula (181) as monomer units. It was also confirmed that a proportion of the monomer units was unit A by 9 mol % and unit B by 91 mol %.

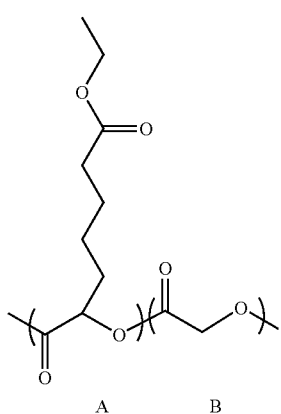

(181)

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=41,500 and a weight-averaged molecular weight Mw=93,400.

1.00 g of the obtained polyhydroxyalkanoate copolymer, represented by the chemical formula (181), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.66 g of a polymer. A NMR analysis conducted under conditions same as in Example 6 for specifying the structure of the obtained compound confirmed a polyhydroxyalkanoate copolymer comprising units represented by a chemical formula (182) as monomer units. Also a proportion of the monomer units was confirmed as 9 mol % of unit C and 91 mol % of unit D.

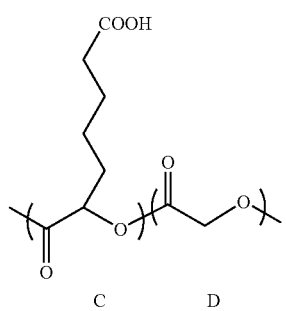

(182)

Also an average molecular weight of the obtained polyhydroxyalkanoate was evaluated by gel permeation chromatography (GPC: Tosoh HLC-8220, column: Tosoh TSK-GEL Super HM-H, solvent chloroform, converted as polystyrene). As a result, there were obtained a number-averaged molecular weight Mn=35,800 and a weight-averaged molecular weight Mw=81,600.

Example 103

2.00 g of polyhydroxyalkanoate obtained in Example 100 and comprised of a unit represented by the chemical formula. (178) were placed in an eggplant-shaped flask, and dissolved by adding 100 ml of THF. The solution was placed under a nitrogen atmosphere and agitated at −78° C. Then 18.9 ml of a 2M THF solution of lithium diisopropylamide were slowly added and the mixture was agitated for 30 minutes at −78° C. Then 16.68 g of methyl 2-acrylamide-2-methylpropanesulfonate were added and the mixture was agitated for 30 minutes at the room temperature. After the reaction, the reaction mixture was poured into 400 ml of an aqueous solution of ammonium chloride, then 200 ml of dichloromethane were added and the organic layer was separated. The organic layer was recovered after washing three times with 100 ml of water, and the solvent was distilled off to recover a crude polymer. It was then dissolved in THF, and was re-precipitated in methanol of a 50-times amount of that of THF required for the dissolving. The precipitate was recovered and dried under a reduced pressure to obtain 1.22 g of polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature). As a result, the obtained polymer was confirmed as a polyhydroxyalkanoate comprising units represented by a chemical formula (183) as monomer units. It was also confirmed that a proportion of the monomer units was unit E by 6 mol % and unit F by 94 mol %.

(183)

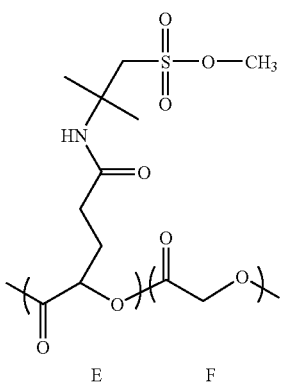

Also an average molecular weight of the obtained polyhydroxyalkanoate was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=37,400 and a weight-averaged molecular weight Mw=78,500.

Example 104

Polyester Synthesis Utilizing L-3-(2-benzyloxycarbonyl)ethyl-1,4-dioxane-2,5-dione and phenyllactide (3,6-bis(phenylmethyl)-1,4-dioxane-2,5-dione)

0.56 g (2.0 mmol) of L-3-(2-benzyloxycarbonyl)ethyl-1, 4-dioxane-2,5-dione synthesized in Example 79 and represented by the chemical formula (46), 2.96 g (10.0 mmol) of phenyllactide, 4.8 ml of a 0.01M toluene solution of tin octylate (tin 2-ethylhexanoate) and 4.8 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 180° C. to execute a ring-opening polymerization. The reaction was terminated after 2 hours and the mixture was cooled. An obtained polymer was dissolved in chloroform, and was re-precipitated in methanol of a 10 times amount of that of chloroform required for the dissolving. The precipitate was recovered and dried under a reduced pressure to obtain 2.98 g of a polymer. A NMR analysis conducted under conditions same as in Example 6 for specifying the structure of the obtained compound confirmed a polyhydroxyalkanoate copolymer comprising units represented by a chemical formula (184) as monomer units. A proportion of the monomer units was confirmed as 12 mol % of unit A and 88 mol % of unit B.

(184)

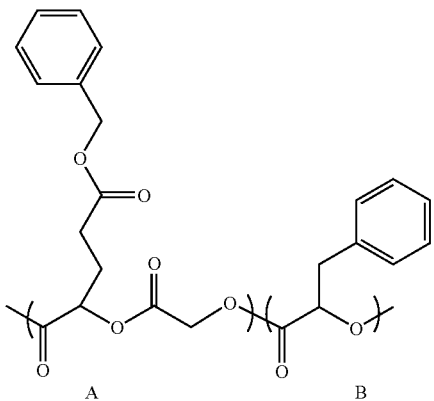

An average molecular weight of the obtained polyhydroxyalkanoate was evaluated in a similar manner as in Example 6. As a result, there were obtained a number-averaged molecular weight Mn=37,500 and a weight-averaged molecular weight Mw=53,300.

1.00 g of the obtained polyhydroxyalkanoate copolymer, represented by the chemical formula (184), was dissolved in 100 ml of a dioxane-ethanol mixed solvent (75:25), then 0.22 g of a 5% palladium/carbon catalyst were added, and the reaction system was saturated with hydrogen and agitated for 1 day at the room temperature. After the reaction, the catalyst was removed by a filtration with a membrane filter of 0.25 μm, thereby recovering the reaction solution. The solution was concentrated, then an obtained polymer was dissolved in chloroform, and was re-precipitated in methanol of a 10-times amount of that of chloroform required for the dissolving. The obtained polymer was recovered and dried under a reduced pressure to obtain 0.75 g of a polymer. A NMR analysis conducted under conditions same as in Example 6 for specifying the structure of the obtained compound confirmed a polyhydroxyalkanoate copolymer comprising units represented by a chemical formula (185) as monomer units. Also a proportion of the monomer units was confirmed as 12 mol % of unit C and 88 mol % of unit D.

(185)

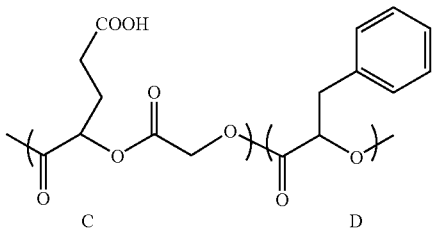

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=31,200 and a weight-averaged molecular weight Mw=46,800.

Example 105

Polyester Synthesis Utilizing 3,6-di(2-propenyl)-1,4-dioxane-2,5-dione and Phenyllactide (3,6-bis(phenylmethyl)-1,4-dioxane-2,5-dione)

0.10 g (0.5 mmol) of 3,6-di(2-propenyl)-1,4-dioxane-2,5-dione, 1.33 g (4.5 mmol) of phenyllactide, 2 ml of a 0.01M toluene solution of tin octylate (tin 2-ethylhexanoate) and 2 ml of a 0.01M toluene solution of p-tert-butylbenzyl alcohol were charged in a polymerization ampoule, then subjected to a drying for 1 hour under a reduced pressure and a nitrogen displacement purge, and the ampoule was sealed by fusing under a reduced pressure and heated at 180° C. to execute a ring-opening polymerization. The reaction was terminated after 1 hour and the mixture was cooled. An obtained polymer was dissolved in chloroform, and was re-precipitated in methanol of a 10 times amount of that of chloroform required for the dissolving. The precipitate was recovered and dried under a reduced pressure to obtain 1.07 g of a polymer. A NMR analysis conducted under conditions same as in Example 6 for specifying the structure of the obtained compound confirmed a polyhydroxyalkanoate copolymer comprising units represented by a chemical formula (186) as monomer units. A proportion of the monomer units was confirmed as 9 mol % of unit A and 91 mol % of unit B.

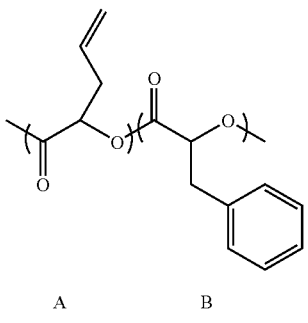

(186)

A     B

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=16,500 and a weight-averaged molecular weight Mw=24,800.

Example 106

Oxidation reaction of polyhydroxyalkanoate Synthesized in Example 105 and Comprised of a Unit Represented by a Chemical Formula (186)

0.50 g of polyhydroxyalkanoate copolymer (A: 9 mol %, B: 91 mol %) obtained in Example 105 and comprised of a unit represented by the chemical formula (186) were placed in an eggplant-shaped flask and dissolved by adding 30 ml of acetone. The solution was placed on an iced bath, then added with 5 ml of acetic acid and 0.25 g of 18-crown-6-ether were added and agitated. Then, on an iced bath, 0.20 g of potassium permanganate were slowly added, and the mixture was agitated for 2 hours on an iced bath and further for 18 hours at the room temperature. After the reaction, 60 ml of ethyl acetate and 45 ml of water were added. Then sodium hydrogensulfite was added until excessive acid was eliminated. Thereafter, 1.0N hydrochloric acid was added to pH=1. An organic layer was separated and washed three times with 1.0N hydrochloric acid. The organic layer was recovered and the solvent was distilled off to recover a crude polymer. It was then washed with 50 ml of water, 50 ml of methanol, and 3 times with 50 ml of water, and the polymer was recovered. It was then dissolved in THF, and re-precipitated in a 50-times amount of that of THF required for the dissolving. The precipitate was recovered and dried under a reduced pressure to obtain 0.44 g of polymer. A NMR analysis conducted under conditions same as in Example 6 for specifying the structure of the obtained compound confirmed a polyhydroxyalkanoate comprising units represented by a chemical formula (187) as monomer units.

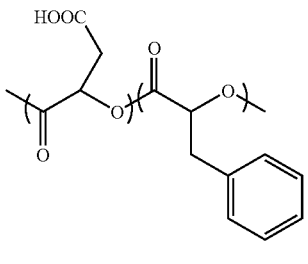

(187)

C     D

An average molecular weight of the obtained polyhydroxyalkanoate was evaluated by gel permeation chromatography (GPC: Tosoh HLC-8220, column: Tosoh TSK-GEL Super HM-H, solvent: chloroform, converted as polystyrene). As a result, there were obtained a number-averaged molecular weight Mn=14,500 and a weight-averaged molecular weight Mw=23,100.

Also, for calculating the units of the obtained polyhydroxyalkanoate, a terminal carboxyl group in the side chain of polyhydroxyalkanoate was subjected to methylesterification with trimethylsilyl diazomethane. 30 mg of the polyhydroxyalkanoate were placed in a 100-ml eggplant-shaped flask and dissolved by adding 2.1 ml of chloroform and 0.7 ml of methanol. Then 0.5 ml of a 2 mol/L hexane solution of trimethylsilyl diazomethane were added and the mixture was agitated for 1 hour at the room temperature. After the reaction, the solvent was distilled off to recover the polymer. The polymer was washed with 50 ml of methanol, then recovered, and dried under a reduced pressure to obtain 29 mg of polyhydroxyalkanoate.

A NMR analysis conducted under conditions same as in Example 6 confirmed that polyhydroxyalkanoate represented by the chemical formula (187) was a copolymer with a proportion by 8 mol % of unit C and 92 mol % of unit D.

Example 107

Condensation Reaction of Polyhydroxyalkanoate Synthesized in Example 104 and Comprised of a Unit Represented by a Chemical Formula (185), and 2-Aminobenesulfonic Acid In a nitrogen atmosphere, 0.40 g of a polymer synthesized from polyhydroxyalkanoate copolymer (C: 12 mol %, D: 88 mol %) obtained in Example 104 and comprised of a unit represented by the chemical formula (185) and 0.27 g of 2-aminobenesulfonic acid were placed in a 100-ml three-necked flask, agitated with 15.0 ml of pyridine, further added with 0.82 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.36 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1668 cm$^{-1}$ attributable to an amide group.

A result of $^1$H-NMR confirmed, by a shift in a peak derived from an aromatic ring of the 2-aminobenesulfonic acid structure, that the polymer was a polyhydroxyalkanoate comprising units represented by a chemical formula (188) as monomer units.

(188)

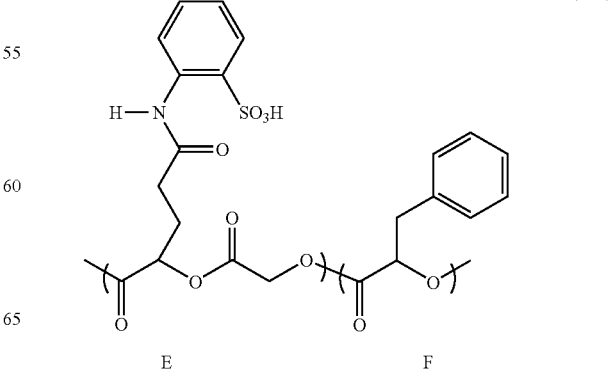

E     F

It was also confirmed that polyhydroxyalkanoate represented by the chemical formula (188) was a copolymer with a proportion by 11 mol % of unit E and 89 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=26,800 and a weight-averaged molecular weight Mw=42,900.

Example 108

Condensation Reaction of Polyhydroxyalkanoate Synthesized in Example 106 and Represented by a Chemical Formula (187), and 4-methoxyaniline-2-sulfonic Acid In a nitrogen atmosphere, 0.40 g of polyhydroxyalkanoate copolymer (C: 8 mol %, D: 92 mol %) obtained in Example 106 and comprised of a unit represented by the chemical formula (187) and 0.22 g of 4-methoxyaniline-2-sulfonic acid were placed in a 100-ml three-necked flask, agitated with 15.0 ml of pyridine, further added with 0.56 ml of triphenyl phosphite and heated for 6 hours at 120° C. After the reaction, the polymer was recovered by a re-precipitation in 150 ml of ethanol. The obtained polymer was washed with 1N hydrochloric acid for 1 day, then washed by an agitation in water for 1 day and dried under a reduced pressure to obtain 0.34 g of a polymer. The structure of the obtained polymer was analyzed by $^1$H-NMR (FT-NMR: Bruker DPX 400, resonance frequency: 400 MHz, measured species: $^1$H, solvent: deuterized DMSO, temperature: room temperature) and a Fourier transformed infrared absorption (FT-IR) spectrum (Nicolet AVATAR 360FT-IR). The IR measurement showed a decrease of a peak at 1695 cm$^{-1}$ attributable to a carboxylic acid, and a new peak at 1658 cm$^{-1}$ attributable to an amide group.

A result of $^1$H-NMR confirmed, by a shift in a peak derived from an aromatic ring of the 4-methoxyaniline-2-sulfonic acid structure, that the polymer was a polyhydroxyalkanoate comprising units represented by a chemical formula (189) as monomer units.

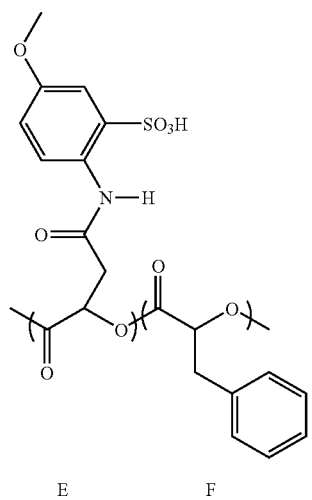

(189)

E    F

It was also confirmed that polyhydroxyalkanoate represented by the chemical formula (189) was a copolymer with a proportion by 7 mol % of unit E and 93 mol % of unit F. An average molecular weight of the obtained polymer was evaluated by gel permeation chromatography (GPC: Tosoh HLC-8120, column: Polymer Laboratories PLgel 5μ MIXED-C, solvent: DMF/LiBr 0.1% (w/v), converted as polystyrene). As a result, there were obtained a number-averaged molecular weight Mn=13,000 and a weight-averaged molecular weight Mw=21,500.

INDUSTRIAL APPLICABILITY

The present invention provides a novel polyhydroxyalkanoate containing, within a molecule, a vinyl group as a reactive group in a side chain, a novel polyhydroxyalkanoate containing a carboxyl group within a molecule, a novel polyhydroxyalkanoate containing, within a molecule, a unit having an amide group and a sulfonic acid group, and a producing method therefor. The novel polyhydroxyalkanoate having a vinyl group or a carboxyl group, being capable of introducing a functional group utilizing such reactive group, can be applied to a functional material. Also polyhydroxyalkanoate containing a carboxyl group or a unit having an amide group and a sulfonic acid group, being excellent in melt working property and in adaptability to living tissues, is anticipated for soft members for medical use.

This application claims priority from Japanese Patent Application No. 2004-174788 filed Jun. 11, 2004, which is hereby incorporated by reference herein.

The invention claimed is:

1. A polyhydroxyalkanoate comprising at least a unit represented by a chemical formula (1) within its molecule:

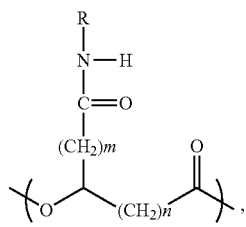

(1)

wherein R represents -A$_1$-SO$_2$R$_1$; R$_1$ represents OH, a halogen atom, ONa, OK or OR$_{1a}$; R$_{1a}$ and A$_1$ each independently represents a group having a substituted or unsubstituted aliphatic hydrocarbon structure, a substituted or unsubstituted aromatic ring structure or a substituted or unsubstituted heterocyclic structure; n represents an integer selected from 0 to 4 with the proviso when n is 0, 2, 3, or 4, then m=0–8, and also with the proviso when n=1 then m=0; if more than one unit of the chemical formula (1) is present, each of R, R$_1$, R$_{1a}$, A$_1$, m, and n is independently selected for each unit.

2. The polyhydroxyalkanoate according to claim 1, comprised of, as the unit represented by the chemical formula (1), at least a unit represented by a chemical formula (2), a chemical formula (3), a chemical formula (4A) or (4B), within the molecule:

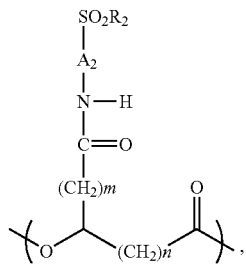

(2)

wherein R$_2$ represents OH, a halogen atom, ONa, OK or OR$_{2a}$; R$_{2a}$ represents a linear or branched alkyl group with 1 to 8 carbon atoms or a substituted or unsubstituted phenyl group, $A_2$ represents a linear or branched alkylene group with 1 to 8 carbon atoms; n represents an integer selected from 0 to 4 with the proviso when n is 0, 2, 3, or 4, then m=0–8, and also with the proviso when n=1 then m=0; if more than one unit of the chemical formula (2) is present, each of $A_2$, $R_2$, $R_{2a}$, m, and n is independently selected for each unit;

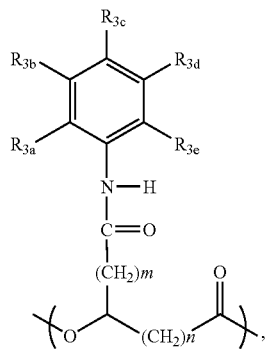

(3)

wherein each of $R_{3a}$, $R_{3b}$, $R_{3c}$, $R_{3d}$ and $R_{3e}$ independently represents $SO_2R_{3f}$, a hydrogen atom, a halogen atom, an alkyl group with 1-20 carbon atoms, an alkoxy group with 1-20 carbon atoms, an OH group, an $NH_2$ group, an $NO_2$ group, $COOR_{3g}$, an acetamide group, an OPh group, an NHPh group, a $CF_3$ group, a $C_2F_5$ group, or a $C_3F_7$ group, of which at least one is $SO_2R_{3f}$; n represents an integer selected from 0 to 4 with the proviso when n is 0, 2, 3, or 4, then m=0-8, and also with the proviso when n=1 then m=0; if more than one unit of the chemical formula (3) is present, each of $R_{3a}$, $R_{3b}$, $R_{3c}$, $R_{3d}$, $R_{3e}$, $R_{3f}$, $R_{3f1}$, $R_{3g}$, m, and n is independently selected for each unit, where $R_{3f}$ is OH, a halogen atom, ONa, OK, or $OR_{3f1}$;
$R_{3f1}$ is a linear or branched alkyl group with 1 to 8 carbon atoms or a substituted or unsubstituted phenyl group;
$R_{3g}$ is H, Na, or K; and
Ph is a phenyl group;

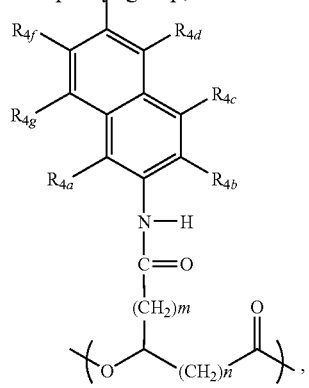

(4A)

wherein each of $R_{4a}$, $R_{4b}$, $R_{4c}$, $R_{4d}$, $R_{4e}$, $R_{4f}$ and $R_{4g}$ independently represents $SO_2R_{4o}$, a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$, an acetamide group, an OPh group, an NHPh group, a $CF_3$ group, a $C_2F_5$ group, or a $C_3F_7$ group, of which at least one is $SO_2R_{4o}$; n represents an integer selected from 0 to 4 with the proviso when n is 0, 2, 3, or 4, then m=0–8, and also with the proviso when n=1 then m=0; if more than one unit of the chemical formula 4A is present, each of $R_{4a}$, $R_{4b}$, $R_{4c}$, $R_{4d}$, $R_{4e}$, $R_{4f}$, $R_{4g}$, $R_{4o}$, $R_{4o1}$, $R_{4p}$, m, and n is independently selected for each unit, where $R_{4o}$ is OH, a halogen atom, ONa, OK, or $OR_{4o1}$
$R_{4o1}$ is a linear or branched alkyl group with 1 to 8 carbon atoms or a substituted or unsubstituted phenyl group;
$R_{4p}$ is H, Na, or K; and
Ph is a phenyl group;

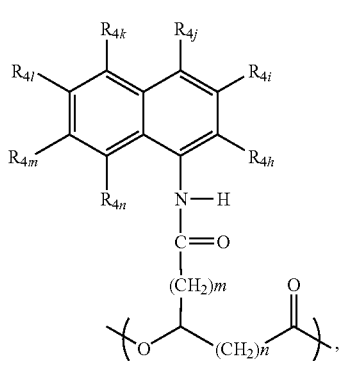

(4B)

wherein each of $R_{4h}$, $R_{4i}$, $R_{4j}$, $R_{4k}$, $R_{4l}$, $R_{4m}$ and $R_{4n}$ independently represents $SO_2R_{4o}$, a hydrogen atom, a halogen atom, an alkyl group with 1-20 carbon atoms, an alkoxy group with 1-20 carbon atoms, an OH group, an $NH_2$ group, an $NO_2$ group, $COOR_{4p}$, an acetamide group, an OPh group, an NHPh group, a $CF_3$ group, a $C_2F_5$ group, or a $C_3F_7$ group, of which at least one is $SO_2R_{4o}$; n represents an integer selected from 0 to 4 with the proviso when n is 0, 2, 3, or 4, then m=0–8, and also with the proviso when n=1 then m=0; if more than unit of the chemical formula 4B is present, each of $R_{4h}$, $R_{4i}$, $R_{4j}$, $R_{4k}$, $R_{4l}$, $R_{4m}$, $R_{4n}$, $R_{4o}$, $R_{4o1}$, $R_{4p}$, m, and n is independently selected for each unit, where $R_{4o}$ is OH, a halogen atom, ONa, OK, or $OR_{4o1}$;
$R_{4o1}$ is a linear or branched alkyl group with 1 to 8 carbon atoms or a substituted or unsubstituted phenyl group;
$R_{4p}$ is H, Na, or K; and
Ph is a phenyl group.

3. The polyhydroxyalkanoate according to any one of claims 1 and 2, further comprising a unit represented by a chemical formula (7) within the molecule:

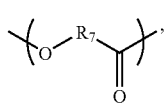

(7)

wherein $R_7$ represents a linear or branched alkylene with 1-11 carbon Atoms, an alkyleneoxyalkylene group, where each alkylene group independently has 1-2 carbon atoms, a linear or branched alkenyl group with 1-11 carbon atoms, or an alkylidene group with 1-5 carbon atoms, which is unsubstituted or substituted with an aryl group; and if more that one unit of the chemical formula (7) is present, $R_7$ is independently selected for each unit.

4. A method for producing a polyhydroxyalkanoate comprising a unit represented by a chemical formula (1), comprised of a step of executing a condensation reaction of a polyhydroxyalkanoate comprising a unit represented by a chemical formula (20) and an amine compound represented by a chemical formula (21):

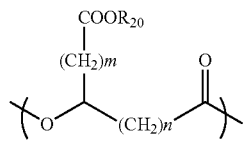
(20)

wherein $R_{20}$ represents hydrogen, or a group capable of forming a salt; n represents an integer selected from 0 to 4 with the proviso when n is 0, 2, 3, or 4, then m=0-8, and also with the proviso when n=1 then m=0; and, in case plural units are present, m and n and $R_{20}$ have the aforementioned meanings independently for each unit;

$$H_2N\text{-}A_3\text{-}SO_2R_{21} \tag{21}$$

wherein $R_{21}$ represents OH, a halogen atom, ONa, OK or $OR_{21a}$; $R_{21a}$ and $A_3$ each independently is selected from a group having a substituted or unsubstituted aliphatic hydrocarbon structure, a substituted or unsubstituted aromatic ring structure, or a substituted or unsubstituted heterocyclic structure; and, in case plural units are present, $R_{21}$, $R_{21a}$ and $A_3$ have the aforementioned meanings independently for each unit;

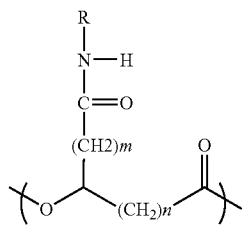
(1)

wherein R represents $-A_1\text{-}SO_2R_1$; $R_1$ represents OH, a halogen atom, ONa, OK or $OR_{1a}$; $R_{1a}$ and $A_1$ each independently represents a group having a substituted or unsubstituted aliphatic hydrocarbon structure, a substituted or unsubstituted aromatic ring structure, or a substituted or unsubstituted heterocyclic structure; n represents an integer selected from 0 to 4; m represents an integer selected from 0-8 in case n is 0, 2, 3 or 4, and m represents 0 in case n is 1; and in case plural units are present, R, $R_1$, $R_{1a}$, $A_1$, m and n have the aforementioned meanings independently for each unit.

* * * * *